US012617115B2

(12) United States Patent
Waechter et al.

(10) Patent No.: US 12,617,115 B2
(45) Date of Patent: May 5, 2026

(54) KNOCKOUT TOOLS

(71) Applicant: Black & Decker Inc., New Britain, CT (US)

(72) Inventors: Jose Henrique Waechter, Carlos Barbosa (BR); Andre Felipe Breternitz de Souza, Sao Paulo (BR); Marco Lourenco, Lebanon, OH (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/959,993

(22) Filed: Nov. 26, 2024

(65) Prior Publication Data

US 2025/0170742 A1 May 29, 2025

Related U.S. Application Data

(60) Provisional application No. 63/603,455, filed on Nov. 28, 2023.

(51) Int. Cl.
*B26F 1/34* (2006.01)
*B25F 5/00* (2006.01)

(52) U.S. Cl.
CPC ................ *B26F 1/34* (2013.01); *B25F 5/001* (2013.01)

(58) Field of Classification Search
None
See application file for complete search history.

(56) References Cited

U.S. PATENT DOCUMENTS 2,390,371 A 12/1945 Ivy
4,495,699 A 1/1985 Oakes
6,367,362 B1 4/2002 Brazell et al.
6,655,473 B1 * 12/2003 Chi ........................ B25F 5/001 173/216
9,272,799 B2 3/2016 Figiel et al.
9,393,711 B2 7/2016 Myrhum et al.
9,630,265 B2 4/2017 Figiel et al.
10,252,438 B2 4/2019 Myrhum et al.
11,034,047 B2 6/2021 Myrhum et al.
(Continued)

FOREIGN PATENT DOCUMENTS

CN 212372117 U 1/2021
CN 112706130 A 4/2021
(Continued)

OTHER PUBLICATIONS

International Search Report and Written Opinion for PCT Application No. PCT/US2024/057743, mailed on May 7, 2025, 20 pages.

*Primary Examiner* — Hwei-Siu C Payer
(74) *Attorney, Agent, or Firm* — Brake Hughes Bellermann LLP

(57) ABSTRACT

Power-driven knockout tools are provided, including knockout tool accessory devices for power-driven tools. A plurality of different die sets can be coupled to the knockout tools, for forming openings through rigid plate or sheet material. The knockout tool portion of the tools may include a transmission that provides for sufficient speed reduction and corresponding increase in output torque from an input speed/torque associated with a rotary force input to the transmission to an output speed and an output torque for the pulling of a punch portion of the die set through the rigid sheet or plate material.

23 Claims, 52 Drawing Sheets

(56) References Cited

U.S. PATENT DOCUMENTS

| | | | | |
|---|---|---|---|---|
| 11,292,067 | B2 | 4/2022 | Street et al. | |
| 2008/0011135 | A1 | 1/2008 | Ray | |
| 2012/0132453 | A1 | 5/2012 | Fu | |
| 2012/0255184 | A1 * | 10/2012 | Myrhum, Jr. .......... | B26D 5/086 30/362 |
| 2013/0305544 | A1 | 11/2013 | Haase | |
| 2021/0299902 | A1 | 9/2021 | Myrhum et al. | |
| 2022/0219251 | A1 | 7/2022 | Street et al. | |
| 2023/0128823 | A1 * | 4/2023 | Tucker .................... | B25F 5/006 81/121.1 |
| 2025/0170742 | A1 * | 5/2025 | Waechter ................ | B25F 5/001 |

FOREIGN PATENT DOCUMENTS

| | | | | |
|---|---|---|---|---|
| WO | 0204179 | A1 | 1/2002 | |
| WO | 2004082878 | A1 | 9/2004 | |
| WO | 2021011845 | A1 | 1/2021 | |
| WO | WO-2024044546 | A1 * | 2/2024 | ................ B25F 5/02 |
| WO | WO-2025076067 | A1 * | 4/2025 | .............. B26F 1/386 |

* cited by examiner

KNOCKOUT TOOLS

CROSS REFERENCE TO RELATED APPLICATIONS

This application claims priority to U.S. Patent Application No. 63/603,455, filed on Nov. 28, 2023, and entitled "Knockout Accessory for Power Tool," the disclosure of which is incorporated by reference herein in its entirety.

FIELD

This relates to knockout tools including power-driven knockout tools and knockout accessories for power-driven tools, e.g., rotary power tools such as drills, drill/drivers, or impact drivers.

BACKGROUND

A knockout tool or punch can be used to form openings or holes in metal sheet material or plate material. The use of manual tools to form openings in metal material may be difficult and/or time consuming, and may not produce a clean, precise opening. Powered cutting tools such as, for example, hole saws, jig saws, and the like may be similarly difficult and/or time consuming to use, and still not produce a clean, precise opening. Specialized hand or manual tools, and specialized power-driven tools, that are specifically designed for forming or punching openings through metal sheet material and/or metal plate material may be relatively large, costly, and cumbersome to operate, particularly in installation environments in which access to the workpiece poses a challenge.

SUMMARY

In some aspects, the techniques described herein relate to an accessory device for a power tool, the accessory device including: a housing; a transmission received in the housing; an input shaft at least partially received in the housing and configured to be coupled to a power tool to transmit torque from the power tool to the transmission; a driving member at least partially received in the housing and configured to be rotatably driven about a first axis by the transmission, the driving member including a first threaded portion; a driven member at least partially received in the housing and configured to be axially moveable along a second axis, the driven member including a coupling portion configured to be coupled to a punch of a die set and a second threaded portion engageable with the first threaded portion, wherein, during operation, in response to rotation of the input shaft in a first direction, the first threaded portion and the second threaded portion are engaged such that rotation of the driving member about the first axis causes axial movement of the driven member and the punch in a first axial direction along the second axis to form a hole in a workpiece, and wherein, in response to continued rotation of the input shaft, the first threaded portion and the second threaded portion disengage such that further rotation of the driving member about the first axis does not cause axial movement of the driven member along the second axis.

In some aspects, the techniques described herein relate to an accessory device, wherein at least one of the driving member or the driven member includes an unthreaded portion.

In some aspects, the techniques described herein relate to an accessory device, further including a biasing member that biases the first threaded portion and the second threaded portion toward being in engagement with each other.

In some aspects, the techniques described herein relate to an accessory device, wherein, in response to disengagement of the first threaded portion and the second threaded portion, rotation of the input shaft in a second direction opposite the first direction and a biasing force of the biasing member cause the first threaded portion and the second threaded portion to re-engage.

In some aspects, the techniques described herein relate to an accessory device, wherein the driven member includes a first cavity that contains the second threaded portion that selectively engages the first threaded portion of the driving member; and a second cavity configured to couple the punch to the driven member.

In some aspects, the techniques described herein relate to an accessory device, wherein the driving member is configured to rotate in a second rotational direction in response to a rotary force in the second rotational direction output by the transmission, the first threaded portion of the driving member is configured to re-engage the second threaded portion of the driven member in response to rotation of the driven member in the second rotational direction, and the driven member is configured to move in a second axial direction in response to rotation of the driving member in the second rotational direction and re-engagement of the first threaded portion of the driving member with the second threaded portion of the driven member.

In some aspects, the techniques described herein relate to an accessory device, wherein the biasing member is positioned between an end portion of the driven member and a bearing coupling the driving member to the transmission, wherein the biasing member exerts a biasing force on the driven member that urges re-engagement of the first threaded portion of the driving member with the second threaded portion of the driven member.

In some aspects, the techniques described herein relate to an accessory device, wherein the transmission includes a gear assembly including a plurality of gears to provide a speed reduction and torque increase from the input shaft to the driving member.

In some aspects, the techniques described herein relate to an accessory device, wherein the gear assembly includes an inline arrangement of planetary gear sets, including: a first planetary gear set coupled to the input shaft and configured to receive a rotary force from the power tool; a second planetary gear set configured to rotate in response to rotation of the first planetary gear set; and a third planetary gear set configured to rotate in response to rotation of the second planetary gear set, wherein the first planetary gear set, the second planetary gear set, and the third planetary gear set are sized so as to provide a previously set reduction in speed, from an input speed associated with the rotary force at the input shaft to an output speed transmitted from the third planetary gear set to the driving member.

In some aspects, the techniques described herein relate to an accessory device, wherein the first planetary gear set, the second planetary gear set, and the third planetary gear set are sized so as to provide a previously set output torque providing for the axial movement of the driven member in the first axial direction.

In some aspects, the techniques described herein relate to an accessory device, wherein the gear assembly includes: an input spur gear coupled to the input shaft and configured to receive torque from the power tool; an intermediate spur gear mounted on an intermediate shaft and in meshed engagement with the input spur gear, and configured to rotate in response to rotation of the input spur gear; a worm gear formed on an outer portion of the intermediate shaft and configured to rotate together with the intermediate spur gear and the intermediate shaft; and an output gear in meshed engagement with the worm gear and configured to rotate in response to rotation of the worm gear.

In some aspects, the techniques described herein relate to an accessory device, further including a flange structure having a first portion fixedly coupled to the output gear such that the flange structure rotates together with the output gear, and a second portion fixedly coupled to the coupling portion of the driving member such that the driving member rotates together with the flange structure and the output gear.

In some aspects, the techniques described herein relate to an accessory device, wherein the gear assembly includes: an input bevel gear; an output bevel gear mounted on a common shaft and in meshed engagement with the input bevel gear, wherein the output bevel gear is configured to rotate in response to rotation of the input bevel gear; at least one planetary gear set mounted on the common shaft and configured to rotate in response to rotation of the output bevel gear; an input spur gear mounted on the common shaft and configured to rotate in response to rotation of the output bevel gear and the at least one planetary gear set; and an output spur gear in meshed engagement with the input spur gear and configured to rotate in response to rotation of the input spur gear.

In some aspects, the techniques described herein relate to an accessory device, wherein: in a first mode, the input bevel gear is configured to receive torque from the power tool via a first input shaft coupling the power tool to the input bevel gear, such that the output bevel gear, the at least one planetary gear set, the input spur gear and the output spur gear rotate in response to rotation of the input bevel gear, and the driving member rotates in response to rotation of the output spur gear; in a third mode, the input spur gear is configured to receive the torque from the power tool via a third input shaft coupling the power tool to the input spur gear, such that the output spur gear rotates in response to rotation of the input spur gear, and the driving member rotates in response to rotation of the output spur gear; and in a third mode, the output spur gear is configured to receive the torque from the power tool via a second input shaft coupling the power tool to the output spur gear, such that the driving member rotates in response to rotation of the output spur gear.

In some aspects, the techniques described herein relate to an accessory device, wherein: in the first mode, an output axis of the accessory device is substantially orthogonal to an output axis of the power tool; in the second mode, the output axis of the accessory device is offset from and substantially parallel to the output axis of the power tool; and in the third mode, the output axis of the accessory device is substantially aligned with the output axis of the power tool.

In some aspects, the techniques described herein relate to an accessory device, wherein the output axis of the power tool and the output axis of the accessory device are coaxial.

In some aspects, the techniques described herein relate to an accessory device for a power tool, the accessory device including: a housing; a transmission received in the housing and including an output gear with a first threaded portion rotatable about a first axis; an input shaft at least partially received in the housing and configured to transmit torque from a power tool to an input portion of the transmission; a driven member at least partially received in the housing and configured to be driven by a driving member in response to the torque received at the input portion of the transmission, the driven member including a coupling portion configured to be coupled to a punch of a die set and a second threaded portion engageable with the first threaded portion, the driven member configured to be axially moveable along a second axis wherein, in response to rotation of the input shaft in a first rotational direction, the first threaded portion and the second threaded portion are engaged such that rotation of the driving member about the first axis causes axial movement of the driven member and the punch along the second axis to form a hole in a workpiece, and wherein, in response to continued rotation of the input shaft, the first threaded portion and the second threaded portion disengage such that further rotation of the driving member about the first axis does not cause axial movement of the driven member in a first axial direction along the second axis.

In some aspects, the techniques described herein relate to an accessory device, wherein at least one of the output gear or the driven member includes an unthreaded portion.

In some aspects, the techniques described herein relate to an accessory device, further including a biasing member that biases the first threaded portion and the second threaded portion toward being in engagement with each other.

In some aspects, the techniques described herein relate to an accessory device, wherein: in response to rotation of the output gear in a second rotational direction opposite the first rotational direction the second threaded portion of the driven member is configured to re-engage the first threaded portion of the output gear, and the driven member is configured to move in a second axial direction opposite the first axial direction in response to rotation of the output gear in the second rotational direction and re-engagement of the second threaded portion with the first threaded portion of the output gear.

In some aspects, the techniques described herein relate to an accessory device, further including: an end plate positioned at an end portion of the driven member, and movable axially with the driven member within a cavity formed in the housing; and a biasing member positioned between the end plate and an end portion of the cavity, wherein the biasing member exerts a biasing force on the end plate that urges re-engagement of the first threaded portion of the driven member with the second threaded portion of the output gear.

In some aspects, the techniques described herein relate to an accessory device, wherein one of: an output axis of the accessory device is substantially orthogonal to an output axis of the power tool; or the output axis of the accessory device is substantially aligned with the output axis of the power tool; or the output axis of the accessory device is offset from and substantially parallel to the output axis of the power tool.

In some aspects, the techniques described herein relate to the accessory device of 17, wherein a length of an engagement between the first threaded portion and the second threaded portion corresponds to a depth of a cup portion and a punch portion of the punch coupled to the driven member, such that the unthreaded portion of the driven member is positioned in the second threaded portion of the output gear in a fully inserted position of the punch portion in a cup portion of the die set.

In some aspects, the techniques described herein relate to an accessory device, wherein the transmission includes: a worm gear coupled to the input shaft and configured to receive the torque from the power tool; and a worm wheel output gear in meshed engagement with the worm gear and configured to rotate in response to rotation of the worm gear, wherein the worm wheel output gear includes a central opening in which the second threaded portion is formed, and wherein worm wheel output gear is mounted on the driven member extending through the central opening, wherein the worm gear and the worm wheel output gear are sized so as to provide a previously set reduction in speed, from an input speed associated with the torque at the input shaft to an output speed transmitted from the worm wheel output gear to the driven member, and the worm gear and the worm wheel output gear are sized so as to provide a previously set output torque providing for axial movement of the driven member in the first axial direction.

In some aspects, the techniques described herein relate to an accessory device, wherein the transmission includes: at least one planetary gear set mounted on a common shaft, and coupled to the input shaft to receive the torque from the power tool; a bevel gear mounted on the common shaft and configured to rotate in response to rotation of the at least one planetary gear set; and an output gear in meshed engagement with the bevel gear and configured to rotate in response to rotation of the bevel gear, wherein the output gear includes a central opening in which the second threaded portion is formed, with the output gear mounted on the driven member extending through the central opening.

In some aspects, the techniques described herein relate to an accessory device, wherein the transmission includes: at least one planetary gear set mounted on a common shaft, and coupled to the input shaft to receive the torque from the power tool; an input spur gear mounted on the common shaft and configured to rotate in response to rotation of the at least one planetary gear set; and an output spur gear in meshed engagement with the input spur gear and configured to rotate in response to rotation of the input spur gear, wherein the output spur gear includes a central opening in which the second threaded portion is formed, with the output spur gear mounted on the driven member extending through the central opening.

In some aspects, the techniques described herein relate to an accessory device, wherein the first axis and the second axis are coaxial.

In some aspects, the techniques described herein relate to an accessory device for a power tool, the accessory device including: a housing; an input shaft at least partially received in the housing and configured to transmit torque from a power tool; a driving member at least partially received in the housing and rotatable about a first axis in response to rotation of the input shaft, the driving member including a first threaded portion; a driven member at least partially non-rotatably received in the housing and axially movable along a second axis, the driven member including a second threaded portion engageable with the first threaded portion; and a punch of a die set coupleable to the driven member and movable axially along the second axis with the driven member, wherein, in operation, initially the first threaded portion and the second threaded portion are engaged such that rotation of the input shaft in a first rotational direction causes rotation of the driving member about the first axis and axial movement of the driven member and the die set along the second axis to punch a hole in a workpiece, and in response to continued rotation of the input shaft in the first rotational direction, the first threaded portion and the second threaded portion become disengaged such that further rotation of the driving member about the first axis does not cause further axial movement of the driven member and the die set along the second axis.

In some aspects, the techniques described herein relate to an accessory device, wherein at least one of the driving member and the driven member includes an unthreaded portion.

In some aspects, the techniques described herein relate to an accessory device, further including a biasing member that biases the first threaded portion and the second threaded portion toward being in engagement with each other.

In some aspects, the techniques described herein relate to an accessory device, wherein the driving member includes a driving shaft and the driven member includes a driven shaft.

In some aspects, the techniques described herein relate to an accessory device, further including a transmission coupled to the input shaft, wherein the driving member includes an output member of the transmission and the driven member includes a driving shaft.

In some aspects, the techniques described herein relate to an accessory device, wherein the output member includes an output gear of the transmission.

In some aspects, the techniques described herein relate to a knockout tool including: a housing; a transmission received in the housing; an input shaft at least partially received in the housing and configured to transmit an input torque to the transmission; a driving member at least partially received in the housing and configured to be rotatably driven about a first axis by the transmission, the driving member including a first threaded portion; and a driven member at least partially received in the housing and configured to be axially moveable along a second axis, the driven member including a coupling portion configured to be coupled to a punch of a die set and a second threaded portion engageable with the first threaded portion; wherein, during operation, in response to rotation of the input shaft in a first direction, the first threaded portion and the second threaded portion are engaged such that rotation of the driving member about the first axis causes axial movement of the driven member and the punch in a first axial direction along the second axis to form a hole in a workpiece; and wherein, in response to continued rotation of the input shaft, the first threaded portion and the second threaded portion disengage such that further rotation of the driving member about the first axis does not cause axial movement of the driven member along the second axis.

In some aspects, the techniques described herein relate to a knockout tool, wherein at least one of the driving member or the driven member includes an unthreaded portion.

In some aspects, the techniques described herein relate to a knockout tool, further including a spring that biases at least one of the first threaded portion and the second threaded portion toward being in engagement with each other.

In some aspects, the techniques described herein relate to a knockout tool, wherein, in response to disengagement of the first threaded portion and the second threaded portion, rotation of the input shaft in a second direction opposite the first direction and a biasing force of the spring cause the first threaded portion and the second threaded portion to re-engage.

In some aspects, the techniques described herein relate to a knockout tool, wherein the spring is positioned between an end portion of the driven member and a bearing coupling the driving member to the transmission, wherein the spring exerts a biasing force on the driven member that urges re-engagement of the first threaded portion of the driving member with the second threaded portion of the driven member.

In some aspects, the techniques described herein relate to a knockout tool, wherein the transmission includes a gear assembly including a plurality of gears to provide a speed reduction and torque increase from the input shaft to the driving member.

In some aspects, the techniques described herein relate to a knockout tool, wherein the gear assembly includes at least one planetary gear set configured to transmit torque from the input shaft to an output member of the at least one planetary gear sets.

In some aspects, the techniques described herein relate to a knockout tool, wherein the gear assembly further includes a first spur gear configured to be driven by the output member of the at least one planetary gear sets and a second spur gear configured to be driven by the first spur gear.

In some aspects, the techniques described herein relate to a knockout tool, wherein the gear assembly includes: an input spur gear; an intermediate spur gear mounted on an intermediate shaft and in meshed engagement with the input spur gear, and configured to rotate in response to rotation of the input spur gear; a worm gear formed on an outer portion of the intermediate shaft and configured to rotate together with the intermediate spur gear and the intermediate shaft; and an output gear in meshed engagement with the worm gear and configured to rotate in response to rotation of the worm gear.

In some aspects, the techniques described herein relate to a knockout tool, wherein the gear assembly includes: an input bevel gear; an output bevel gear in meshed engagement with the input bevel gear, wherein the output bevel gear is configured to rotate in response to rotation of the input bevel gear; at least one planetary gear set configured to transmit torque in response to rotation of the output bevel gear; an input spur gear configured to rotate in response to rotation of an output member of the at least one planetary gear set; and an output spur gear in meshed engagement with the input spur gear and configured to rotate in response to rotation of the input spur gear.

In some aspects, the techniques described herein relate to a knockout tool, further including: a punch of a die set coupleable to the driven member and movable axially along the second axis with the driven member.

In some aspects, the techniques described herein relate to a knockout tool, wherein a speed reduction ratio of the transmission is between approximately 500:1 and 1500:1.

In some aspects, the techniques described herein relate to a knockout tool, wherein the knockout tool is configured to generate at least approximately 50 kN of axial pulling force at the driven member.

In some aspects, the techniques described herein relate to a knockout tool, wherein a volume of the housing is between approximately 352 cm3 and approximately 1220 cm3.

In some aspects, the techniques described herein relate to a knockout tool, wherein a ratio of an axial pulling force at the driven member to a volume of the housing is between approximately 0.03 kN/cm3 and approximately 0.15 kN/cm3.

In some aspects, the techniques described herein relate to a knockout tool, wherein the input shaft is configured to be driven by an output tool holder of a separate rotary power tool.

In some aspects, the techniques described herein relate to a knockout tool, further including a brace assembly configured to support the housing relative to the rotary power tool, the brace assembly including an arm configured to be removeably attached to a power tool and a collar coupled to the arm and configured to be coupled to the housing.

In some aspects, the techniques described herein relate to a knockout tool, further including an electric motor received in the housing and configured to rotatably drive the input shaft.

In some aspects, the techniques described herein relate to a knockout tool, further including a handle coupled to the housing and a battery configured to provide power to the electric motor.

In some aspects, the techniques described herein relate to a knockout tool, including: a housing; a motor received in the housing; a transmission received in the housing and coupled to the motor; a driving member at least partially received in the housing and configured to be rotatably driven about a first axis by the motor and transmission, the driving member including a first threaded portion; and a driven member at least partially received in the housing and configured to be axially moveable along a second axis, the driven member including a coupling portion, configured to be coupled to a punch of a die set, and a second threaded portion engageable with the first threaded portion; wherein, during operation, in response to rotation of the driving member in a first direction, the first threaded portion and the second threaded portion are engaged such that rotation of the driving member about the first axis causes axial movement of the driven member and the punch in a first axial direction along the second axis to form a hole in a workpiece, and wherein the transmission includes a planetary gear set; wherein the housing includes: opposing front and rear sides; a handle portion; a motor and transmission portion located above the handle portion that contains the motor and the planetary gear set; and a punch portion located above the motor and transmission portion that contains the driving member and the driven member; wherein the motor includes a shaft that rotates about a third axis, wherein the second axis and the third axis are offset and parallel and each extend between the front and rear sides of the housing.

In some aspects, the techniques described herein relate to a knockout tool, wherein the housing includes a handle portion, wherein the motor and the punch are each located forward of the handle portion.

In some aspects, the techniques described herein relate to a knockout tool, including: a housing; a motor received in the housing; a battery pack removably coupled to the housing for powering the motor; a driving member at least partially received in the housing and configured to be rotatably driven about a first axis by the motor; a driven member at least partially received in the housing and configured to be driven axially by the driving member in response to rotation of the driving member; and a punch of a die set coupleable to the driven member and configured to be movable axially with the driven member; wherein the power tool is configured to generate at least approximately 50 kN of axial pulling force at the driven member for forming an opening in a workpiece with the die set.

In some aspects, the techniques described herein relate to a knockout tool, wherein a ratio of an axial pulling force at the driven member to a volume of the housing is between approximately 0.08 kN/cm3 and approximately 0.09 kN/cm3.

The details of one or more implementations are set forth in the accompanying drawings and the description below. Other features will be apparent from the description and drawings, and from the claims.

BRIEF DESCRIPTION OF THE DRAWINGS

FIG. 1C is a first perspective view of an example power tool in the form of a knockout tool.

DETAILED DESCRIPTION

Aspects of the present disclosure include knockout tools, including power tools that are specifically designed for use as a knockout tool as well as knockout tool accessory devices that can be coupled to existing power-driven tools. Whether in the form of a dedicated power tool or an accessory device, the knockout tools disclosed herein facilitate the formation of clean openings in metal sheet or plate material and may provide an efficient, cost effective, flexible solution to forming these types of openings. An accessory device, in accordance with implementations described herein, can be coupled to a power-driven tool, for example, a rotary power-driven power tool, such as, for example, a drill, a drill/driver, an impact driver, and other such power-driven tools.

A knockout tool, in accordance with implementations described herein, facilitates the formation of openings or holes in a workpiece, which may be composed of a rigid material, for example rigid sheet metal material, rigid plate metal material, and the like. A knockout tool, in accordance with implementations described herein, may include a die set including a punch portion that moves axially to create, or form, or punch a hole in the workpiece. A knockout tool, in accordance with implementations described herein, may include a driving member that is driven in rotation by the power-driven tool, a driven member that is coupleable to a die set and moveable axially in response to rotation of the driving member, and a decoupling feature that decouples the driving member from the driven member to inhibit over-driving of a die set coupled thereto. A knockout tool, in accordance with implementations described herein, may include a transmission mechanism that transmits a force for output by the device, and provides for a speed reduction and an increase in torque from a power source to an output of the knockout device. In some examples, an output axis of the accessory device is aligned with an output axis of the power-driven tool. In some examples, an output axis of the accessory device is arranged substantially in parallel with the output axis of the power-driven tool. In some examples, the output axis of the accessory device is arranged substantially orthogonally to the output axis of the power-driven tool. An accessory device, in accordance with implementations described herein, can be coupled to a power-driven tool, to provide the user with the functionality of a knockout tool (by coupling the accessory device to the power-driven tool) without being limited to the singular functionality associated with a specialized knockout tool.

Figure 1A:
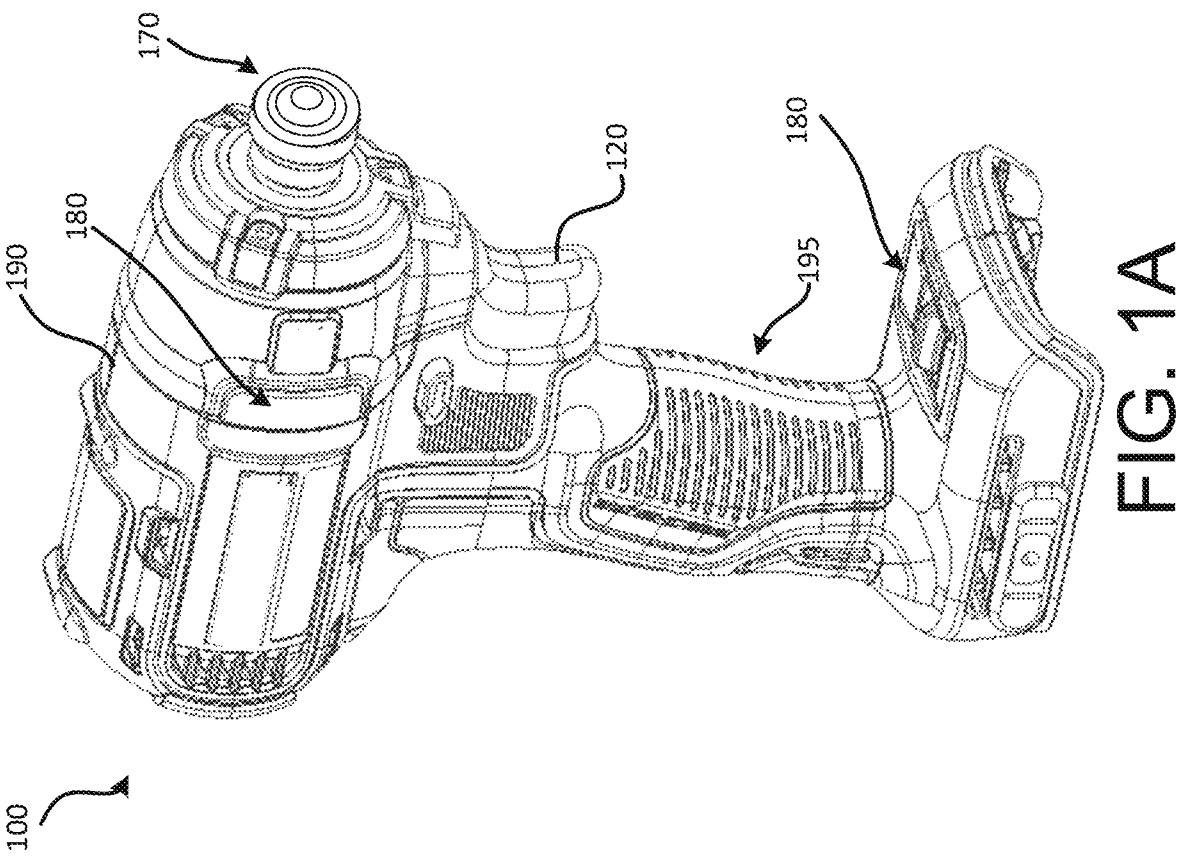
FIG. 1A is a perspective view of an example rotary power tool for use with an example accessory tool.
Figure 1B:
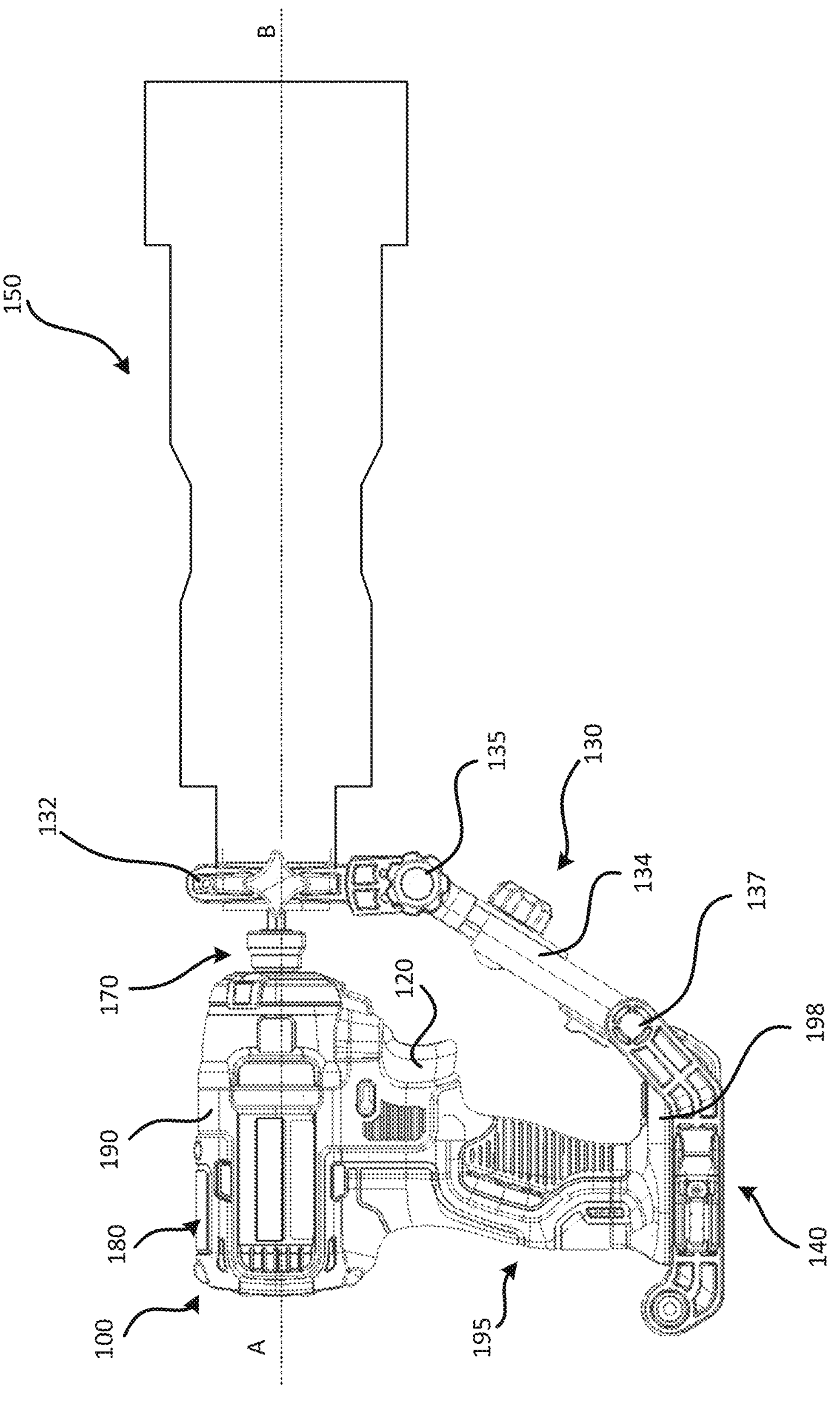
FIG. 1B is a side view illustrating an example accessory device coupled to the example rotary power tool shown in FIG. 1A.

FIG. 1A is a perspective view of an example rotary power tool 100 to which an accessory device, such as a knockout accessory or knockout tool, in accordance with implementations described herein, can be coupled. FIG. 1B is a side view, illustrating an example accessory device 150, such as, for example, one of the example accessory devices in the form of a knockout tool or knockout accessory described herein, coupled to the example power tool 100. In FIG. 1A, the example rotary power-driven tool 100 is in the form of an impact driver, simply for purposes of discussion and illustration. The principles to be described herein are applicable to the connection of a knockout accessory to other types of rotary power-driven tools including, for example, a drill or drill/driver and the like. The example power tool 100 shown in FIG. 1A includes a tool holder 170 that provides for coupling of output tools and/or devices and/or accessories (e.g., screwdriving bits and drill bits) and also including knockout accessories or knockout tools, in accordance with implementations described herein. The example power tool 100 shown in FIG. 1A includes a housing 190, in which components such as, for example, a motor, a transmission, the output assembly (not shown in FIG. 1A) and the like are housed. In a situation in which the example power tool 100 is an impact driver, an impact mechanism may be received in the housing 190. In some examples, the transmission (and the impact mechanism, if so equipped) transmits a force generated by the motor to the output tool and/or device and/or accessory coupled at the tool holder 170 via the output assembly, to drive the output tool and/or device and/or accessory coupled at the tool holder 170 to perform an operation on a workpiece. The tool holder 170 is provided at an end portion of the housing 190, corresponding to a working end of the example power tool 100. In some examples, the tool holder 170 includes a quick-release hex receptacle. A trigger 120 for triggering operation of the example power tool 100 is provided at a handle portion 195 of the housing 190. One or more selection devices 180, accessible to a user at the outside of the housing 190, provide for user control of the example power tool 100. For example, the one or more selection devices 180 can be manipulated by the user to turn the example power tool 100 on and off, to set an operation mode of the example power tool 100, to set an operational speed of the example power tool 100, to set an operational direction of the example power tool 100, and the like. The power tool 100 may be similar to the power tool disclosed in commonly owned U.S. Pat. No. 11,855,567, issued Dec. 26, 2023, titled "Impact Tools and Control Modes, the disclosure of which is incorporated by reference.

As shown in FIG. 1B, in some examples, an angled brace assembly 130 may be coupled to the example power tool 100. The angled brace assembly 130 may reinforce a coupling of the example accessory device 150 to the example power tool 100. The angled brace assembly 130 may be similar to one of the brace assemblies described and shown in commonly owned U.S. patent application Ser. No. 17/658,276, filed on Apr. 7, 2022, entitled "Power Tool Accessory System with Brace," and U.S. application Ser. No. 18/501,004, filed Nov. 2, 2023, entitled "Power Tool Accessory System with Brace," the disclosures of which are incorporated herein by reference. The example brace assembly 130 is illustrated in FIG. 1B, simply for purposes of discussion and illustration. Any of the brace assemblies described in the aforementioned patent application(s) may be applicable.

The example brace assembly 130 shown in FIG. 1B includes a clamping assembly 140 configured to be removably and rigidly attached to a base portion 198 of the handle portion 195 of the housing 190. A collar 132 is configured to be coupled to a rear end portion of a housing of the example accessory device 150, as shown in FIG. 1B, such as, for example, a housing of one of the accessory devices in the form of a knockout tool or knockout accessory as described herein. An arm assembly 134 has a first end portion 135 pivotally coupled to the collar 132, and an opposite, second end portion 137 coupled to the clamping assembly 140. FIG. 1B illustrates the brace assembly 130 coupled to the example power tool 100 via the clamping assembly 140, and the collar 132 coupled between the first end portion 135 of the arm assembly 134 and the housing of the example accessory device 150. In the example shown in FIG. 1B, an output axis B of the example accessory device 150 is substantially axially aligned with an output axis A of the example power tool 100 (corresponding to an input axis of the example accessory device 200), simply for purposes of discussion and illustration. The principles described herein are applicable to a coupling of accessory devices to an example power tool, with or without the example brace assembly, in which the output axis B of the example accessory device 150 is arranged differently with respect to the output axis A of the example power tool 100 including, for example, an offset parallel arrangement, an orthogonal arrangement, and other relative arrangements of the respective output axes of the and the power tool and accessory device coupled thereto.

Figure 2A:
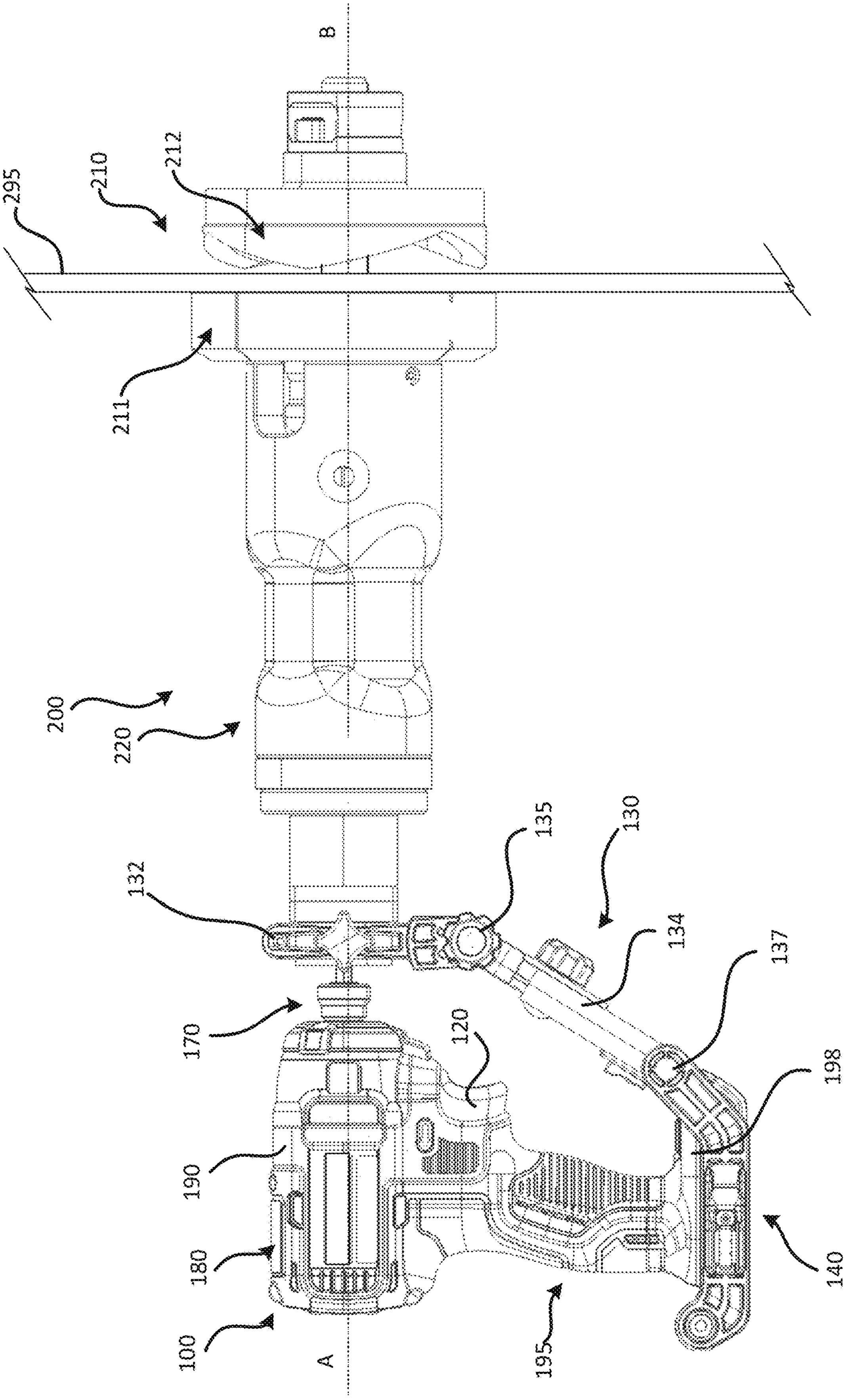
FIG. 2A is a side view of an example accessory device coupled to an example rotary power tool.

FIG. 2A is a side view of an example accessory device 200, in the form of a knockout tool or knockout accessory, coupled to the example power tool 100. In the example arrangement shown in FIG. 2A, the example accessory device 200 is arranged relative to a workpiece 295. The workpiece 295 may be a rigid sheet or plate type material such as, for example, metal sheet material, metal plate material, and the like, through which an opening is to be formed. The example accessory device 200 includes a die set 210 coupled to a knockout tool 220, with the workpiece 295 positioned between a cup portion 211 and a punch portion 212 of the die set 210. In the example arrangement shown in FIG. 2A, an output axis B of the example accessory device 200 is substantially aligned with the output axis A of the example power tool 100.

Figure 2B:
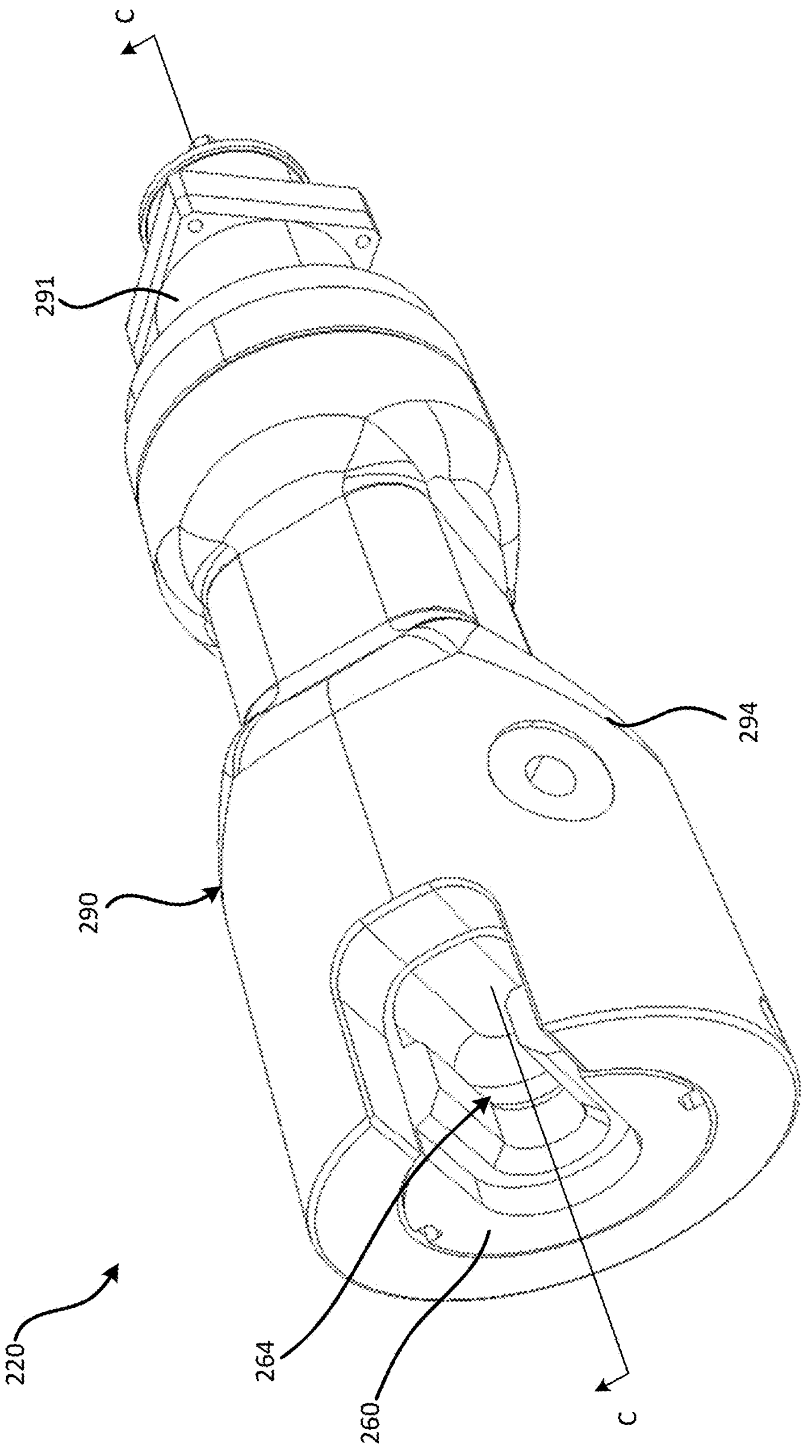
FIG. 2B is a first perspective view.
Figure 2C:
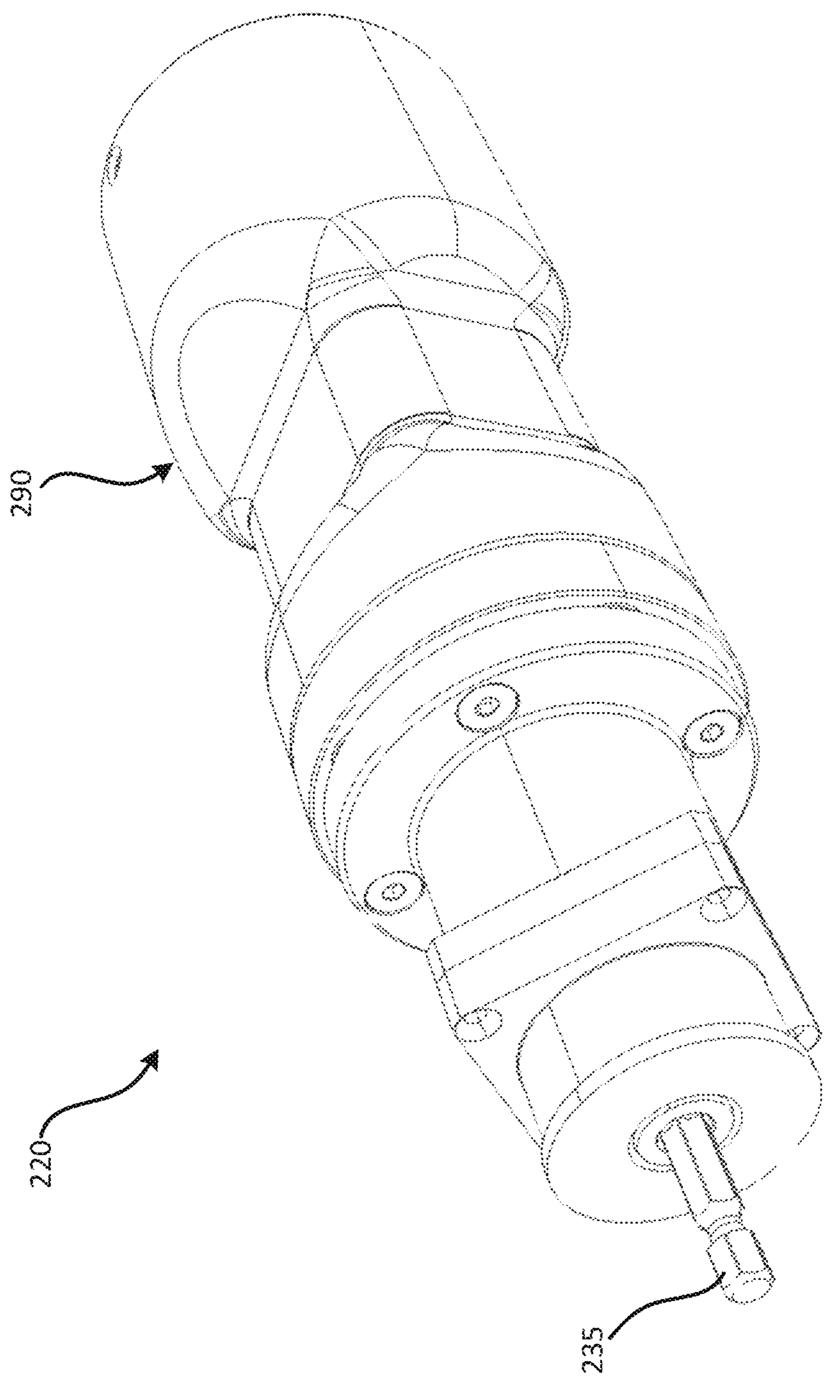
FIG. 2C is a second perspective view, of the example accessory device shown in FIG. 2A.
Figure 2D:
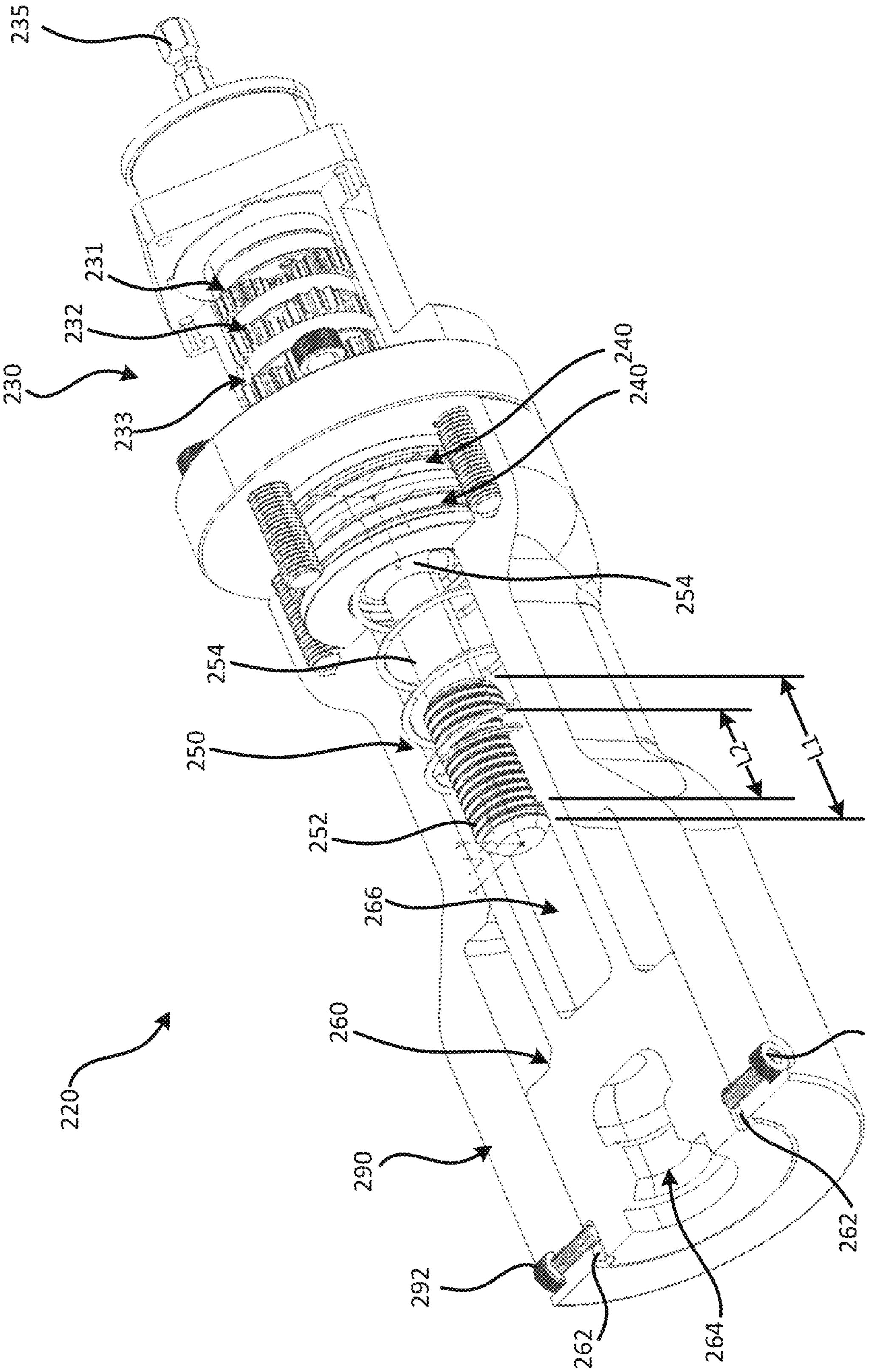
FIG. 2D is a first perspective view.
Figure 2E:
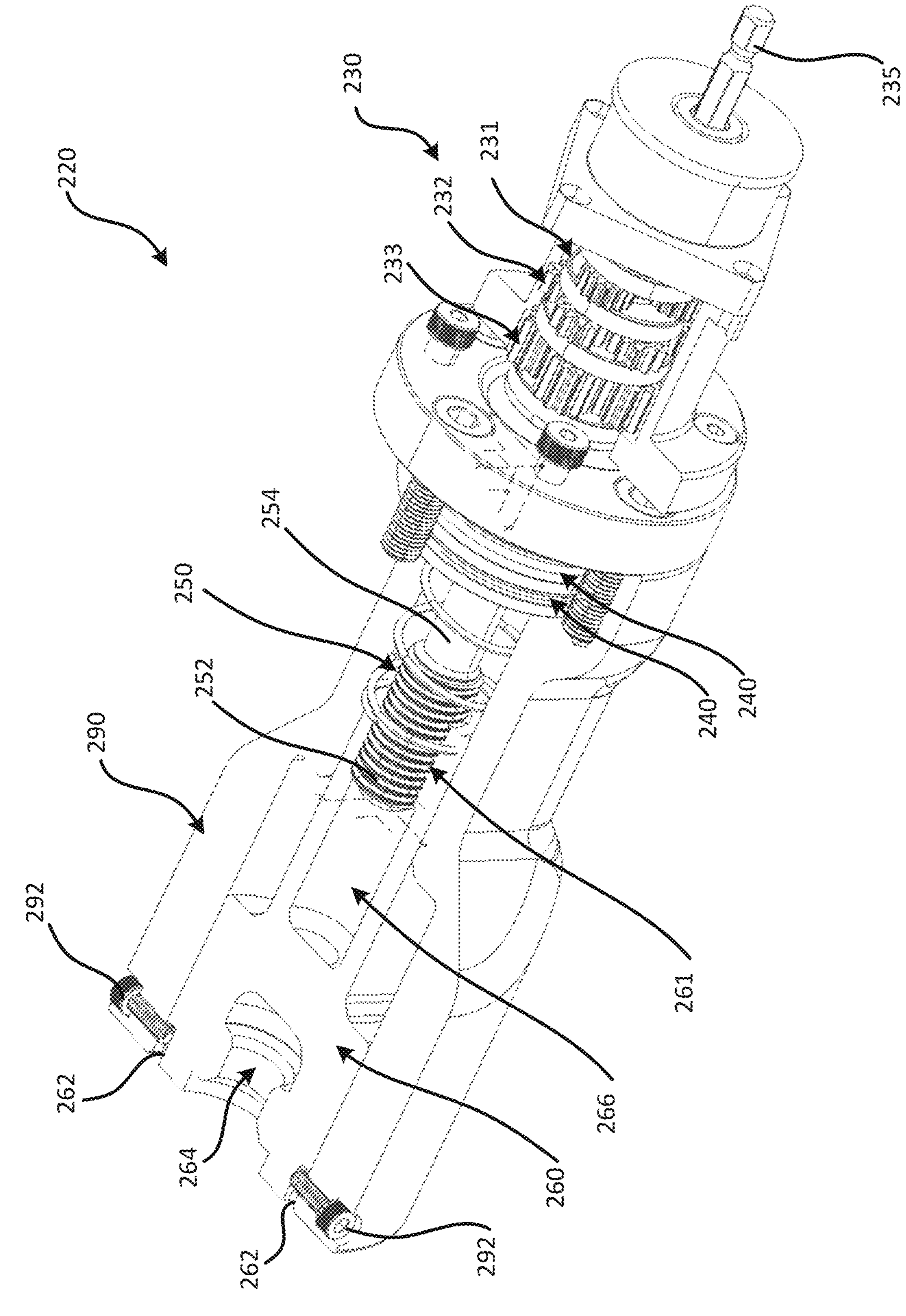
FIG. 2E is a second perspective view, of the example accessory device shown in FIGS. 2A-2C, with a portion of a housing removed.
Figure 2F:
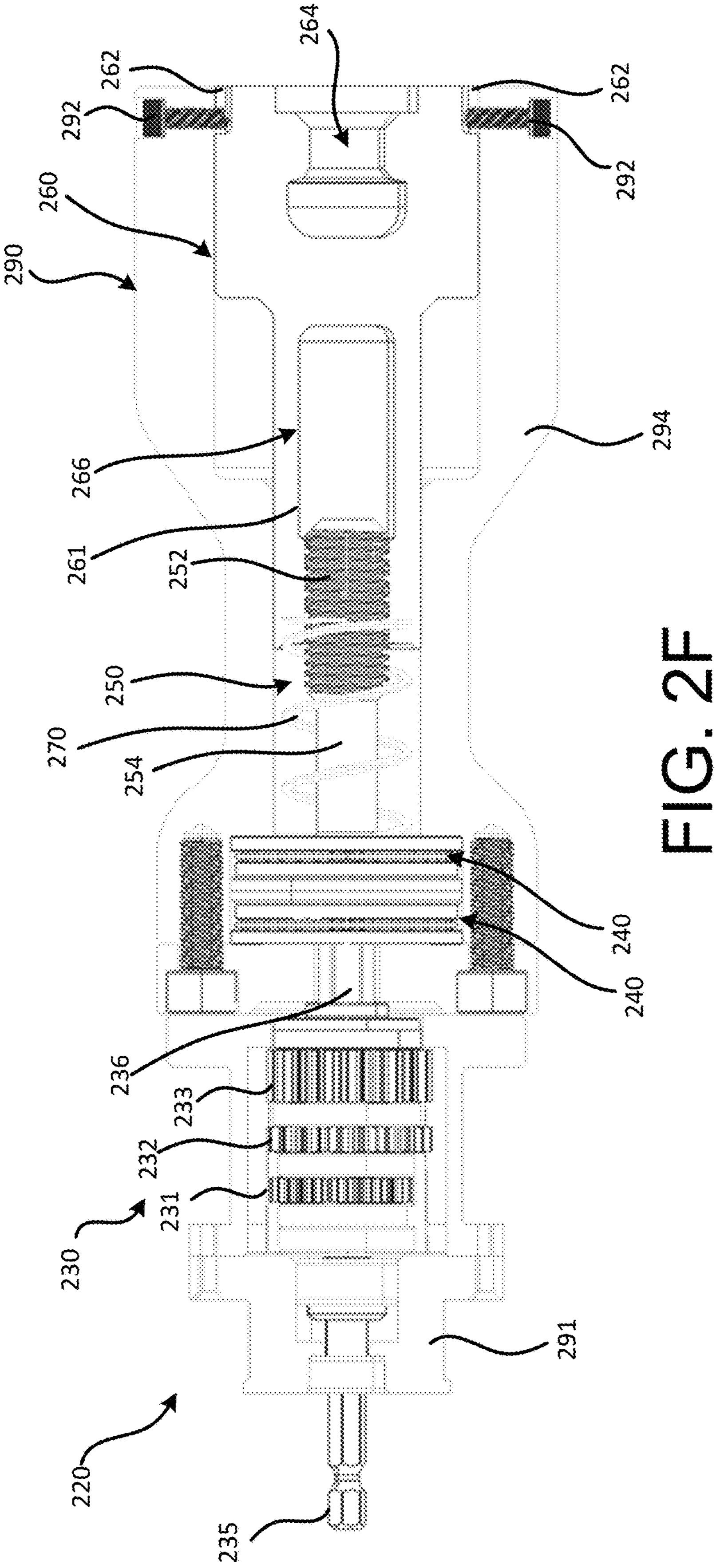
FIG. 2F is a cross-sectional view taken along line C-C of FIG. 2B.

FIG. 2B is a first perspective view, and FIG. 2C is a second perspective view, of the knockout tool 220 of the example accessory device 200. FIGS. 2D and 2E are perspective views of the knockout tool 220 of the example accessory device 200, with a portion of a housing 290 removed, so that internal components of the knockout tool 220 are visible. FIG. 2F is a cross-sectional view taken along line C-C of FIG. 2B. The die set 210 is not shown in FIGS.

Figure 2G:
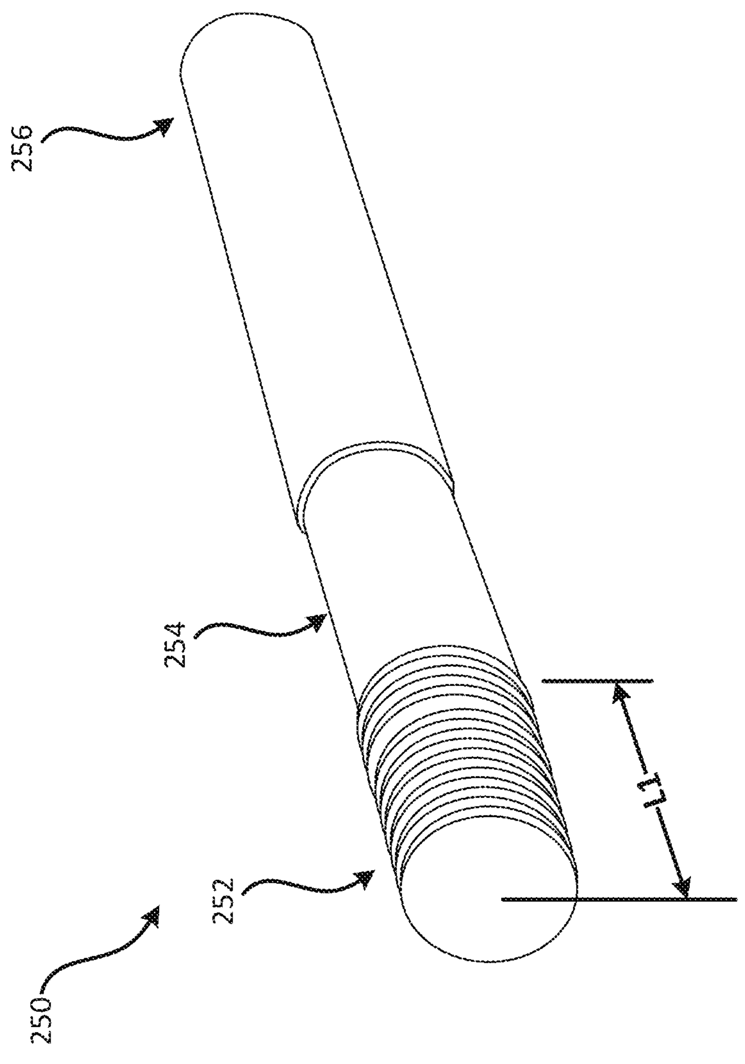
FIG. 2G is a perspective view of an example driving member of the example accessory device shown in FIGS. 2A-2F.

2B-2F. FIG. 2G is a perspective view of an example shaft defining a driving member 250 of the example knockout tool 220.

As shown in FIGS. 2B-2F, the housing 290 includes a transmission housing 291, and a body housing 294. The knockout tool 220 includes an input shaft 235 that receives a rotary input torque from a power tool to which the accessory device 200 is coupled. For example, the input shaft 235 may be coupled in the tool holder 170 of the example power tool 100 described above, so that a driving force generated by the power tool 100 is transmitted to the accessory device 200 via the input shaft 235. The input shaft 235 drives a transmission 230 received in the housing 290.

In the example arrangement shown in FIGS. 2B-2F, the transmission 230 includes a gear assembly including a plurality of gears. In the example arrangement shown in FIGS. 2B-2F, the gear assembly includes an inline arrangement of planetary gear sets, for example three stages of planetary gear sets in this example, including a first stage planetary gear set 231, a second stage planetary gear set 232, and a third stage planetary gear set 233. Each of the planetary gear sets 231, 232, 233 includes a sun gear driven by the input shaft 235, and a plurality of planet gears surrounding the respective sun gear, and in meshed engagement with the respective sun gear, that rotate in response to rotation of the respective sun gear. In the example arrangement shown in FIGS. 2B-2F, a size, for example, a dimension of the second stage planetary gear set 232 is greater than a corresponding size, for example a corresponding dimension of the first stage planetary gear set 231. In the example arrangement shown in FIGS. 2B-2F, a size, for example, a dimension of the third stage planetary gear set 233 is greater than a corresponding size, for example a corresponding dimension of the second stage planetary gear set 232. In some examples, the planetary gear sets, and in this particular arrangement, the third planetary gear set 233, is sized so as to be strong enough to support a desired level of output torque of the example accessory device 200. The planetary gear sets 231, 232, 233 are arranged so as to provide for the desired level of speed reduction and torque increase, from a speed and torque introduced into the transmission 230 at the input shaft 235, to a speed and torque output at an output shaft 236 of the transmission 230. For example, a size and/or a number of teeth on the sun gear, planetary gears, and ring gear of each stage of the inline planetary transmission 230 are selected so as to provide for the desired speed reduction and torque increase, in a manner understood by one of ordinary skill in the art.

Rotation of the planetary gear sets 231, 232, 233 (in response to the force from the motor of the example power tool 100 conveyed to the transmission 230 via the input shaft 235) drives rotation, at the desired output speed, of the output shaft 236 of the transmission 230. In the example arrangement shown in FIGS. 2B-2F, the output shaft 236 of the transmission 230 is coupled for rotation with a driving shaft or a driving member 250, which are supported for rotation about a first axis relative to the housing by at least one bearing 240. In some examples, a plurality of bearings 240 support the output shaft 236 of the transmission 230 and the driving member 250. In some examples, the output shaft 236 and the driving member 250 may be the same component. In other examples, the driving member 250 may be the same as the input shaft 235 or may be directly coupled to the input shaft 235 without a transmission. In the illustrated example, the driving member 250 is in the form of a shaft or rod, including a threaded portion 252 at a first end portion thereof, an unthreaded portion 254 at an intermediate portion thereof, and a coupling portion 256 at the second end portion thereof.

As shown in FIGS. 2D and 2E, a driven member 260 in the form of a power shaft or carrier nut is at least partially received in the housing 290. In some examples, the driven member 260 is coupled in the housing 290 such that rotation of the driven member 260 is restricted, and the driven member 260 is movable axially along a second axis relative to the housing 290. In some examples, rotation of the driven member 260 is restricted by a shape, for example, an external contour, of the driven member 260, and an interface thereof with a corresponding internal shape, or contour of corresponding portions of the housing 290. In some examples, external surface(s) of the driven member 260 incorporate flat portions that interface with corresponding interior surface portions of the housing 290 to restrict rotation of the driven member 260. In the example arrangement shown in FIGS. 2D and 2E, pins 292 extend through respective openings in the housing 290 and into corresponding guide slots 262 formed in an outside of the driven member 260. In some examples, engagement of the end portions of the pins 292 in the corresponding guide slots define a stopping mechanism that restricts further axial travel of the driven member 260, and disengagement of the driven member 260 from the driving member 250. A second cavity 264 is formed in an end portion of the driven member 260. The second cavity 264 is configured to provide for engagement of a pull rod 214 (see FIGS. 3A and 3B) providing for removable coupling of one of a plurality of different die sets to the knockout tool 220. This allows for a variety of different sizes and/or configurations of die sets to be selectively attached to the knockout tool 220. A first cavity 266 is formed in an end portion of the driven member 260, opposite the second cavity 264. At least a portion of the first cavity 266 is threaded, so as to selectively engage the threaded portion 252 of the driving member 250, as the driving member 250 rotates in response to the rotary force. For example, the first cavity 266 may include a threaded portion 261, for example, at an inlet into the first cavity 266, to selectively engage a corresponding portion of the threaded portion 252 of the driving member 250.

In the example arrangement shown in FIGS. 2D-2F, a biasing member 270 may be in the form of a spring positioned between the at least one bearing 240 and the driven member 260. Any of a variety of springs may be used. In some examples, the biasing member 270 is in the form of a coil spring, a compression spring, a wave spring, or a leaf spring. A first end portion of the biasing member 270 is positioned against the at least one bearing 240. A second end portion of the biasing member 270 is positioned against the second end portion of the driven member 260, surrounding an opening into the first cavity 266.

Figure 3A:
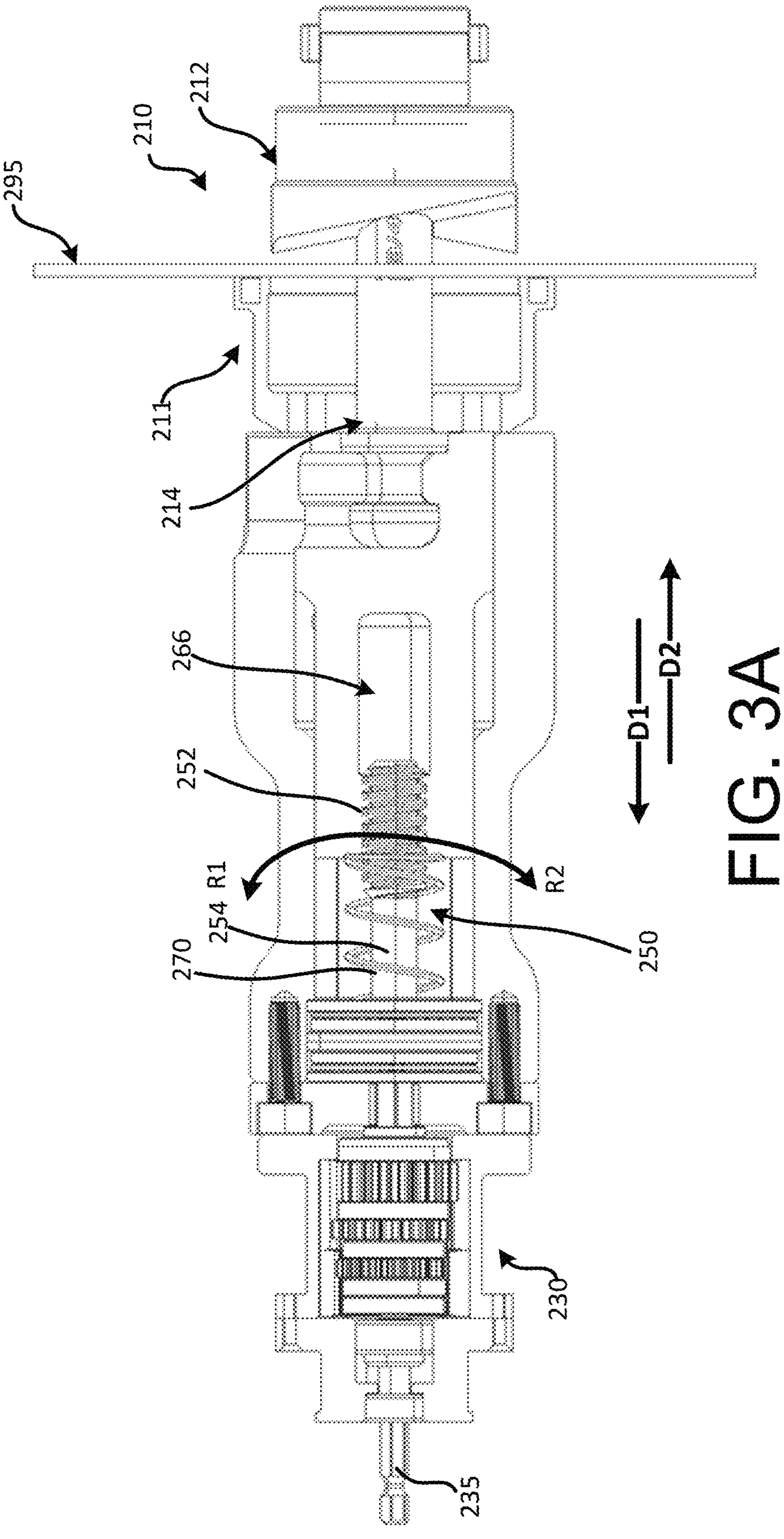
FIGS. 3A and 3B illustrate operation of the example accessory device shown in FIGS. 2A-2G.
Figure 3B:
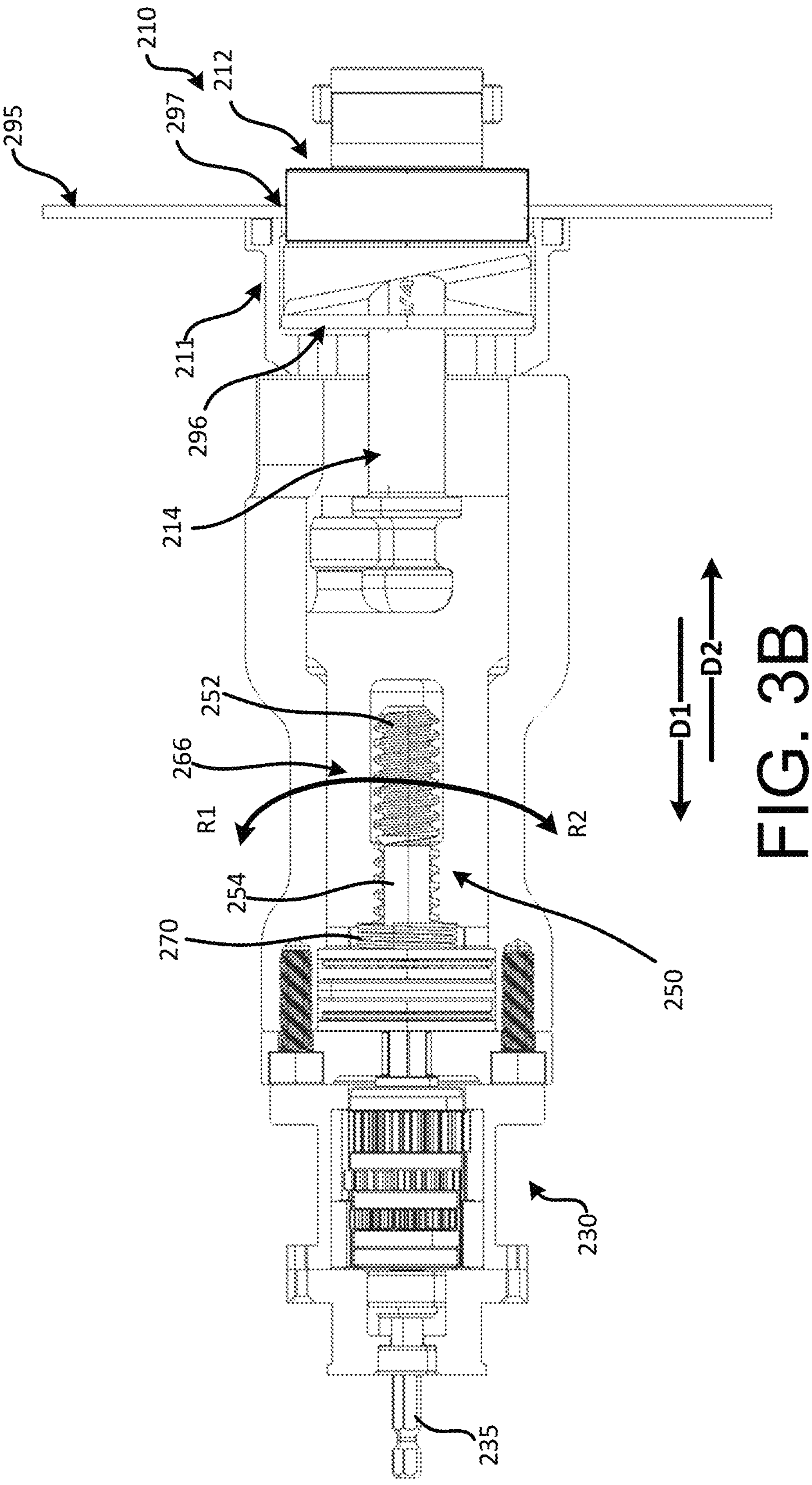

FIGS. 3A and 3B are cross-sectional views, illustrating operation of the example accessory device 200, in accordance with implementations described herein.

In FIG. 3A, the accessory device 200 has been positioned relative to the workpiece 295 to prepare for forming an opening, i.e., punching or knocking out a hole, through the workpiece 295. In this example arrangement, the knockout tool 220 and the cup portion 211 of the die set 210 are positioned on a first side of the workpiece 295, and the punch portion 212 is positioned on a second side of the workpiece 295. In this example arrangement, the pull rod 214 extends from the punch portion 212, through a pilot hole formed in the workpiece 295, and through the cup portion 211 of the die set 210, for engagement with the second cavity 264 of the driven member 260. This arrangement allows the punch portion 212 to move together with the driven member 260. In particular, this arrangement allows the punch portion 212 to move axially in response to axial movement of the driven member 260. In this position, the biasing member 270 is in an at rest, or unactuated, state.

A rotational force, generated by the motor of the example power tool 100 to which the accessory device 200 is coupled, is transmitted to the input shaft 235, through planetary gear sets 231, 232, 233 and to the output shaft 236 of the transmission 230. This, in turn causes rotation of the driving member 250, for example in the direction of the arrow R1, due to the coupling of the driving member 250 to the output shaft 236 by the at least one bearing 240. The threaded portion 252 of the driving member 250 is engaged in the threaded portion of the first cavity 266 formed in the driven member 260 in response to rotation of the driving member 250 in the direction of the arrow R1. As rotation of the driven member 260 is restricted, continued rotation of the driving member 250 in the direction of the arrow R1, and continued engagement between the threaded portion 252 of the driving member 250 and the threaded portion 261 of the first cavity 266, draws the threaded portion 252 of the driving member 250 further into the first cavity 266, and causes axial movement of the driven member 260 in the direction of the arrow D1 as the driving member 250 is drawn further into the first cavity 266. Axial movement of the driven member 260 in the direction of the arrow D1 causes compression of the biasing member 270 between the driven member 260 and the bearing 240.

That is, continued rotation of the driving member 250 in the direction of the arrow R1 draws the driven member 260 axially through the interior of the housing 290 of the knockout tool 220 in the direction of the arrow D1. As the punch portion 212 is coupled to and moves together with the driven member 260 via the pull rod 214, the punch portion 212 also moves in the direction of the arrow D1. Continued axial movement in the direction of the arrow D1 (in response to continued rotation of the driving member 250 in the direction of the arrow R1) draws the punch portion 212 through the workpiece 295, as shown in FIG. 3B. Movement of the punch portion 212 of the die set 210 through the workpiece 295 in this manner forms an opening 297 in the workpiece 295 along the periphery of the punch portion 212. Material 296 removed from the workpiece 295 is contained within an interior of the cup portion 211.

In the position shown in FIG. 3B, the opening 297 has been formed in the workpiece 295, and peripheral walls of the punch portion 212 are received within the interior of the cup portion 211 of the die set 210. Material 296 removed from the workpiece 295 is contained within an interior of the cup portion 211. In this position, the driving member 250 has moved far enough into the first cavity 266 so that the unthreaded portion 254 of the driving member 250 is now positioned at the threaded portion 261 of the first cavity 266, thus disengaging the driven member 260 and the driving member 250. In the event that a user of the power tool 100 continues to apply power to the power tool 100 (and the driving member 250 continues to rotate in response) after the material 296 has been removed to form the opening 297, there is no more axial movement of the driven member 260 in the direction D1, due to the disengagement of the threaded portion 261 of the first cavity 266 and the driving member 250. Thus, the unthreaded portion 254 of the driving member 250 represents a dead zone, precluding further axial movement of the driven member 260, and further axial movement of the punch portion 212 coupled thereto by the pull rod 214. In some examples, a length L1 of the threaded portion 252 of the driving member 250 and/or a length L2 of the threaded portion of the first cavity 266 may be set to correspond to a depth of the punch portion 212 and/or a depth of the cup portion 211 of the die set 210, so as to define a stopping mechanism that inhibits or restricts continued axial movement.

Operation of the power tool 100 in an opposite direction may cause rotation of the driving member 250 in the direction of the arrow R2, with the biasing member assisting in causing re-engagement of the threaded portion 252 of the driving member 250 with the threaded portion of the first cavity 266, and movement of the driven member 260 in the direction of the arrow D2. Operation in this manner may provide for reset of the knockout tool 220 for formation of the next opening, for release of the pull rod 214 and/or die set 210 from the knockout tool 220, for removal of the workpiece 295 from the cup portion, and the like. The biasing member 270 may exert a biasing force between the driven member 260 and the bearing 240, to maintain the driven member 260 in the at rest position shown in FIG. 3A.

Example housing 290 of knockout tool 220 may be relatively compact while still providing substantial pulling power capability. For example, a volume of housing 290 may be between approximately 300 $cm^3$ and approximately 500 $cm^3$, and in some examples between approximately 350 $cm^3$ and approximately 450 $cm^3$, and in some examples, approximately 390 $cm^3$.

Example transmission 230 of knockout tool 220 may be configured to provide a substantial speed reduction and corresponding substantial increase in driving torque. In some examples, a speed reduction ratio of the transmission is between approximately 50:1 and 100:1, and in some examples, the speed reduction ratio of the transmission is approximately 64:1.

Example knockout tool 220 is configured to generate a substantial amount of axial pulling force for a given driving torque input from a power tool such as power tool 100. In some examples, assuming an input driving torque of approximately 1.5 Nm, knockout tool 220 may be configured to generate at least approximately 20 kN of axial pulling force at the driven member 260, and in some examples, at least approximately 30 kN of axial pulling force at the driven member 260. The example knockout tool 220 also may be configured to provide a high pulling force in a compact tool. For example, the knockout tool may have a ratio of pulling force to a housing volume of approximately 0.07 $kN/cm^3$ to approximately 0.08 $kN/cm^3$.

Figure 4A:
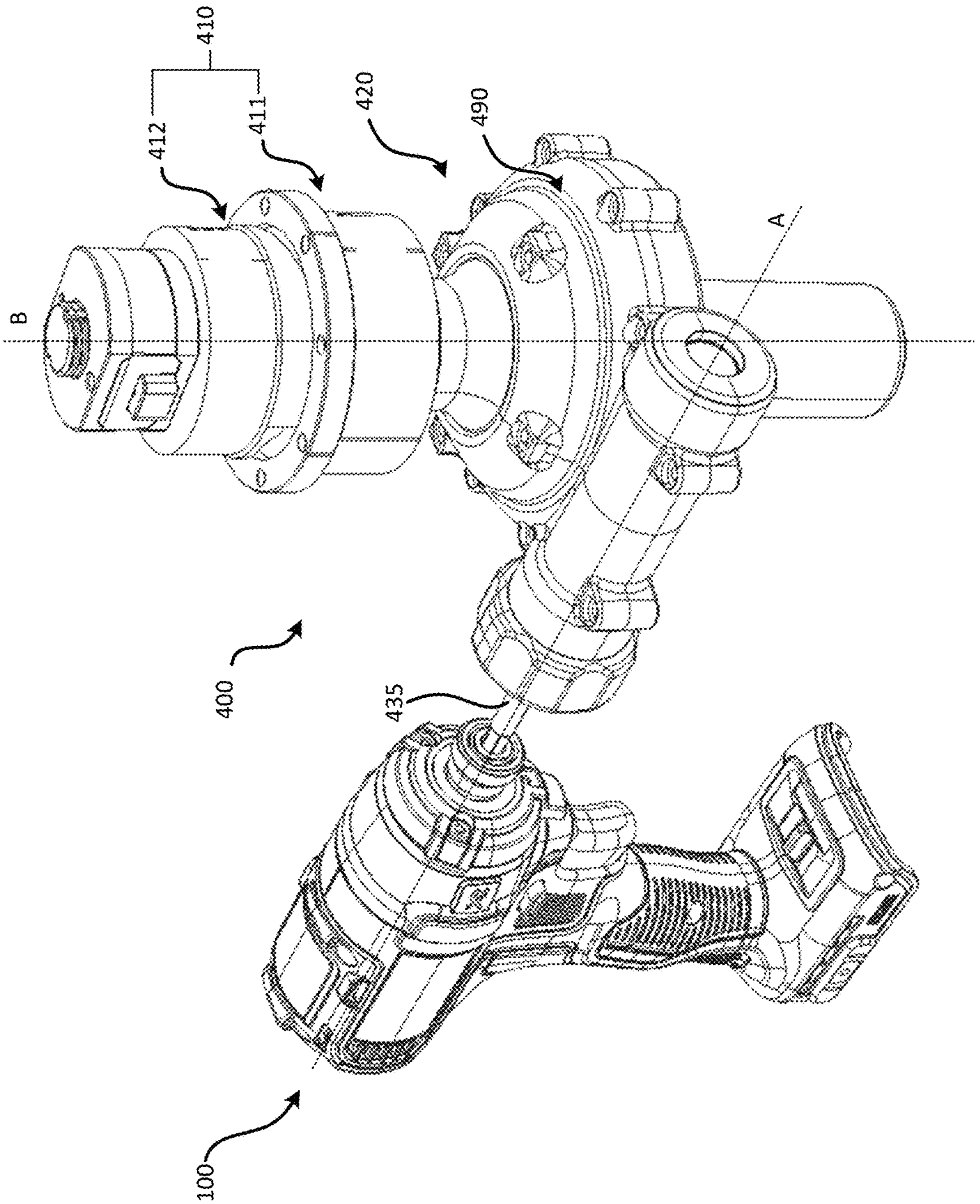
FIG. 4A is a perspective view illustrating an example accessory device coupled to an example rotary power tool.

FIG. 4A is a side perspective of an example accessory device 400, in the form of a knockout tool or knockout accessory, coupled to the example power tool 100. The example accessory device 400 includes a die set 410 coupled to a knockout tool 420, for forming or punching or knocking an opening through a workpiece made of a rigid sheet or plate type material. The die set 410 includes a cup portion 411 and a punch portion 412. The cup portion 411 and the punch portion 412 of the die set 410 are similar to the cup portion 211 and the punch portion 212 of the die set 210 described above, and thus duplicative detailed description will be omitted. In the example arrangement shown in FIG. 4A, the output axis B of the example accessory device 400 is substantially orthogonal to the output axis A of the example power tool 100.

Figure 4B:
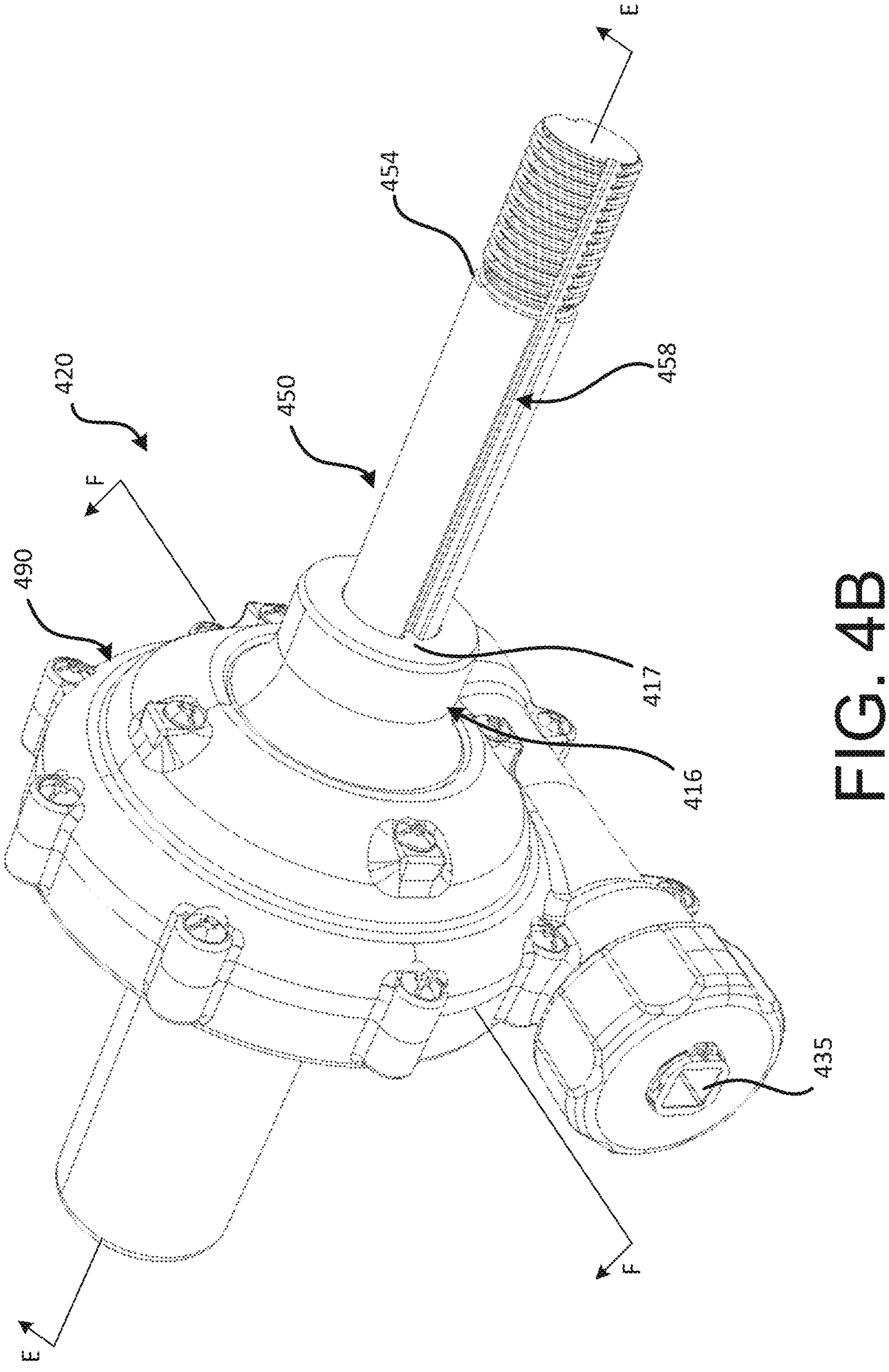
FIG. 4B is a perspective view of the example accessory device shown in FIG. 4A.
Figure 4C:
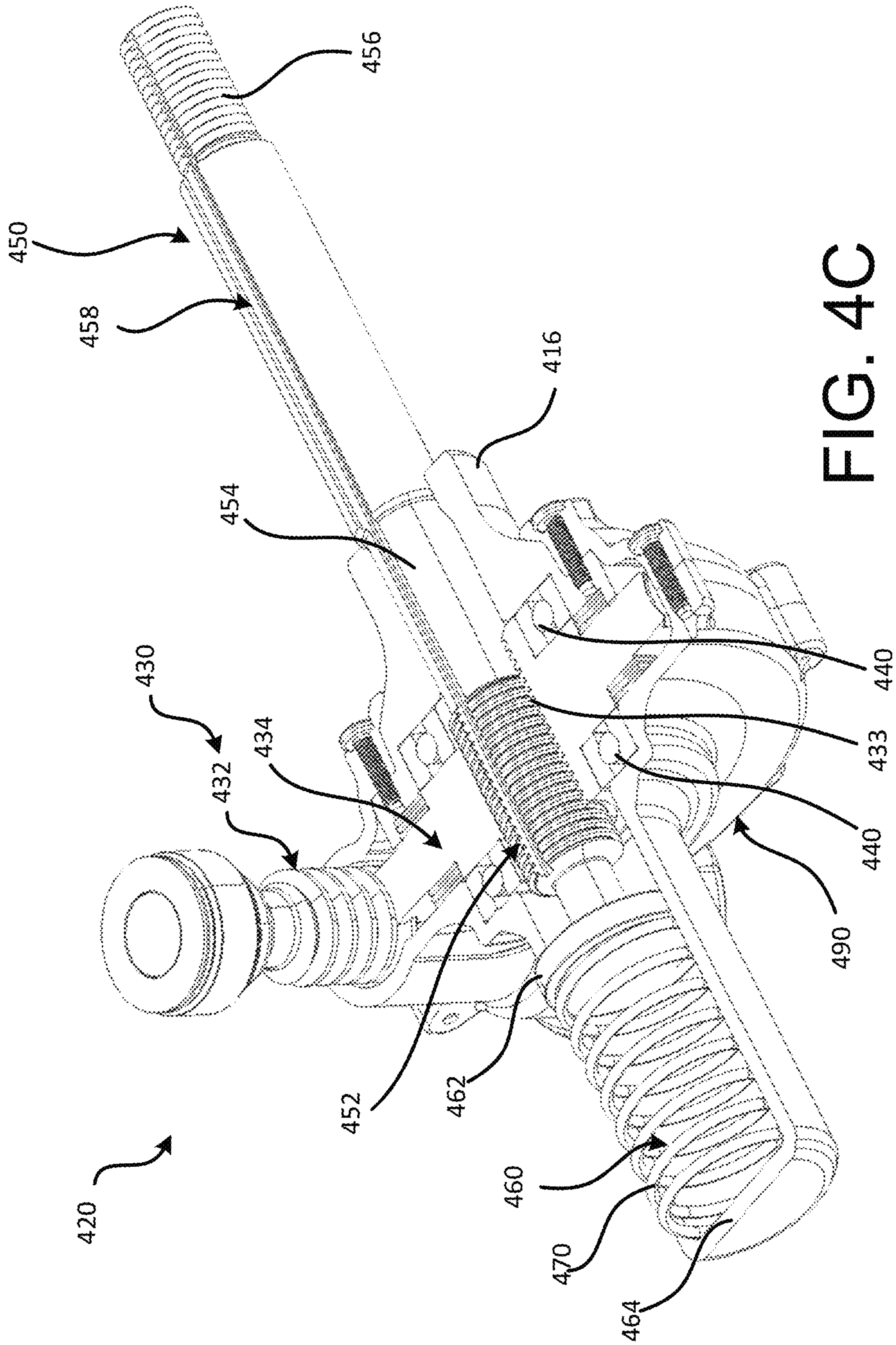
FIG. 4C is a first perspective view.
Figure 4D:
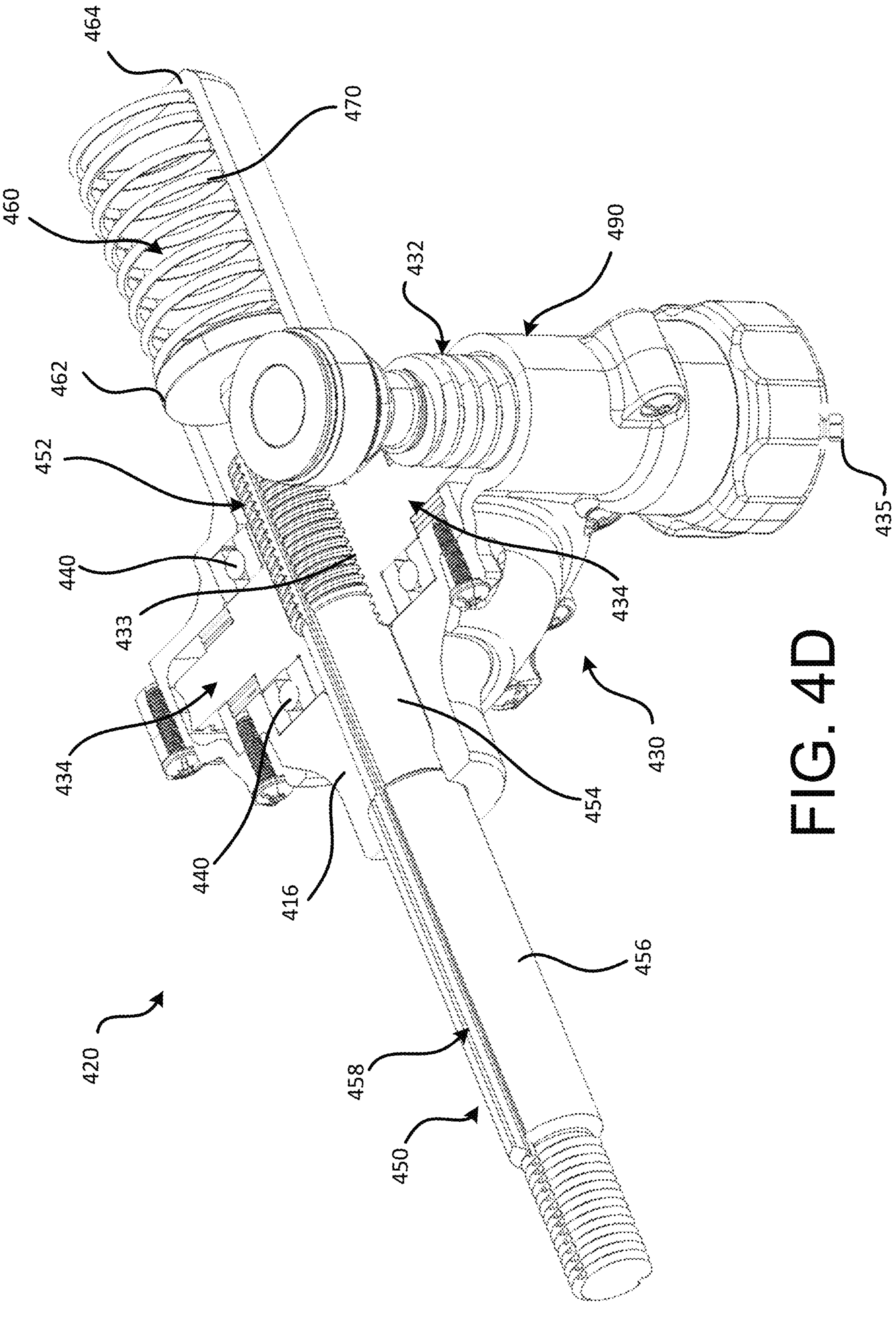
FIG. 4D is a second perspective view, of the example accessory device shown in FIGS. 4A and 4B, with a portion of a housing removed.
Figure 4E:
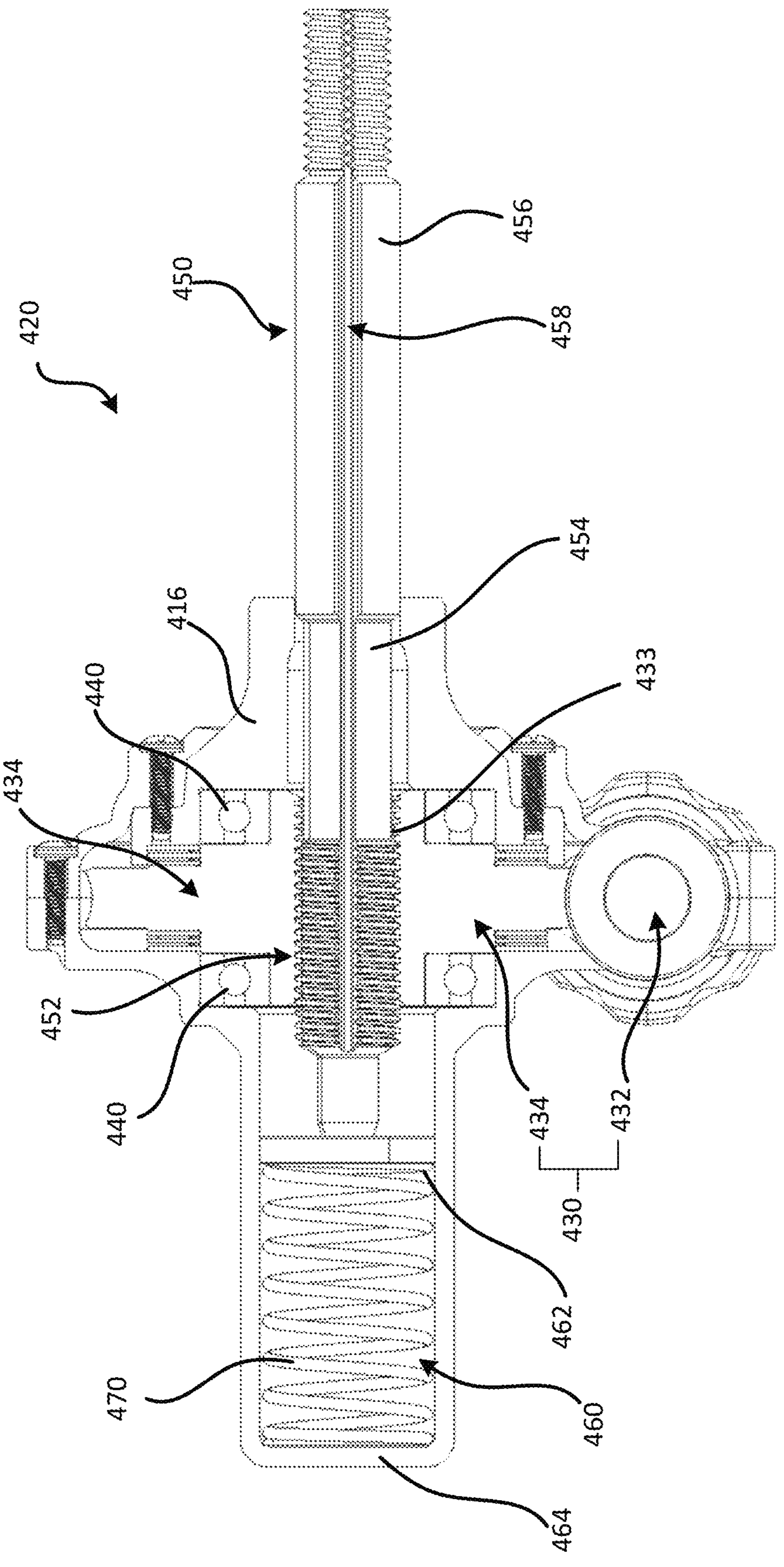
FIG. 4E is a cross-sectional view taken along line E-E of FIG. 4B.
Figure 4F:
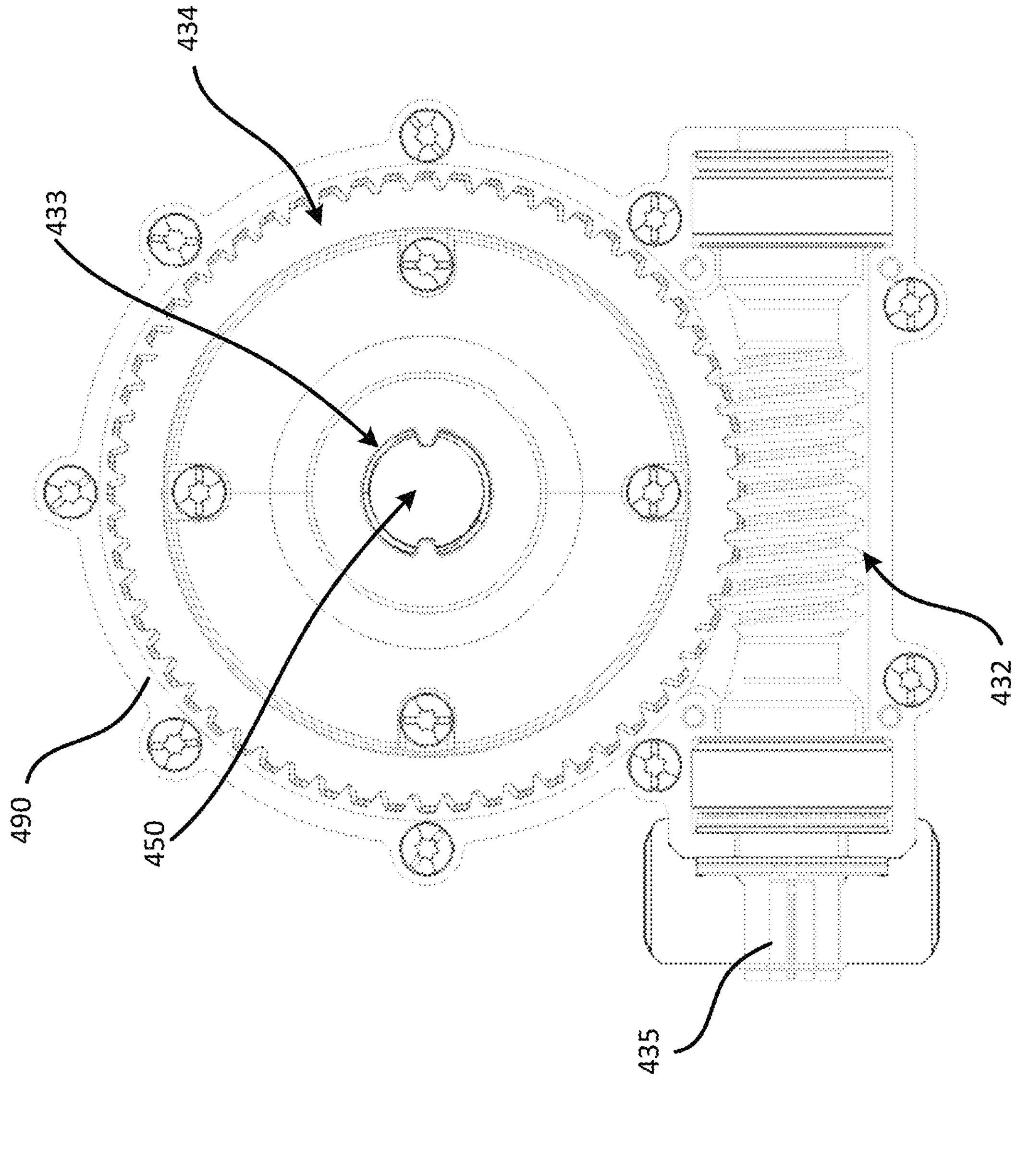
FIG. 4F is a cross-sectional view taken along line F-F of FIG. 4B.

FIG. 4B is a perspective view of the knockout tool 420, without the die set 410 attached. FIG. 4C is a first perspective view, and FIG. 4D is a second perspective view, of the knockout tool 420 of the example accessory device 400, with a portion of a housing 490 removed, so that internal components of the knockout tool 420 are visible. FIG. 4E is a cross-sectional view taken along line E-E of FIG. 4B. FIG. 4F is a cross-sectional view taken along line F-F of FIG. 4B.

As shown in FIGS. 4B-4F, the knockout tool 420 includes an input shaft 435 at least partially received in the housing 490 that receives a rotary input torque from a power tool to which the accessory device 400 is coupled. For example, the input shaft 435 may be coupled in the tool holder 170 of the example power tool 100 described above, so that a driving force generated by the power tool 100 is transmitted to the accessory device 400 via the input shaft 435. The input shaft 435 drives a transmission 430 received in the housing 490.

In the example arrangement shown in FIGS. 4B-4F, the transmission 430 includes a gear assembly including a plurality of gears. In the example arrangement shown in FIGS. 4B-4F, the gear assembly includes a worm gear 432 in meshed engagement with a driving member in the form of a worm wheel output gear 434. Alternatively, the worm wheel output gear 434 may be non-rotatably coupled to another driving member such as a driving shaft or driving member, similar to the driving member described above. In particular, gear teeth on an outer peripheral surface of the worm gear 432 are in meshed engagement with gear teeth on an outer peripheral surface of the worm wheel output gear 434. The worm wheel output gear 434 includes a central opening defining an internally threaded portion 433 of the worm wheel output gear 434. The worm gear 432 is coupled to, for example, fixedly coupled to the input shaft 435, such that the worm gear 432 rotates in response to, and together with, the input shaft 435 about the output axis A. The worm gear 432 is in meshed engagement with the worm wheel output gear 434, such that the worm wheel output gear 434 rotates about a driving axis B in in response to rotation of the worm gear 432. The worm wheel output gear 434 is mounted on bearings 440, with a rod or shaft defining a driven member 450 mounted in a central opening in the worm wheel output gear 434 defining an internally threaded portion 433 of the worm wheel output gear 434. In some examples, the worm gear 432 and the worm wheel output gear 434 are sized so as to provide the desired amount of speed reduction and increase in torque, and to support a desired level of output torque of the example accessory device 400.

In this example arrangement, the driven member 450 is coupled to and engaged with the driving member (e.g., the worm wheel output gear 434 or a separate driving member or driving shaft which is non-rotatably coupled to the worm wheel output gear 434), such that the driven member 450 is driven by the driving member in the form of the worm wheel output gear 434 and moves axially along the output axis B in response to rotation of the worm wheel output gear 434. The driven member 450 includes a threaded portion 452 at a first end portion thereof. The threaded portion 452 is configured to selectively engage the internally threaded portion 433 of the worm wheel output gear 434. The driven member 450 includes an unthreaded portion 454 at an intermediate portion thereof, and a coupling portion 456, to which the die set 410 is removably couplable, at a second end portion thereof. A slot 458 extends longitudinally, along a length of the driven member 450. One or more key features are configured to be engaged in the slot 458, including, for example, one or more key features 417 included on a nozzle 416 of the die set 410, and/or one or more key features included in other portions of the housing 490. The engagement of one or more of the key features in the slot 458 defines an anti-rotation feature, restricting rotation of the driven member 450. The engagement of one or more of the key features in the slot 458 guides axial movement of the driven member 450 within the housing 490 in response rotation of the worm gear 432 and worm wheel output gear 434.

As described above, rotation of the worm gear 432 (in response to the force from the motor of the example power tool 100 conveyed to the transmission 430 via the input shaft 435) about the output axis A drives rotation of the driving member in the form of the worm wheel output gear 434 about the output axis B, for example, at the desired output speed (and torque). The driven member 450 is driven by the driving member in the form of the worm wheel output gear 434, and is moved axially in response to rotation of the worm wheel output gear 434 about the output axis B. That is, engagement of at least one of the key features in the slot 458 restricts rotation of the driven member 450. Thus, engagement of the threaded portion 452 of the driven member 450 with the internally threaded portion 433 of the worm wheel output gear 434 causes axial movement of the driven member 450 in response to rotation of the worm wheel output gear 434.

In the example arrangement shown in FIGS. 4B-4F, a biasing member 470 is positioned between an end plate 462 and the end portion 464 of a cavity 460 formed within the housing 490 to selectively receive the threaded portion 452 of the driven member 450 as the driven member 450 moves axially. In some examples, the biasing member 470 is in the form of, e.g., a coil spring, a compression spring, a wave spring, or a leaf spring. A first end portion of the biasing member 470 is positioned against the end plate 462. A second end portion of the biasing member 470 is positioned against the end portion 464 of the cavity 460.

Figure 5A:
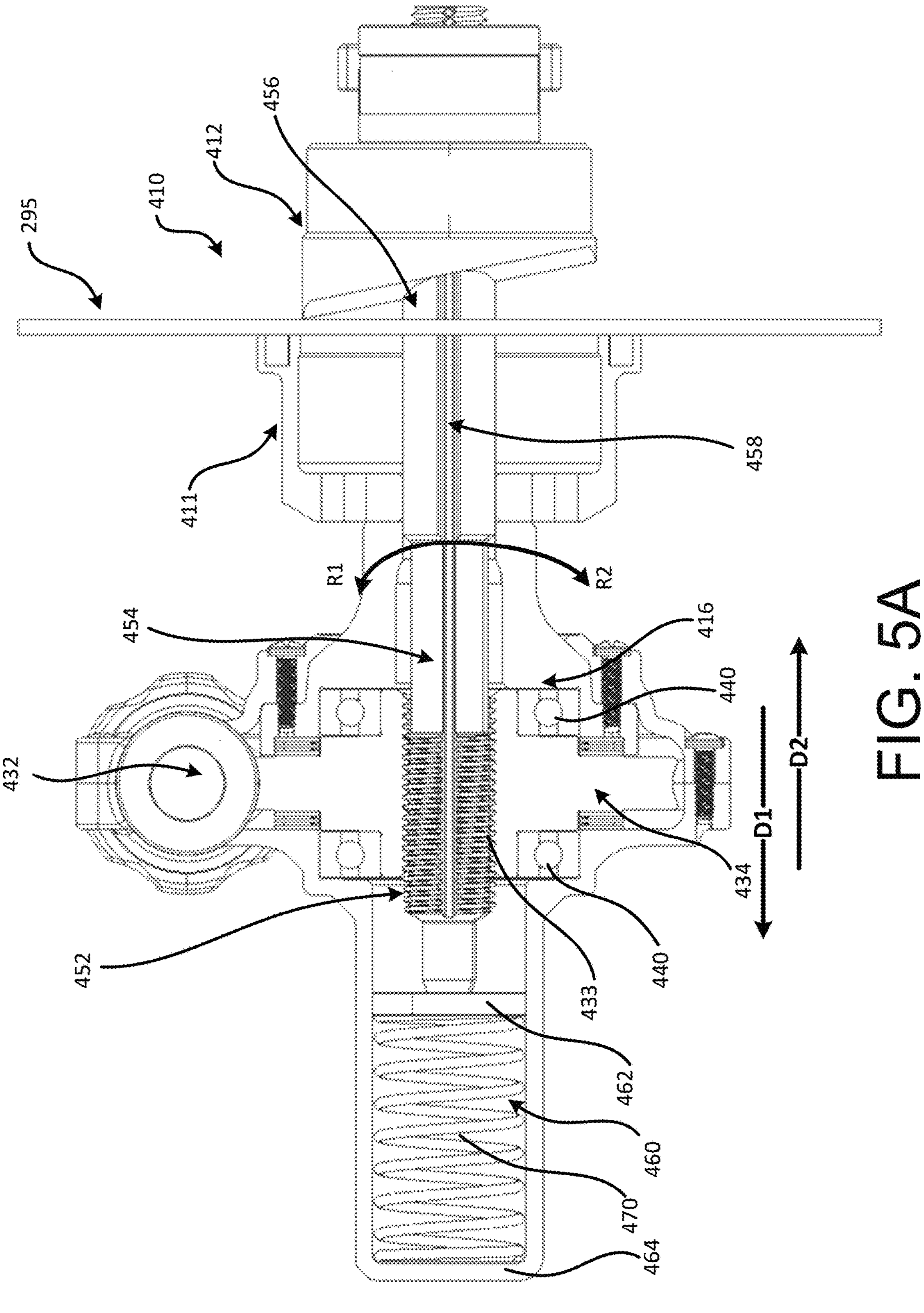
FIGS. 5A and 5B illustrate operation of the example accessory device shown in FIGS. 4A-4F.
Figure 5B:
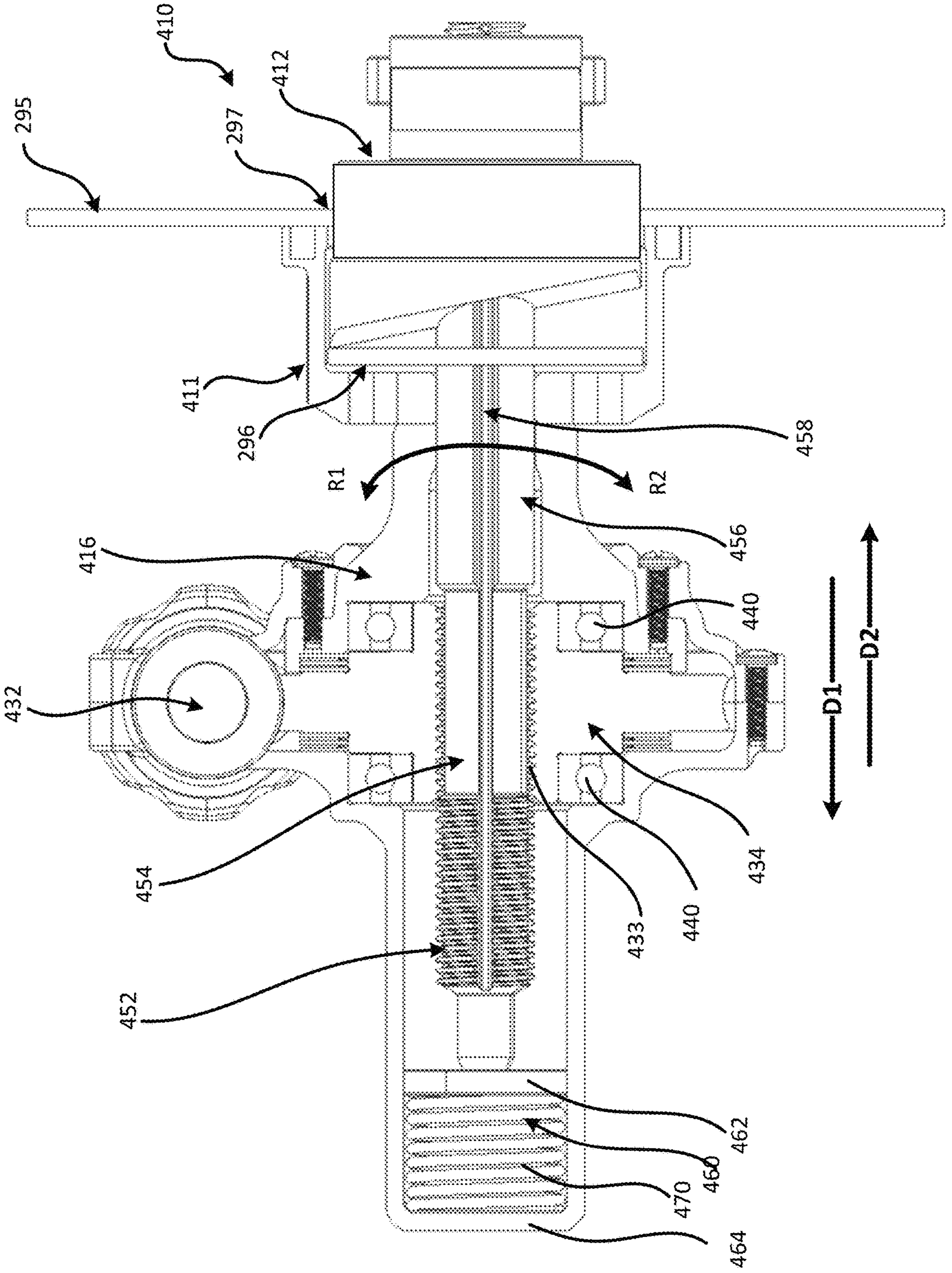

FIGS. 5A and 5B are cross-sectional views, illustrating operation of the example accessory device 400, in accordance with implementations described herein.

In FIG. 5A, the accessory device 400 has been positioned relative to the workpiece 295 to prepare for forming an opening, i.e., punching or knocking out a hole, through the workpiece 295. In this example arrangement, the knockout tool 420 and the cup portion 411 of the die set 410 are positioned on a first side of the workpiece 295, and the punch portion 412 of the die set 410 is positioned on a second side of the workpiece 295. In this example arrangement, the nozzle 416, the cup portion 411 and the punch portion 412 of the die set 410 are mounted on the coupling portion 456 of the driven member 450. The coupling portion 456 extends through a pilot hole formed in the workpiece 295, and into the punch portion 412. This arrangement allows the punch portion 412 to move together with the driven member 450. In particular, this arrangement allows the punch portion 412 to move axially in response to axial movement of the driven member 450. In this position, the biasing member 470 is in an at rest, or unactuated, state.

A rotational force, generated by the motor of the example power tool 100 to which the accessory device 400 is coupled, is transmitted to the input shaft 435, to rotate the worm gear 432 and the worm wheel output gear 434. Engagement of the threaded portion 452 of the driven member 450 in the internally threaded portion 433 of the worm wheel output gear 434, with at least one of the key features engaged in the slot 458, causes axial movement of the driven member 450 in the direction arrow D1 in response to rotation of the worm wheel output gear in the direction of the arrow R1. As rotation of the driven member 450 is restricted (by at least one of the key features engaged in the slot 458), continued rotation of the worm wheel output gear 434 in the direction of the arrow R1, and continued engagement between the internally threaded portion 433 of the worm wheel output gear 434 and the threaded portion 452 of the driven member 450, draws the threaded portion 452 of the driven member 450 further into the cavity 460, and continued axial movement of the driven member 450 in the direction of the arrow D1. Axial movement of the driven member 450 in the direction of the arrow D1 causes compression of the biasing member 470 between the end plate 462 and the end portion 464 of the cavity 460.

As the punch portion 412 is coupled to and moves together with the driven member 450 via the coupling portion 456 of the driven member 450, the punch portion 412 also moves in the direction of the arrow D1. Continued axial movement in the direction of the arrow D1 draws the punch portion 412 through the workpiece 295, as shown in FIG. 5B. Movement of the punch portion 412 of the die set 410 through the workpiece 295 in this manner forms an opening 297 in the workpiece 295 along the periphery of the punch portion 412. Material 296 removed from the workpiece 295 is contained within an interior of the cup portion 411.

In the position shown in FIG. 5B, the opening 297 has been formed in the workpiece 295, peripheral walls of the punch portion 212 are received within the interior of the cup portion 411, and material 296 removed from the workpiece 295 is contained within an interior of the cup portion 411. In this position, the driven member 450 has moved far enough in the direction of the arrow D1 so that the unthreaded portion 454 of the driven member 450 is now positioned at the internally threaded portion 433 of the worm wheel output gear 434. In this position, the threaded portions of the worm wheel output gear 434 and the driven member 450 are disengaged, and there is no more axial movement of the driven member 450, even in the event that a user of the power tool 100 continues to apply power to the power tool 100 (and the worm wheel output gear 434 continues to rotate in response). Thus, the unthreaded portion 454 of the driven member 450 represents a dead zone, precluding further axial movement of the driven member 450, and further axial movement of the punch portion 412 coupled thereto. In some examples, a length L1 of the threaded portion 452 of the driven member 450 and/or a length L2 of the internally threaded portion 433 of the worm wheel output gear 434 may be set to correspond to a depth of the punch portion 412 and/or a depth of the cup portion 411 of the die set 410, so as to define a stopping mechanism that inhibits or restricts continued axial movement.

Operation of the power tool 100 in an opposite direction may cause rotation of the worm wheel output gear 434 in the direction of the arrow R2, and re-engagement of the threaded portion 452 of the driven member 450 with the internally threaded portion 433 of the worm wheel output gear 434, and axial movement of the driven member 450 in the direction of the arrow D2. Operation in this manner may provide for release of the die set 410 from the workpiece 295. The biasing member 470 may exert a biasing force urges the driven member 450 back to the at rest position shown in FIG. 5A.

Example housing 490 of knockout tool 420 may be relatively compact while still providing substantial pulling power capability. For example, a volume of housing 490 may be between approximately 500 $cm^3$ and approximately 1000 $cm^3$, and in some examples approximately 585 $cm^3$.

Example transmission 430 of knockout tool 420 may be configured to provide a substantial speed reduction and corresponding substantial increase in driving torque. In some examples, a speed reduction ratio of the transmission is between approximately 60:1 and 65:1.

Example knockout tool 420 is configured to generate a substantial amount of axial pulling force for a given driving torque input from a power tool such as power tool 100. In some examples, assuming a input driving torque of 1.5 Nm, knockout tool 420 may be configured to generate at least approximately 20 kN of axial pulling force at the driven member 450, and in some examples, at least approximately 30 kN of axial pulling force at the driven member 450. The example knockout tool 420 also may be configured to provide a high pulling force in a compact tool. For example, the knockout tool may have a ratio of pulling force to a housing volume of approximately 0.05 kN/cm3 to approximately 0.06 kN/cm3.

Figure 6A:
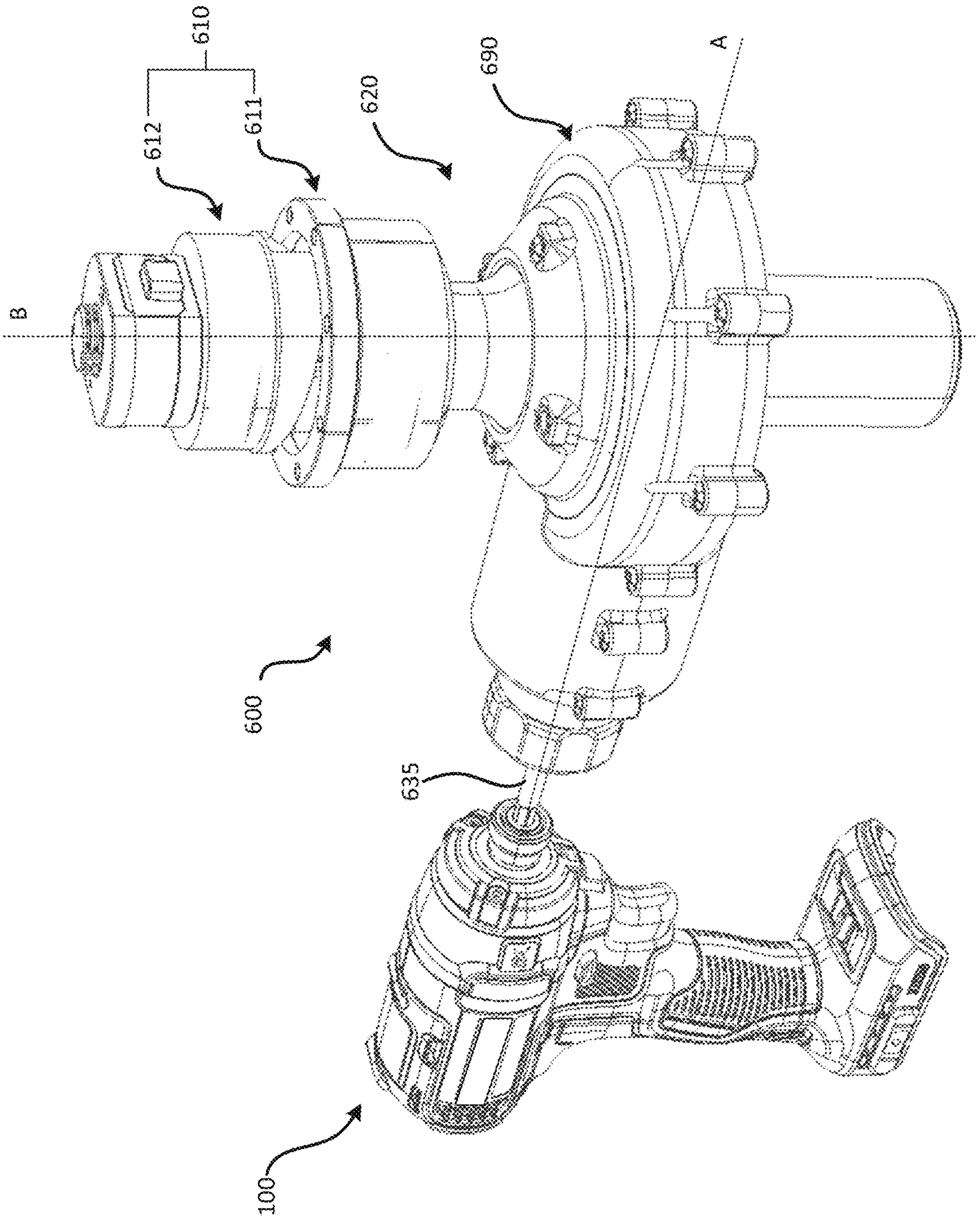
FIG. 6A is a perspective view illustrating an example accessory device coupled to an example rotary power tool.

FIG. 6A is a side perspective of an example accessory device 600, in the form of a knockout tool or knockout accessory, coupled to the example power tool 100. The example accessory device 600 includes a die set 610 coupled to a knockout tool 620, for forming or punching or knocking an opening through a workpiece made of a rigid sheet or plate type material. The die set 610 includes a cup portion 611 and a punch portion 612. The cup portion 611 and the punch portion 612 of the die set 610 are similar to those of the die sets 210, 410 described above, and thus duplicative detailed description will be omitted. In the example arrangement shown in FIG. 6A, the output axis B of the example accessory device 600 is substantially orthogonal to the output axis A of the example power tool 100.

Figure 6B:
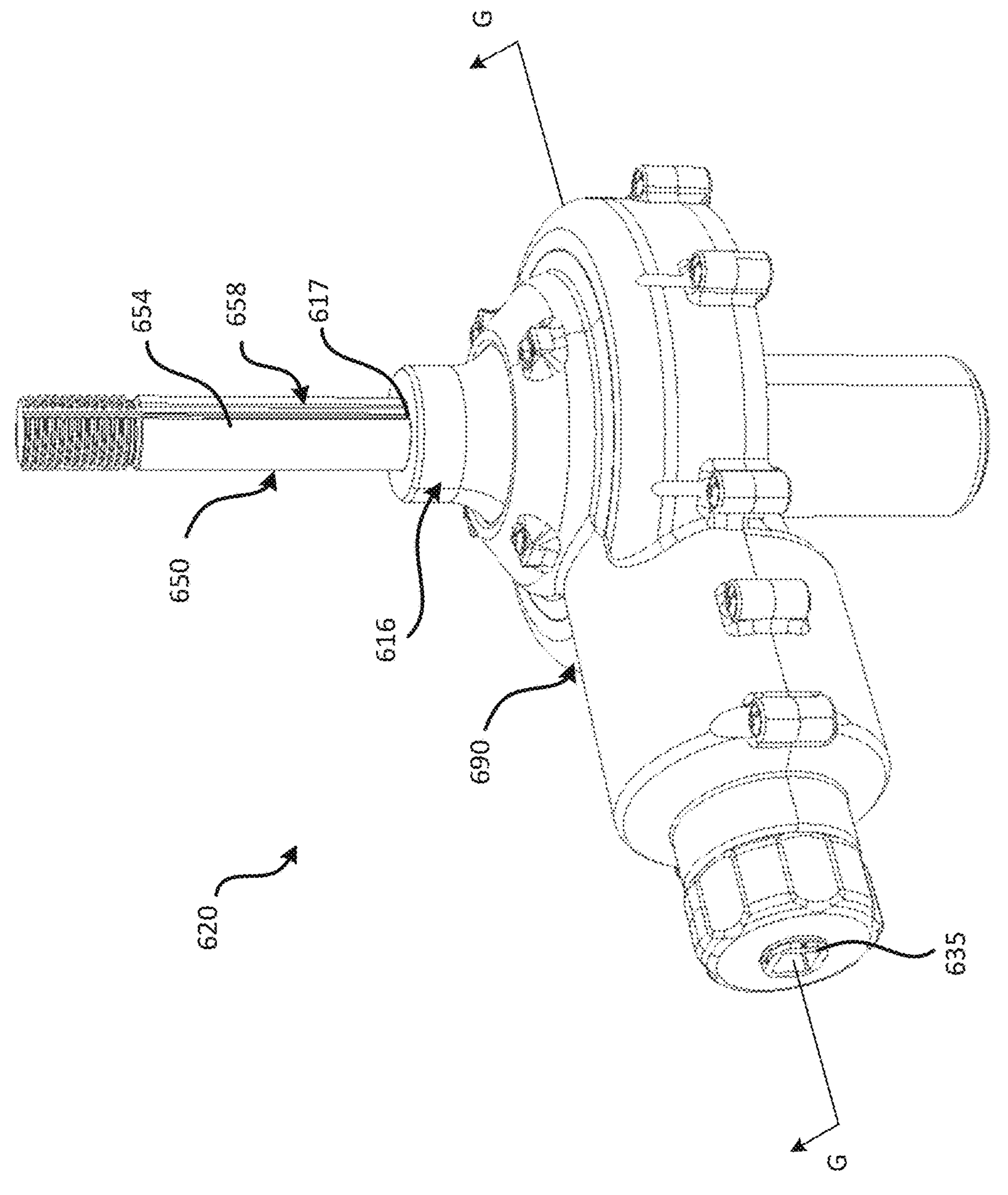
FIG. 6B is a perspective view of the example accessory device shown in FIG. 6A.
Figure 6C:
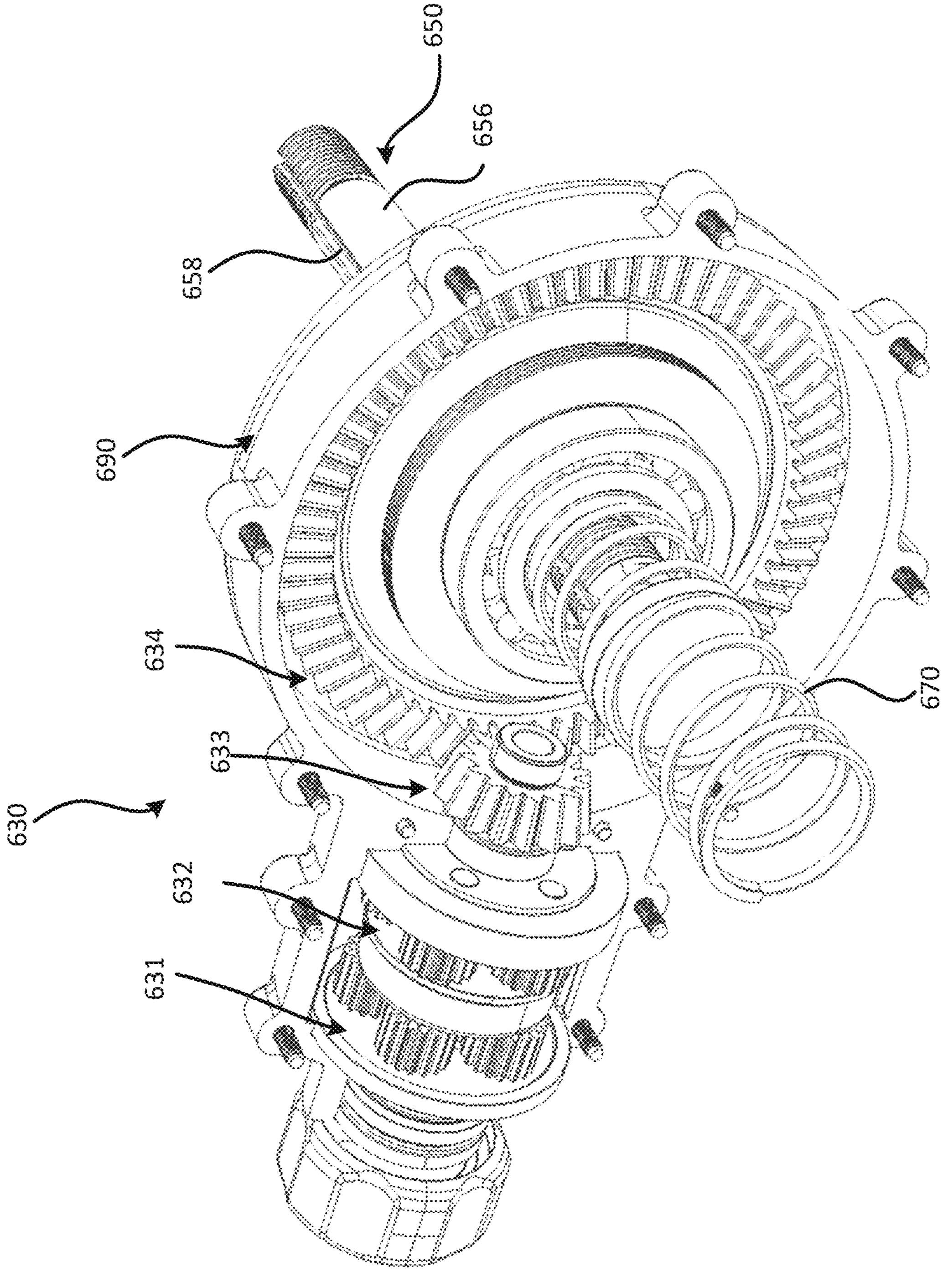
FIG. 6C is a first perspective view.
Figure 6D:
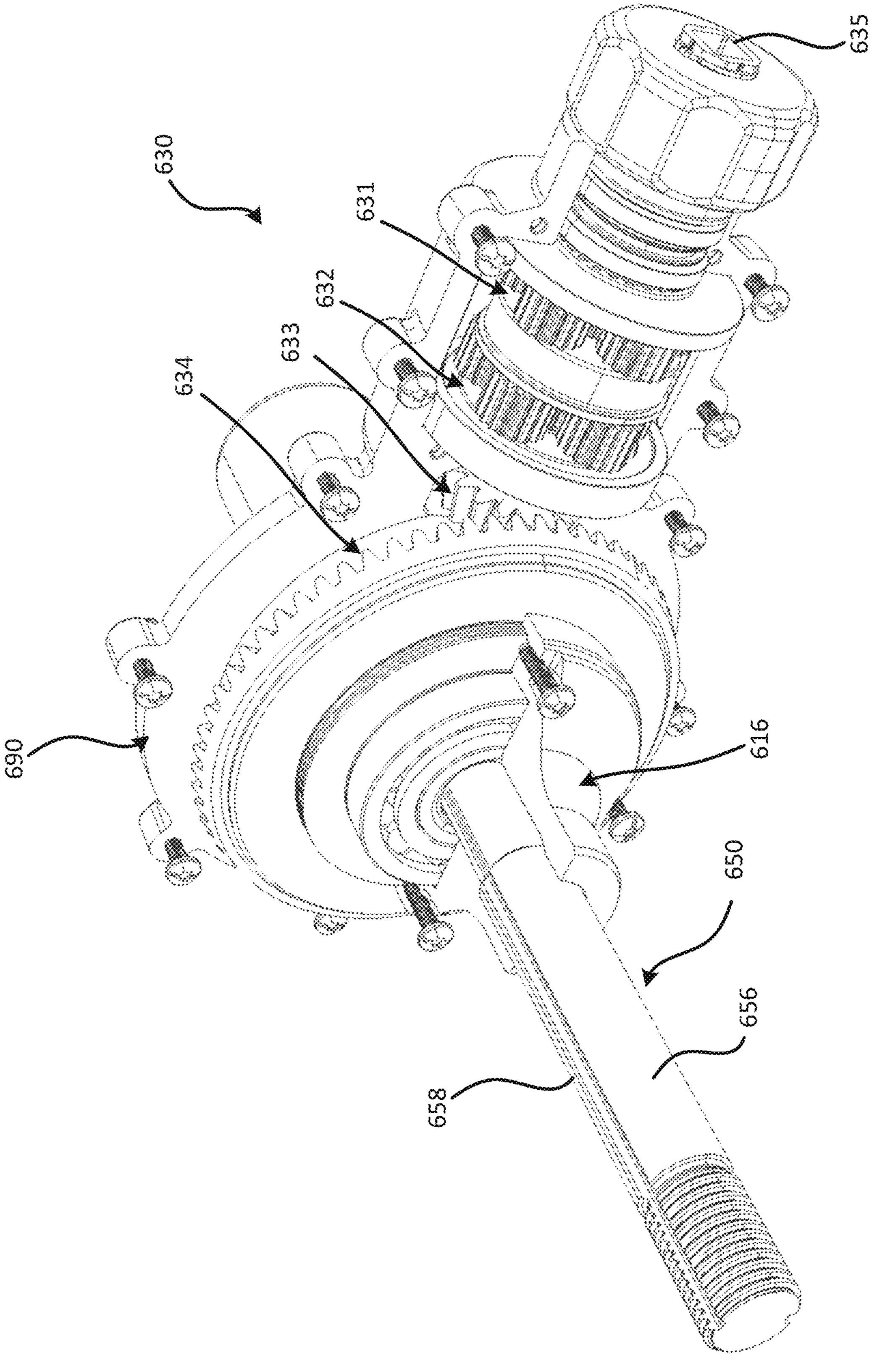
FIG. 6D is a second perspective view, of the example accessory device shown in FIGS. 6A and 6B, with a portion of a housing removed.
Figure 6E:
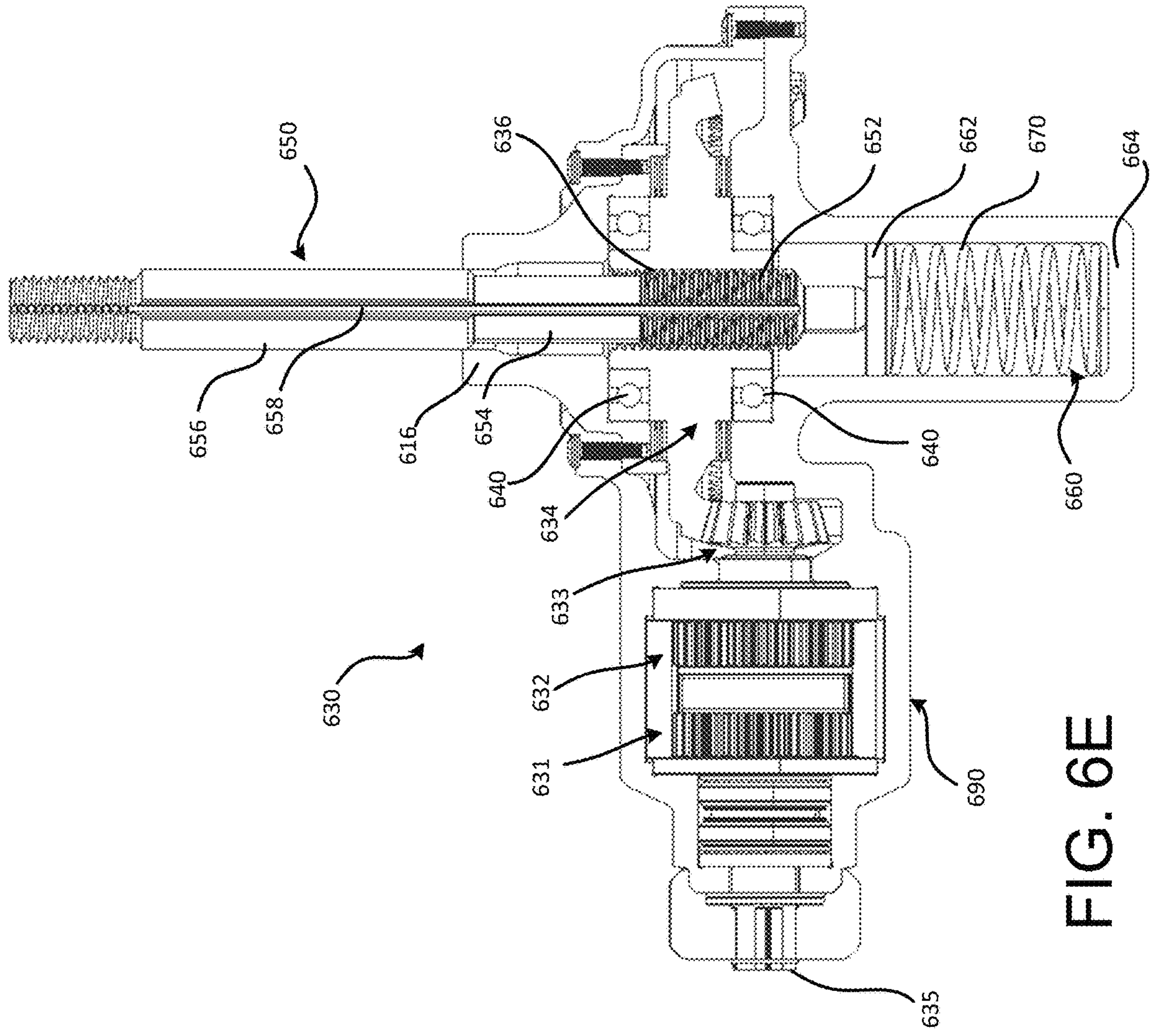
FIG. 6E is a cross-sectional view of the example accessory device, taken along line G-G of FIG. 6B.

FIG. 6B is a perspective view of the knockout tool 620, without the die set 610 attached. FIG. 6C is a first perspective view, and FIG. 6D is a second perspective view, of the example accessory device 600 with a portion of a housing removed so that internal components of the knockout tool 620 are visible. FIG. 6E is a cross-sectional view of the example accessory device 600, taken along line G-G of FIG. 6B.

As shown in FIGS. 6B-6E, the knockout tool 620 includes an input shaft 635 that receives an input force, for example, a rotary input force, from a power tool to which the accessory device 600 is coupled. For example, the input shaft 635 may be coupled in the tool holder 170 of the example power tool 100 described above, so that a driving torque generated by the power tool 100 is transmitted to the accessory device 600 via the input shaft 635 and a transmission 630 received in the housing 690.

In the example arrangement shown in FIGS. 6C-6E, the transmission 630 includes a gear assembly including a plurality of gears. In the example arrangement shown in FIGS. 6C-6E, the gear assembly includes an inline arrangement of planetary gear sets, that drive a bevel gear 633, with the bevel gear 633 driving an output gear 634. The output gear 634 defines a driving member that drives a driven member 650, in the form of a rod or shaft, coupled thereto. In the example arrangement shown in FIGS. 6C-6E, the inline arrangement of planetary gears includes two stages of planetary gear sets including a first stage planetary gear set 631 and a second stage planetary gear set 632. Each of the planetary gear sets 631, 632 includes a sun gear driven by the input shaft 635, and a plurality of planet gears surrounding the respective sun gear, and in meshed engagement with the respective sun gear, that rotate in response to rotation of the respective sun gear. The planetary gear sets 631, 632 provide for an initial speed reduction (and corresponding increase in torque), from the rotational speed transmitted from the example power tool 100 to the input shaft 635. Rotation of the planetary gear sets 631, 632 in turn drives the bevel gear 633. The bevel gear 633 is in meshed engagement with the output gear 634, such that the output gear 634 rotates in response to rotation of the bevel gear 633, to drive the driven member 650 engaged with an internally threaded portion 636 of the output gear 634. In the example arrangement shown in FIGS. 6C-6E, a configuration/size of the output gear 634 relative to the bevel gear 633 provides for additional speed reduction and additional increase in torque. That is, the relatively larger size, or dimension, i.e., diameter, number of teeth, and the like of the output gear 634 provides for additional speed reduction, and a corresponding additional increase in torque to be output by the knockout tool 620. In some examples, the output gear 634 is sized so as to be strong enough to support a desired level of output torque of the example accessory device 600.

The driving member in the form of the output gear 634 rotates about the output axis B in response to rotation of the bevel gear 633 about the output axis A of the example power tool 100. A rod or shaft defining the driven member 650 is received in a central opening of the output gear 634, with bearings 640 supporting driving member in the form of the output gear 634 on the driven member 650. The central opening defines an internally threaded portion 636 of the output gear 634.

The driven member 650 is coupled to and engaged with the driving member in the form of the output gear 634, such that the driven member 650 moves axially in response to rotation of the output gear 634. The driven member 650 includes a threaded portion 652 at a first end portion thereof. The threaded portion 652 is configured to selectively engage the internally threaded portion 636 of the output gear 634. The driven member 650 includes an unthreaded portion 654 at an intermediate portion thereof, and a coupling portion 656, to which the die set 610 is removably couplable, at a second end portion thereof. A slot 658 extends longitudinally, along a length of the driven member 650. One or more key features are configured to be engaged in the slot 658, including, for example, one or more key features 617 included on a nozzle 616 of the die set 610, and/or one or more key features included in the other portions of the housing 690. The engagement of one or more of the key features in the slot 658 defines an anti-rotation feature, restricting rotation of the driven member 650. The engagement of one or more of the key features in the slot 658 guides axial movement of the driven member 650 within the housing 690 in response rotation of the planetary gear sets 631, 632, the bevel gear 633, and the output gear 634.

As described above, rotation of the planetary gear sets 631, 632 and the bevel gear 633 (in response to the rotary torque from the motor of the example power tool 100 conveyed to the transmission 630 via the input shaft 635) about the output axis A drives rotation of the driving member in the form of the output gear 634 about the output axis B, for example, at the desired output speed (and torque). The driven member 650 is moved axially in response to rotation of the output gear 634 about the output axis B. That is, engagement of at least one of the key features in the slot 658 restricts rotation of the driven member 650. Thus, engagement of the threaded portion 652 of the driven member 650 with the internally threaded portion 636 of the output gear 634 causes axial movement of the driven member 650 in response to rotation of the driving member in the form of the output gear 634.

In the example arrangement shown in FIGS. 6C-6E, a biasing member 670 is positioned between an end plate 662 and the end portion 664 of a cavity 660 formed within the housing 690 to selectively receive the threaded portion 652 of the driven member 650 as the driven member 650 moves axially. In some examples, the biasing member 670 may be in the form of a spring, e.g., a coil spring, a compression spring, a wave spring, or a leaf spring. In the example arrangement shown in FIGS. 6C-6E, a first end portion of the biasing member 670 is positioned against the end plate 662. A second end portion of the biasing member 670 is positioned against the end portion 664 of the cavity 660.

Figure 7A:
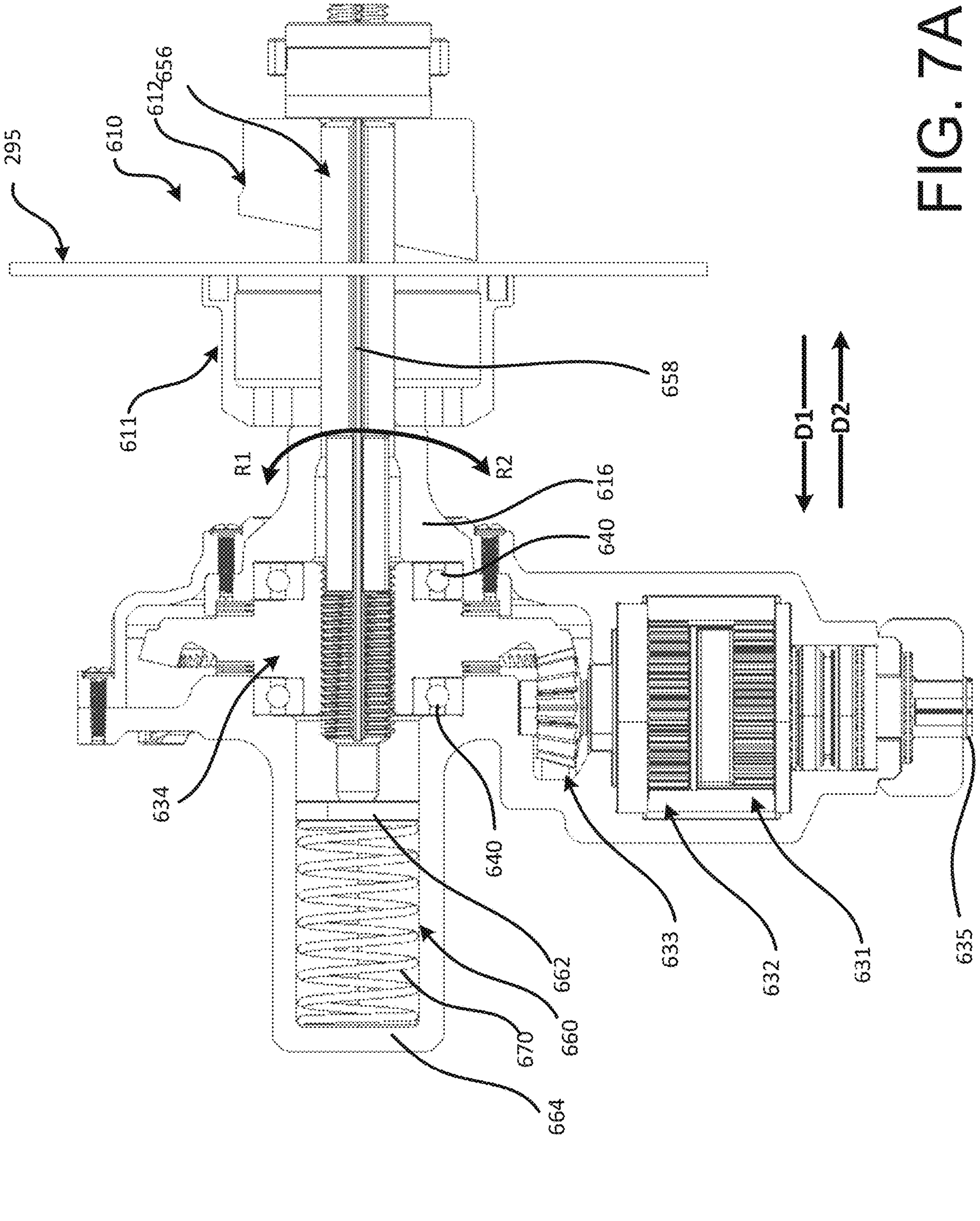
FIGS. 7A and 7B illustrate operation of the example accessory device shown in FIGS. 6A-6E.
Figure 7B:
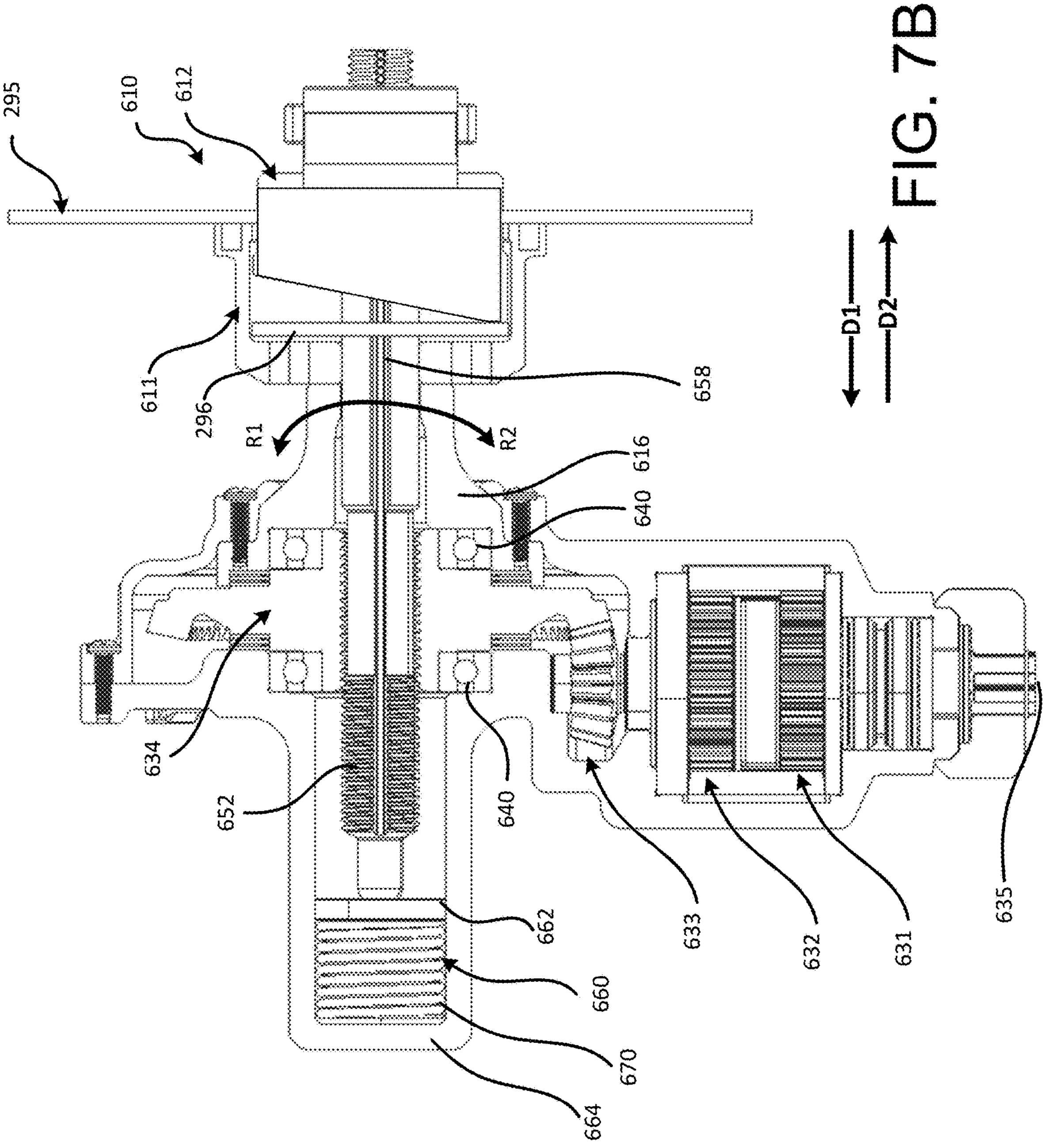

FIGS. 7A and 7B are cross-sectional views, illustrating operation of the example accessory device 600, in accordance with implementations described herein.

In FIG. 7A, the accessory device 600 has been positioned relative to the workpiece 295 to prepare for forming an opening, i.e., punching or knocking out a hole, through the workpiece 295. In this example arrangement, the knockout tool 620 and the cup portion 611 of the die set 610 are positioned on a first side of the workpiece 295, and the punch portion 612 of the die set 410 is positioned on a second side of the workpiece 295. In this example arrangement, the nozzle 616, the cup portion 611 and the punch portion 612 of the die set 610 are mounted on the coupling portion 656 of the driven member 650. The coupling portion 656 extends through a pilot hole formed in the workpiece 295, and into the punch portion 612. This arrangement allows the punch portion 612 to move together with the driven member 650. In this position, the biasing member 670 is in an at rest, or unactuated, state.

A rotational torque, generated by the motor of the example power tool 100 to which the accessory device 600 is coupled, is transmitted to the input shaft 635, to rotate the bevel gear 633 and the driving member in the form of the output gear 634 as described above. Engagement of the threaded portion 652 of the driven member 650 in the internally threaded portion 636 of the output gear 634, with at least one of the key features engaged in the slot 658, causes the driven member 650 to move axially in the direction arrow D1 in response to rotation of the output gear 634 in the direction of the arrow R1. As rotation of the driven member 650 is restricted (by at least one of the key features engaged in the slot 658), continued rotation of the driving member in the form of the output gear 634 in the direction of the arrow R1, and continued engagement between the internally threaded portion 636 of the output gear 634 and the threaded portion 652 of the driven member 650, draws the threaded portion 652 of the driven member 650 further into the cavity 660, and drives continued axial movement of the driven member 650 in the direction of the arrow D1. Axial movement of the driven member 650 in the direction of the arrow D1 causes compression of the biasing member 670 between the end plate 662 and the end portion 664 of the cavity 660.

As the punch portion 612 is coupled to and moves together with the driven member 650 via the coupling portion 656 of the driven member 650, the punch portion 612 also moves in the direction of the arrow D1. Continued axial movement in the direction of the arrow D1 draws the punch portion 612 through the workpiece 295, as shown in FIG. 7B. Movement of the punch portion 612 through the workpiece 295 in this manner forms an opening 297 in the workpiece 295 along the periphery of the punch portion 612. Material 296 removed from the workpiece 295 is contained within an interior of the cup portion 611. In this position, the opening 297 has been formed in the workpiece 295, peripheral walls of the punch portion 612 are received within the interior of the cup portion 611, and material 296 removed from the workpiece 295 is contained within an interior of the cup portion 611. In this position, the driven member 650 has moved far enough in the direction of the arrow D1 so that the unthreaded portion 654 of the driven member 650 is now positioned at the internally threaded portion 636 of the output gear 634 defining the driving member, such that the output gear 634 and the driven member 650 are no longer engaged. Disengagement of the driven member 650 and driving member in the form of the output gear 634 ensures that there is no more axial movement of the driven member 650 in the direction of the arrow D1, even in the event that a user of the power tool 100 continues to apply power to the power tool 100. Thus, the unthreaded portion 654 of the driven member 650 represents a dead zone, precluding further axial movement of the driven member 650, and further axial movement of the punch portion 612 coupled thereto. In some examples, a length of the threaded portion 652 of the driven member 650 and/or a length of the internally threaded portion 636 of the output gear 634 may be set to correspond to a depth of the punch portion 612 and/or a depth of the cup portion 611 of the die set 610, so as to define a stopping mechanism that inhibits or restricts continued axial movement.

Operation of the power tool 100 in an opposite direction may cause rotation of the output gear 634 in the direction of the arrow R2, and re-engagement of the threaded portion 652 of the driven member 650 with the internally threaded portion 636 of the output gear 634 defining the driving member, and axial movement of the driven member 650 in the direction of the arrow D2. Operation in this manner may provide for release of the die set 610 from the workpiece 295. The biasing member 670 may exert a biasing force urges the driven member 650 back to the at rest position shown in FIG. 7A and re-engagement of the threaded portion 652 of the driven member 650 with the internally threaded portion 636 of the driving member in the form of the output gear 634.

Example housing 690 of knockout tool 620 may be relatively compact while still providing substantial pulling power capability. For example, a volume of housing 690 may be between approximately 900 $cm^3$ and approximately 1500 $cm^3$, and in some examples approximately 910 $cm^3$.

Example transmission 630 of knockout tool 620 may be configured to provide a substantial speed reduction and corresponding substantial increase in driving torque. In some examples, a speed reduction ratio of the transmission is between approximately 60:1 and 65:1.

Example knockout tool 620 is configured to generate a substantial amount of axial pulling force for a given driving torque input from a power tool such as power tool 100. In some examples, assuming a input driving torque of 1.5 Nm, knockout tool 620 may be configured to generate at least approximately 20 kN of axial pulling force at the driven member 650, and in some examples, at least approximately 30 kN of axial pulling force at the driven member 650. The example knockout tool 620 also may be configured to provide a high pulling force in a compact tool. For example, the knockout tool may have a ratio of pulling force to a housing volume of 0.03 kN/cm3 to approximately 0.04 kN/cm3.

Figure 8A:
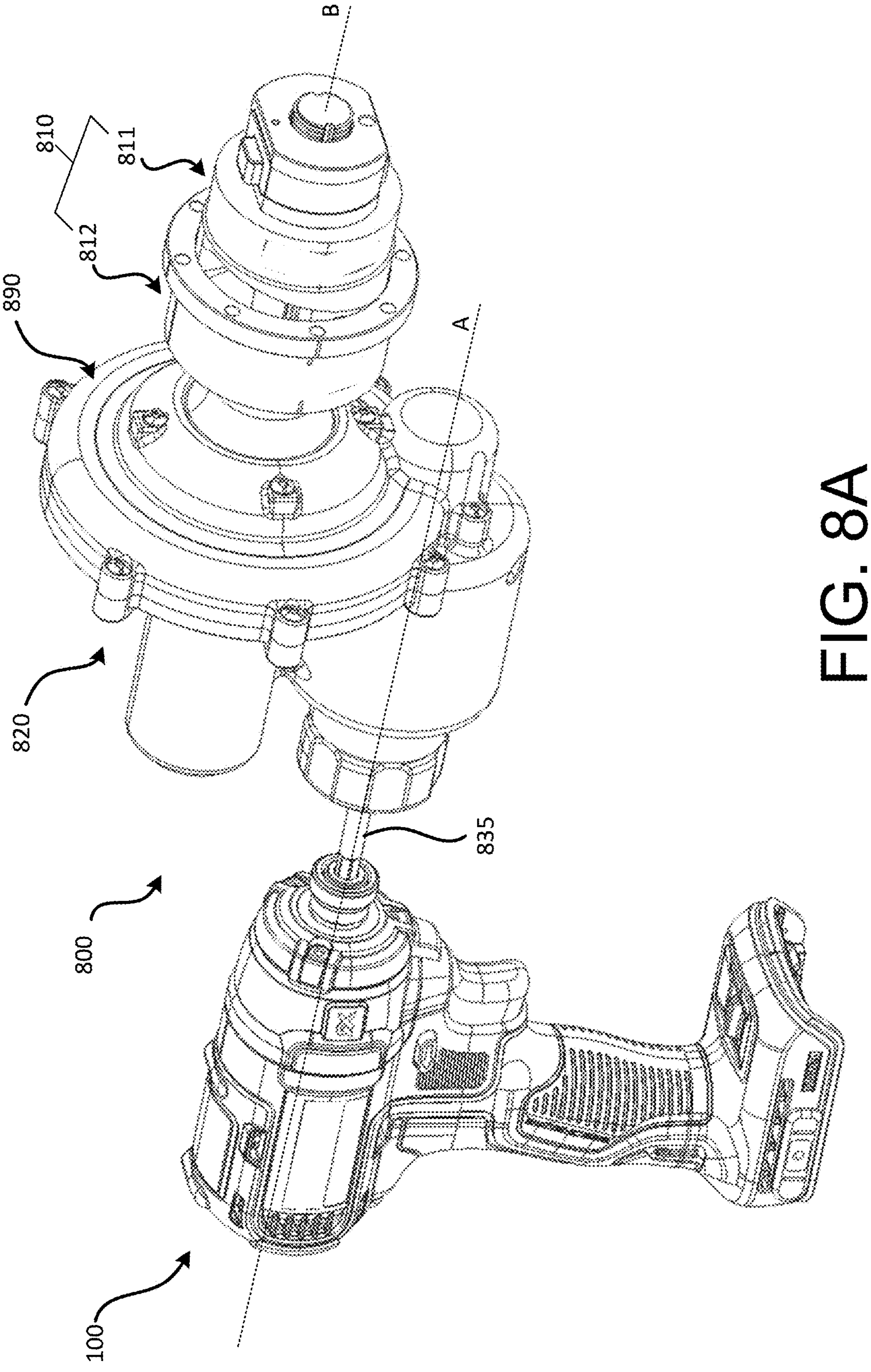
FIG. 8A is a perspective view illustrating an example accessory device coupled to an example rotary power tool.

FIG. 8A is a perspective view of an example accessory device 800, in the form of a knockout tool or knockout accessory, coupled to the example power tool 100. The example accessory device 800 includes a die set 810 coupled to a knockout tool 820, for forming or punching or knocking an opening through a workpiece made of a rigid sheet or plate type material. The die set 810 includes a cup portion 811 and a punch portion 812. The cup portion 811 and the punch portion 812 of the die set 810 are similar to those of the die sets 210, 410, 610 described above, and thus duplicative detailed description will be omitted. In the example arrangement shown in FIG. 8A, the output axis B of the example accessory device 800 is offset from and substantially parallel to the output axis A of the example power tool 100.

Figure 8B:
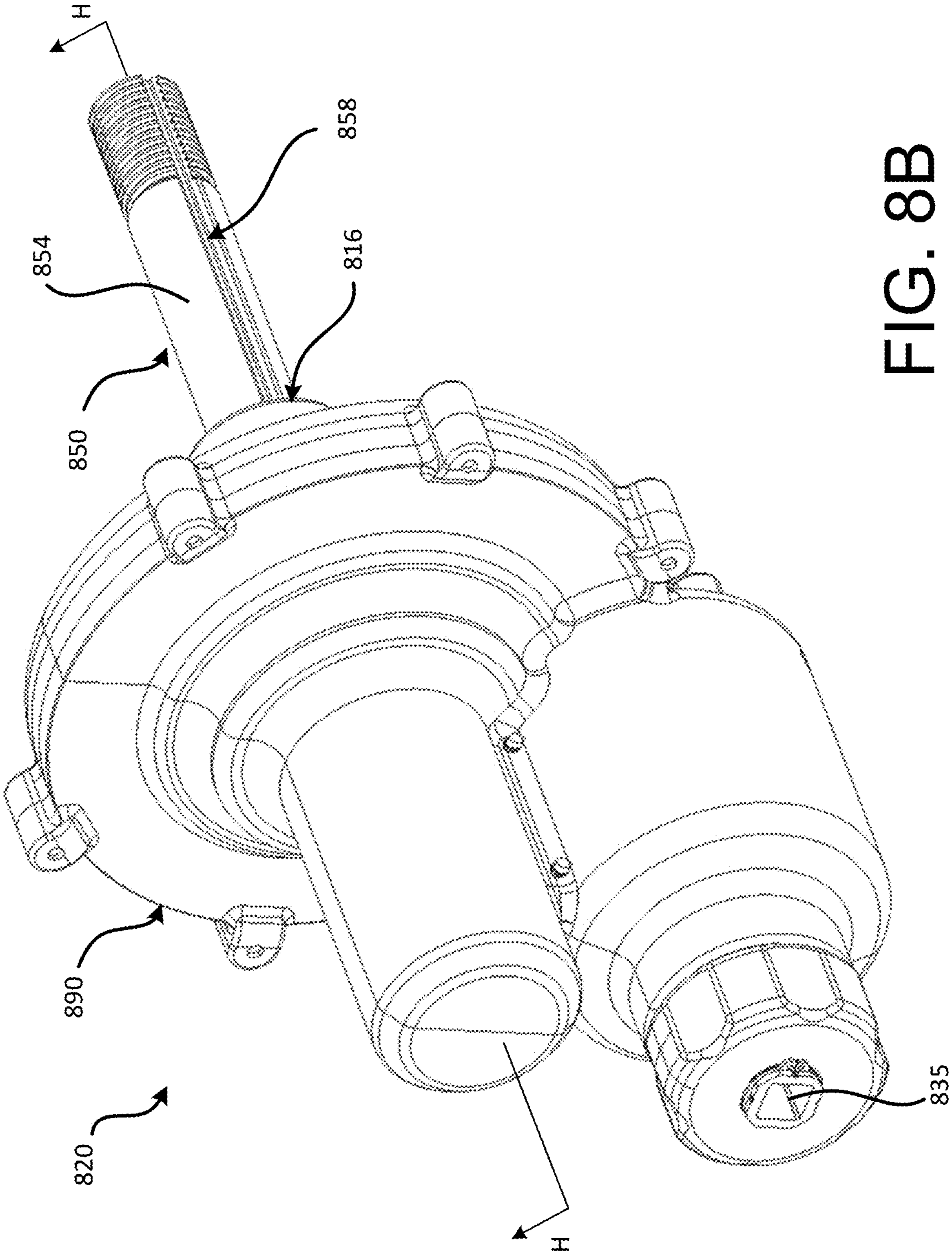
FIG. 8B is a perspective view of the example accessory device shown in FIG. 8A.
Figure 8C:
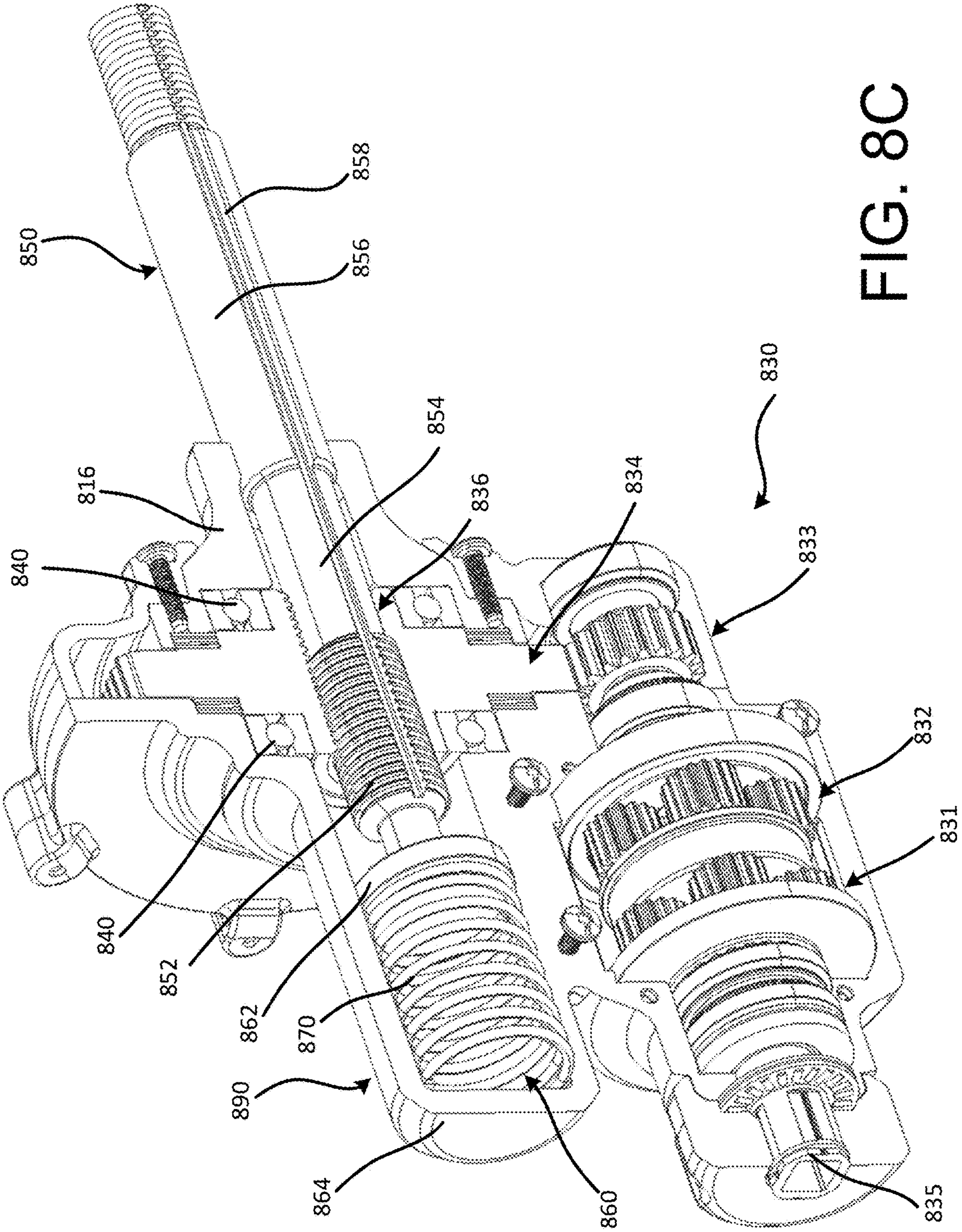
FIG. 8C is a perspective view of the example accessory device shown in FIGS. 8A and 8B, with a portion of a housing removed.
Figure 8D:
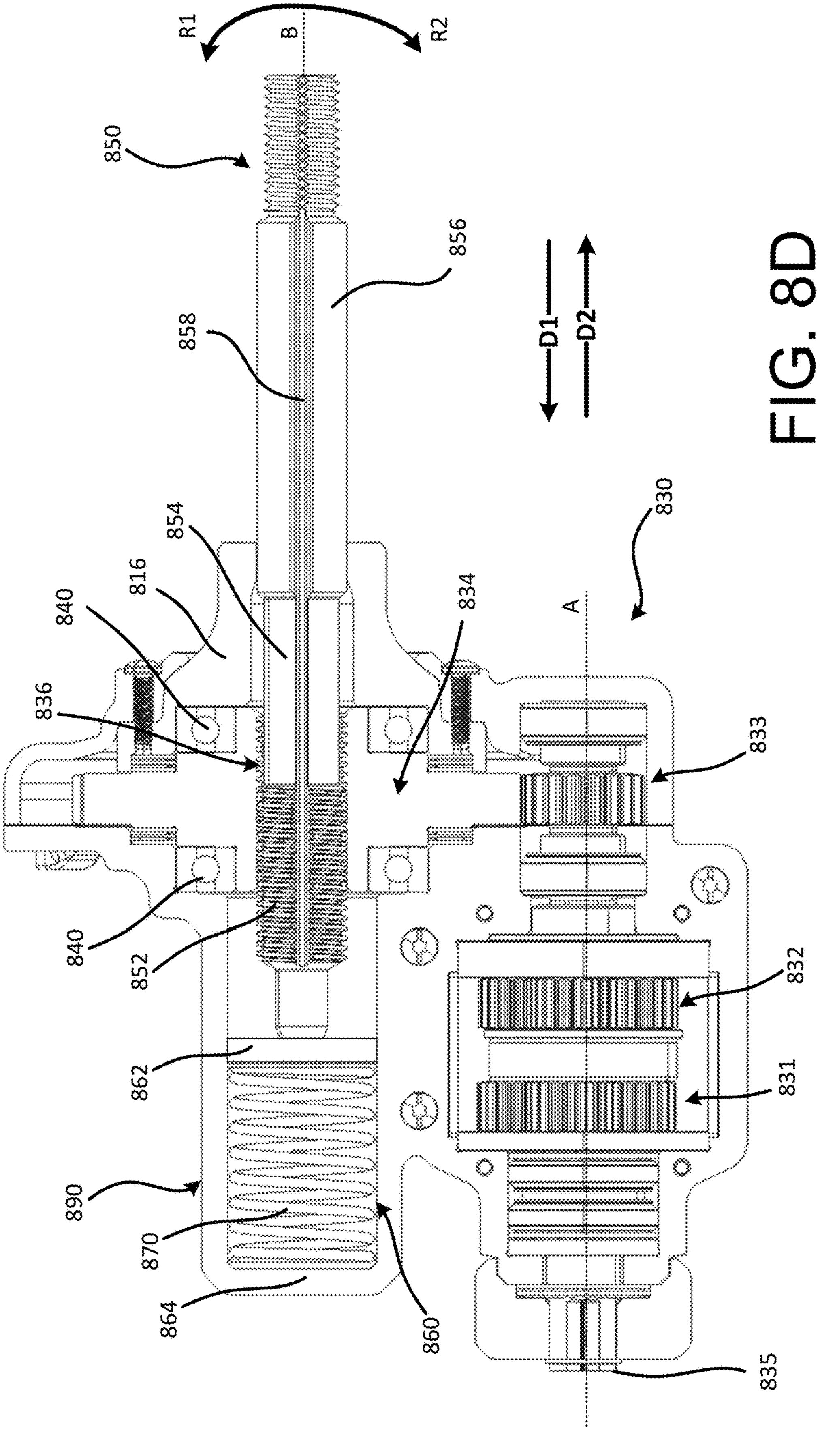
FIG. 8D is a cross-sectional view taken along line H-H of FIG. 8B.

FIG. 8B is a perspective view of the knockout tool 820, without the die set 810 attached. FIG. 8C is a perspective view of the example knockout tool 820 with a portion of a housing 890 removed so that internal components of the knockout tool 820 are visible. FIG. 8D is a cross-sectional view of the example knockout tool 820, taken along line H-H of FIG. 8B.

The knockout tool 820 includes an input shaft 835 that receives an input force, for example, a rotary torque, from a power tool to which the accessory device 800 is coupled. The input shaft 835 drives a transmission 830 received in the housing 890. In the example arrangement shown in FIGS. 8C and 8D, the transmission 830 includes a gear assembly including a plurality of gears. In the example arrangement shown in FIGS. 8C and 8D, the gear assembly includes an inline arrangement of planetary gear sets, that drive an input spur gear 833, with the input spur gear 833 driving an output spur gear 834. In the example arrangement shown in FIGS. 8C and 8D, the output spur gear 834 defines a driving member that drives a driven member 850, in the form of a rod or shaft, coupled thereto. In the example arrangement shown in FIGS. 8C and 8D, the inline arrangement of planetary gear sets includes two stages of planetary gear sets, including a first stage planetary gear set 831 and a second stage planetary gear set 832. Each of the planetary gear sets 831, 832 includes a sun gear driven by the input shaft 835, and a plurality of planet gears surrounding the respective sun gear, and in meshed engagement with the respective sun gear, that rotate in response to rotation of the respective sun gear. Rotation of the planetary gear sets 831, 832 in turn drives the input spur gear 833. The input spur gear 833 is in meshed engagement with the output spur gear 834 defining the driving member, such that the output spur gear 834 rotates in response to rotation of the input spur gear 833. As shown in FIG. 8D, the planetary gear sets 831, 832 and the input spur gear 833 are aligned along and rotate about the output axis A. The output spur gear 834 rotates about the output axis B, which is arranged substantially in parallel to and offset from the output axis A. In the example arrangement shown in FIGS. 8C, and 8D, the planetary gear sets 831, 832 provide for a reduction in speed from the rotary speed introduced into the transmission 830 at the input shaft 835, and a corresponding increase in torque. In the example arrangement shown in FIGS. 8C and 8D, a configuration of the output spur gear 834 relative to that of the input spur gear 833 (i.e., a diameter, a number of teeth, and the like) provides for additional speed reduction and additional increase in torque to be output by the accessory device 800. That is, the relatively larger size, or dimension, i.e., diameter, and arrangement of teeth of the output spur gear 834 defining the driving member provides for additional speed reduction, and corresponding increase in torque, to be output by the transmission 830. In some examples, the output spur gear 834 is sized so as to be strong enough to support a desired level of output torque of the example accessory device 800.

The output spur gear 834 rotates about the output axis B in response to rotation of the input spur gear 833 about the output axis A. A rod or shaft defining the driven member 850 is received in a central opening of the output spur gear 834, with bearings 840 supporting the output spur gear 834 and the driven member 850. The central opening defines an internally threaded portion 836 of the output spur gear 834.

The driven member 850 is coupled to and engaged with the output spur gear 834 defining the driving member, such that the driven member 850 moves axially along the output axis B in response to rotation of the output spur gear 834. The driven member 850 includes a threaded portion 852 at a first end portion thereof. The threaded portion 852 is configured to selectively engage the internally threaded portion 836 of the output spur gear 834. The driven member 850 includes an unthreaded portion 854 at an intermediate portion thereof, and a coupling portion 856, to which the die set 810 is removably couplable, at a second end portion thereof. A slot 858 extends longitudinally, along a length of the driven member 850. One or more key features are configured to be engaged in the slot 858, to prevent rotation of the driven member 850. The one or more key features may include, for example, one or more key features included on a nozzle 816 of the die set 810, and/or one or more key features included in other portions of the housing 890. The engagement of one or more of the key features in the slot 858 defines an anti-rotation feature, restricting rotation of the driven member 850. The engagement of one or more of the key features in the slot 858 guides axial movement of the driven member 850 within the housing 890 in response rotation of the planetary gear sets 831, 832, the input spur gear 833, and the output spur gear 834 defining the driving member.

Rotation of the planetary gear sets 831, 832 and the input spur gear 833 (in response to the force from the motor of the example power tool 100 conveyed to the transmission 830 via the input shaft 835) about the output axis A drives rotation of driving member in the form of the output spur gear 834 about the output axis B, for example, at the desired output speed and torque. The driven member 850 is moved axially in response to rotation of the output spur gear 834 about the output axis B. That is, engagement of at least one of the key features in the slot 858 restricts rotation of the driven member 850, while engagement of the threaded portion 852 of the driven member 850 with the internally threaded portion 836 of the output spur gear 834 drives axial movement of the driven member 850 in response to rotation of the output spur gear 834.

In the example arrangement shown in FIGS. 8C and 8D, a biasing member 870 is positioned between an end plate 862 and the end portion 864 of a cavity 860 formed within the housing 890 to selectively receive the threaded portion 852 of the driven member 850 as the driven member 850 moves axially. In some examples, the biasing member 870 is in the form of a spring, e.g., a coil spring, a compression spring, a wave spring, or a leaf spring. In the example arrangement shown in FIGS. 8C and 8D, a first end portion of the biasing member 870 is positioned against the end plate 862, and a second end portion of the biasing member 870 is positioned against the end portion 864 of the cavity 860.

As described above, the die set 810 is removably couplable to the knockout tool 820 via the coupling portion 856 of the driven member 850. The die set 810 and knockout tool 820 may be positioned as shown, for example, in FIGS. 5A-5B and 7A-7B, to form an opening, or punch or knock a hole, through a workpiece, such as the example workpiece 295.

In operation, a rotational force, generated by the motor of the example power tool 100 to which the accessory device 800 is coupled, is transmitted to the input shaft 835, to rotate the input spur gear 833 and the output spur gear 834 as described above. Engagement of the threaded portion 852 of the driven member 850 in the internally threaded portion 836 of the output spur gear 834 defining the driving member, with at least one of the key features engaged in the slot 858, drives axial movement of the driven member 850 in the direction arrow D1 in response to rotation of the output spur gear 834 in the direction of the arrow R1. As rotation of the driven member 850 is restricted, continued rotation of the output spur gear 834 in the direction of the arrow R1, and continued engagement between the internally threaded portion 836 of the output spur gear 834 and the threaded portion 852 of the driven member 850, draws the driven member 850 further in the direction of the arrow D1, causing compression of the biasing member 870. Continued rotation in the direction of the arrow R1 and axial movement in the direction of the arrow D1 eventually causes disengagement of the threaded portion 852 of the driven member 850 and the internally threaded portion 836 of the output spur gear 834. As described above with respect to FIGS. 5A-5B and 7A-7B, in some examples, this disengagement corresponds to a point at which the punch portion 812 has moved through the workpiece 295 to form the opening, and is received in the cup portion 811 of the die set 810.

This disengagement of the driven member 850 and the output spur gear 834 precludes further axial movement of the driven member 850 in the direction of the arrow D1, even in the event that a user of the power tool 100 continues to apply power to the power tool 100. Thus, the unthreaded portion 854 of the driven member 850 defines a dead zone that precludes further axial movement of the driven member 850, and further axial movement of the punch portion 812 coupled thereto. As described above, operation of the power tool 100 in an opposite direction may cause rotation of the output spur gear 834 in the direction of the arrow R2, and re-engagement of the threaded portion 852 of the driven member 850 with the internally threaded portion 836 of the output spur gear 834, and axial movement of the driven member 850 in the direction of the arrow D2, providing for release of the die set 810 from the workpiece 295. The biasing member 870 may exert a biasing force urges the driven member 850 in the direction of the arrow D2, and reengagement of the threaded portion 852 of the driven member 850 with the internally threaded portion 836 of the output spur gear 834 defining the driving member.

Example housing 890 of knockout tool 820 may be relatively compact while still providing substantial pulling power capability. For example, a volume of housing 890 may be between approximately 800 $cm^3$ and approximately 1000 $cm^3$, and in some examples approximately 890 $cm^3$.

Example transmission 830 of knockout tool 820 may be configured to provide a substantial speed reduction and corresponding substantial increase in driving torque. In some examples, a speed reduction ratio of the transmission is between approximately 60:1 and 65:1.

Example knockout tool 820 is configured to generate a substantial amount of axial pulling force for a given driving torque input from a power tool such as power tool 100. In some examples, assuming a input driving torque of 1.5 Nm, knockout tool 820 may be configured to generate at least approximately 20 kN of axial pulling force at the driven member 850, and in some examples, at least approximately 30 kN of axial pulling force at the driven member 850. The example knockout tool 820 also may be configured to provide a high pulling force in a compact tool. For example, the knockout tool may have a ratio of pulling force to a housing volume of approximately 0.03 kN/cm3 to approximately 0.04 kN/cm3.

Figure 9A:
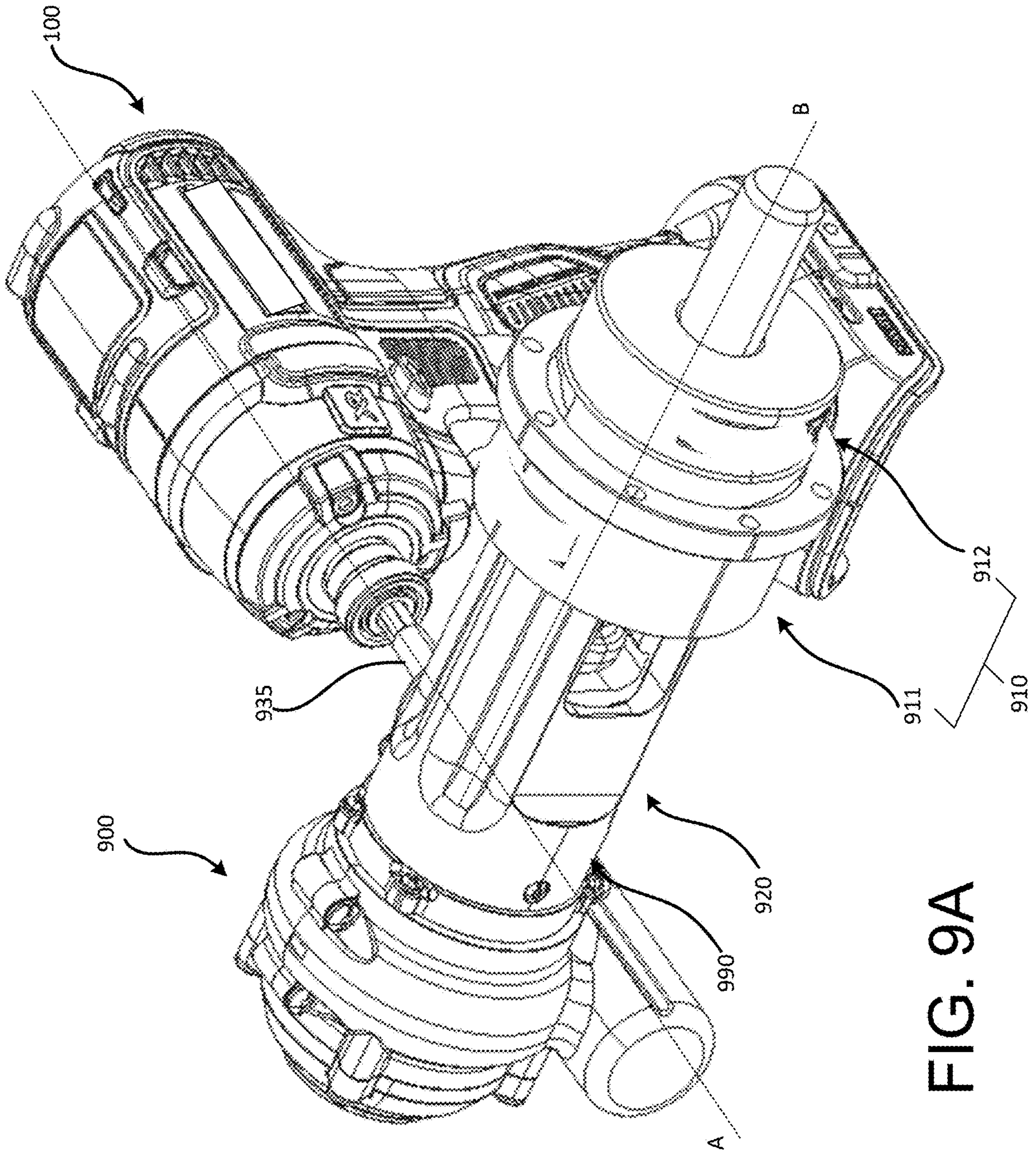
FIG. 9A is a perspective view illustrating an example accessory device coupled to an example rotary power tool.

FIG. 9A is a perspective view of an example accessory device 900, in the form of a knockout tool or knockout accessory, coupled to the example power tool 100. The example accessory device 900 includes a die set 910 coupled to a knockout tool 920, the die set 910 including a cup portion 911 and a punch portion 912. In the example arrangement shown in FIG. 9A, an output axis B of the example accessory device 900 is substantially orthogonal to the output axis A of the example power tool 100.

Figure 9B:
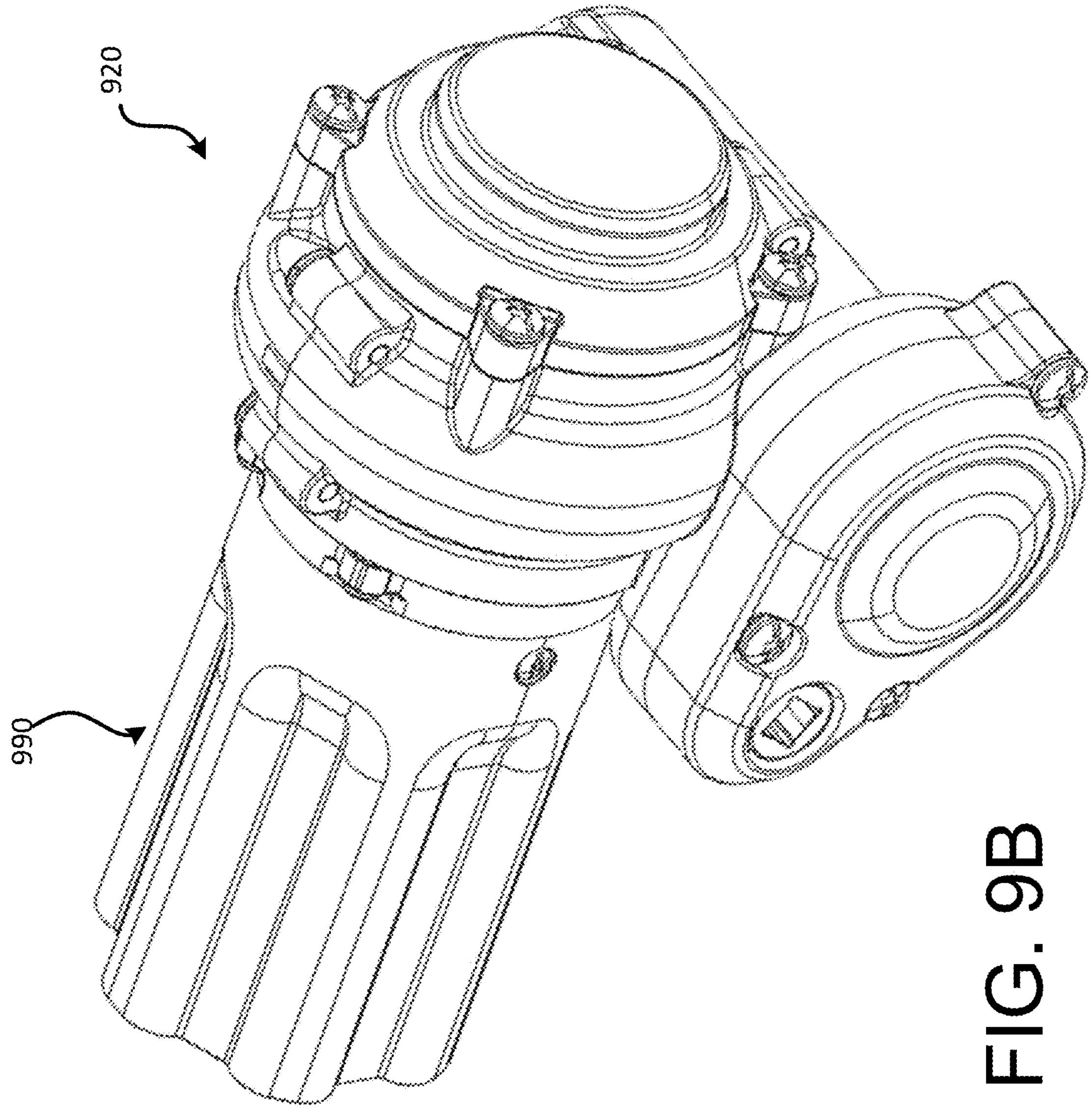
FIG. 9B is a perspective view of the example accessory device shown in FIG. 9A.
Figure 9C:
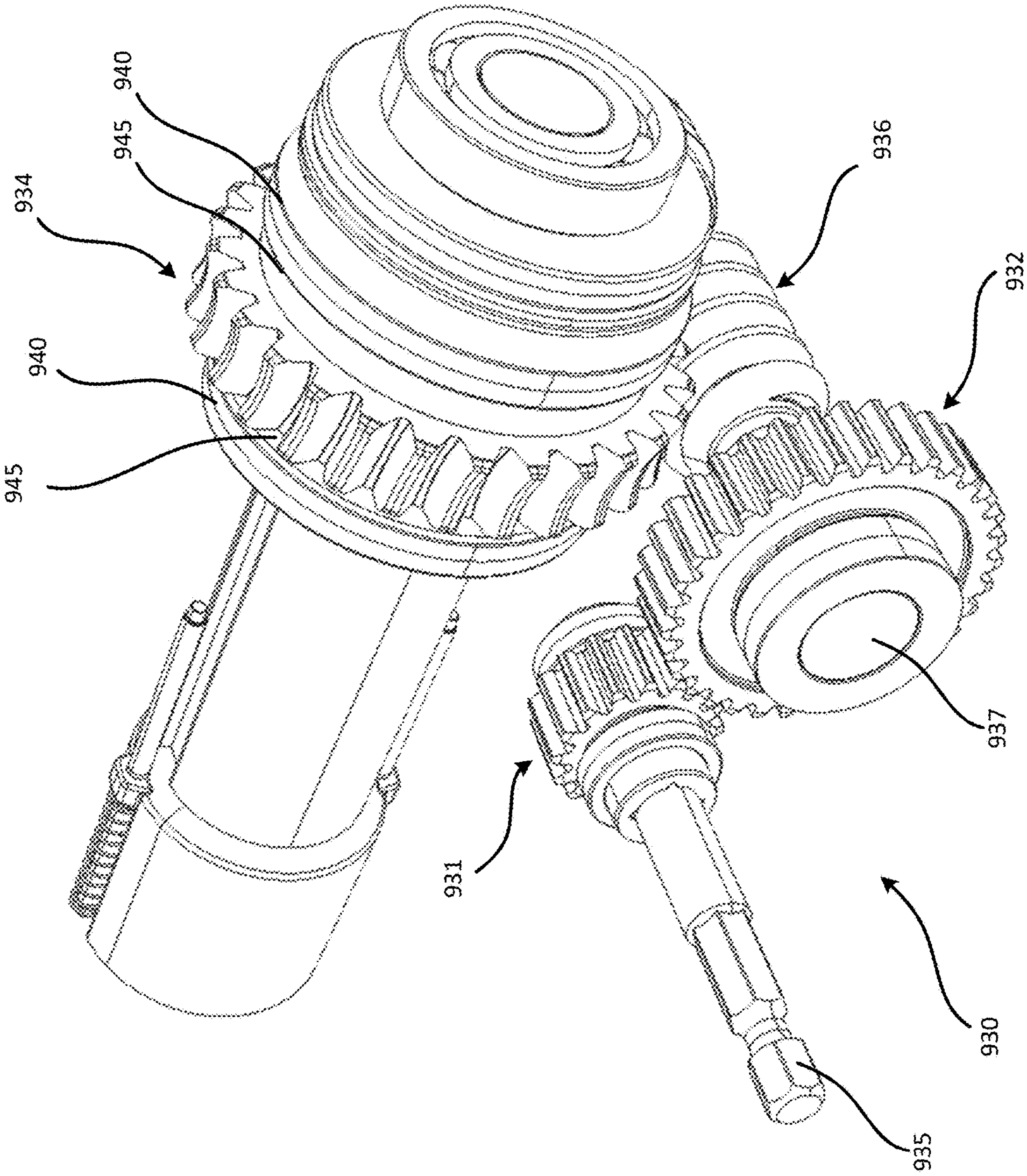
FIG. 9C is a first perspective view.
Figure 9D:
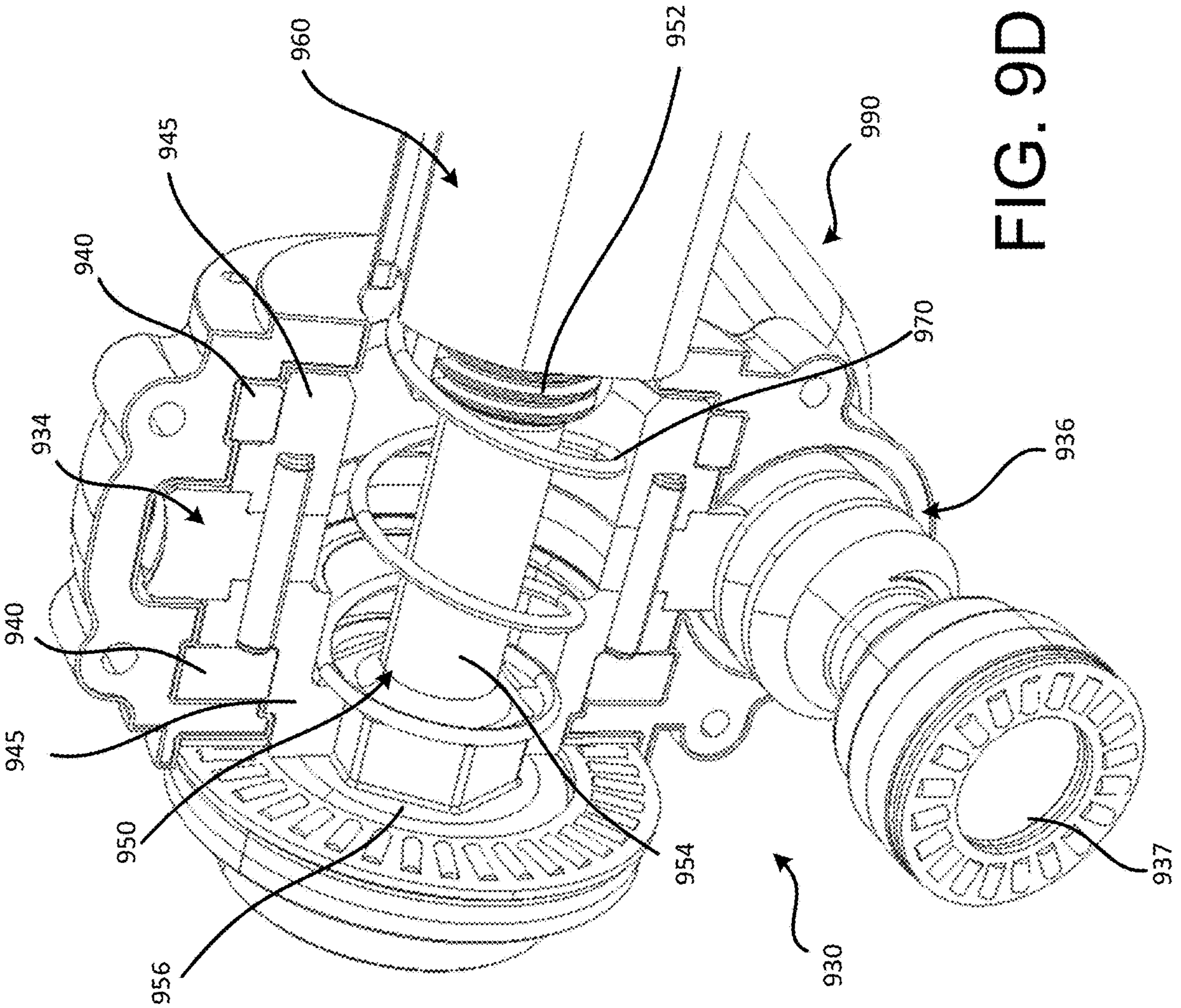
FIG. 9D is a second, partial perspective view, of the example accessory device shown in FIGS. 9A and 9B, with a portion of a housing removed.
Figure 9E:
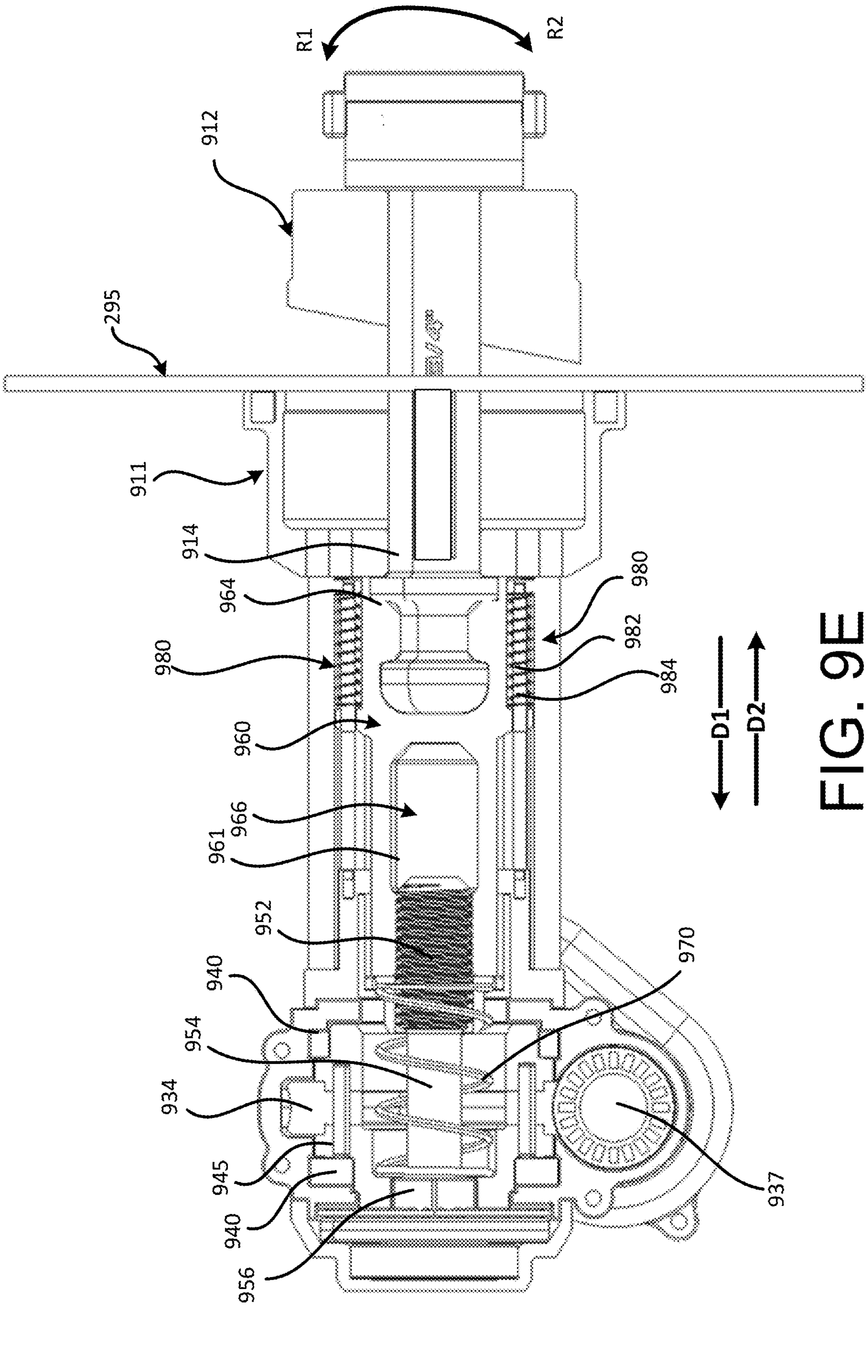
FIGS. 9E and 9F illustrate operation of the example accessory device shown in FIGS. 9A-9D.
Figure 9F:
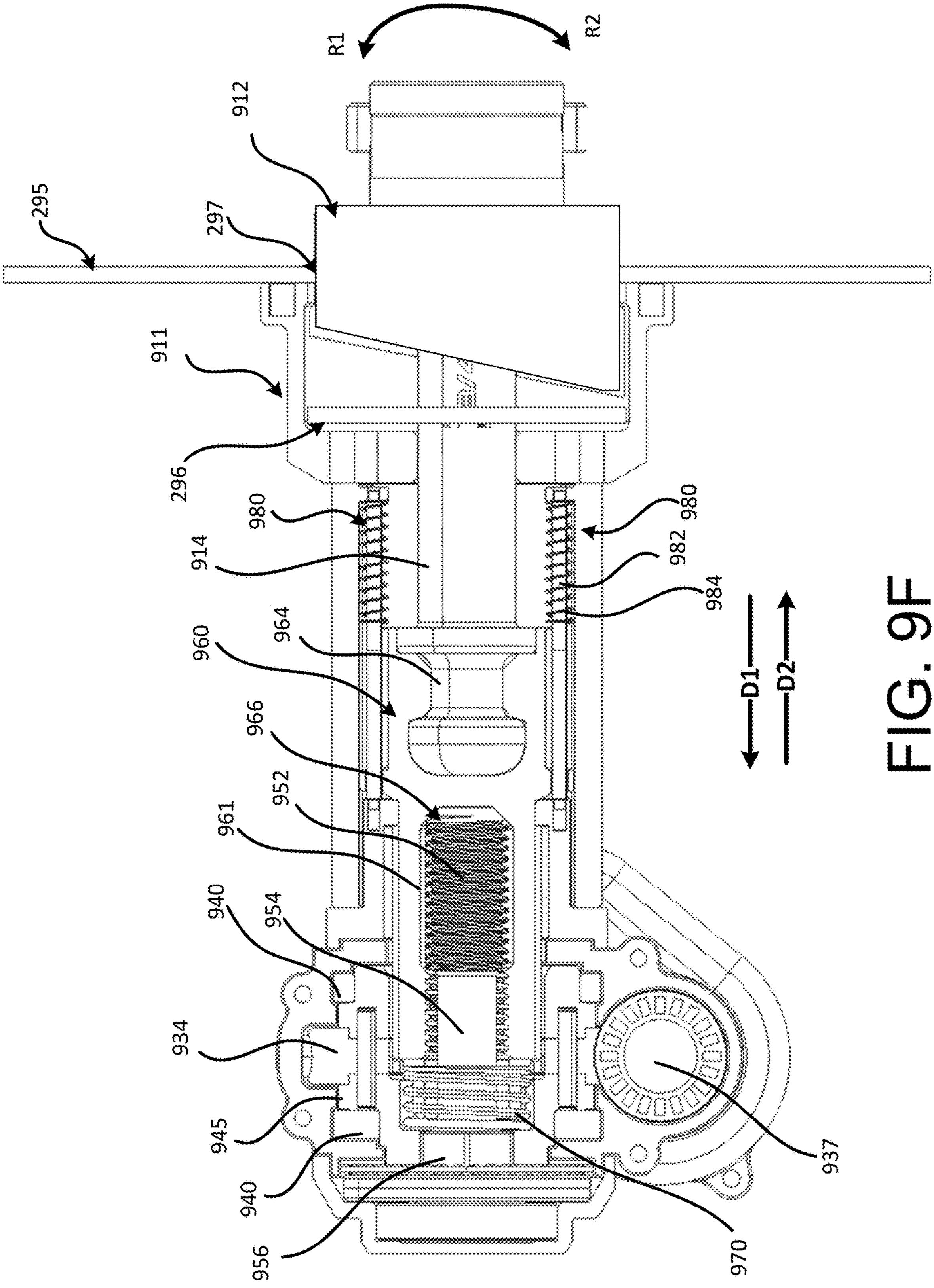

FIG. 9B is a perspective view of the example knockout tool 920 decoupled from the example power tool 100, and with the die set 910 removed. FIG. 9C is a first perspective view with a portion of a housing 990 removed so that internal components of the knockout tool 920 are visible. FIG. 9D is a second perspective view, including a partial cross-sectional view of FIG. 9C. FIGS. 9E and 9F illustrate operation of the example accessory device 900.

As shown in FIGS. 9B-9E, an input shaft 935 receives an input force, for example, a rotary torque, from a power tool, such as the example power tool 100, to which the accessory device 900 is coupled. The input shaft 935 drives a gear assembly of a transmission 930 received in the housing 990 in response to the rotary driving force transmitted thereto by the power tool 100.

In the example arrangement shown in FIGS. 9B-9E, the transmission 930 includes a gear assembly including a plurality of gears. In the example arrangement shown in FIGS. 9B-9E, the gear assembly of the transmission 930 includes an input spur gear 931, an intermediate spur gear 932, a worm gear 936, and an output gear 934. In the example arrangement shown in FIGS. 9B-9E, the input spur gear 931 rotates together with the input shaft 935. The intermediate spur gear 932 is in meshed engagement with the input spur gear 931 and rotates in response to rotation of the input spur gear 931. An intermediate shaft 937 is fixed to and rotates with the intermediate spur gear 932. The worm gear 936 is formed on a portion of the intermediate shaft 937, such that the worm gear 936 rotates in response to rotation of the intermediate shaft 937. The output gear 934 is in meshed engagement with the worm gear 936 and rotates in response to rotation of the worm gear 936. The output gear 934 is fixed to a flange 945 supported by bearings 940 in the housing 990. A hex end portion 956 of a rod or shaft defining a driving member 950 is fixed to the flange, such that the driving member 950 rotates in response to rotation of the output gear 934 also fixed to the flange 945. Rotation of the input spur gear 931, the intermediate spur gear 932, the worm gear 936 on the intermediate shaft 937 (in response to a rotary force transmitted from the power tool 100 to the transmission 930 via the input shaft 935) thus causes rotation of the output gear 934 and flange 945, and the driving member 950 fixed thereto.

As shown in FIGS. 9E and 9F, a driven member 960 is coupled in the housing 990. In some examples, the driven member 960 is coupled in the housing 990 such that rotation of the driven member 960 is restricted, and the driven member 960 is movable axially within the housing 990. A first cavity 966 is formed in a first end portion of the driven member 960. A threaded portion 961 of the first cavity 966 is configured to selectively engage the threaded portion 952 of the driving member 950, as the driving member 950 rotates in response to the rotation of the output gear 934. A second cavity 964 is formed in an end portion of the driven member 960. A second cavity 964 is formed in a second end portion of the driven member 960, and configured to provide for engagement of a corresponding pull rod 914 that couples the driven member 960 to the die set 910, to removably couple the die set 910 to the knockout tool 920, and allowing for a variety of different sizes and/or configurations of die sets to be selectively attached to the knockout tool 920. In the example arrangement shown in FIGS. 9D-9F, a biasing member 970 is positioned between and end portion of the flange 945 and an end portion of the driven member 960. In some examples, the biasing member 970 may be in the form of a spring, e.g., a coil spring, a compression spring, a wave spring, or a leaf spring.

In FIG. 9E, the accessory device 900 is positioned relative to the workpiece 295 to prepare for forming an opening, i.e., punching or knocking out a hole, through the workpiece 295, with the knockout tool 920 and the cup portion 911 positioned on a first side of the workpiece 295, and the punch portion 912 positioned on a second side of the workpiece 295. In this example arrangement, the pull rod 914 couples the knockout tool 920 to the die set 910. The pull rod 914 extends from the punch portion 912, through a pilot hole formed in the workpiece 295, and through the cup portion 911, for engagement with the second cavity 964 of the driven member 960. This arrangement allows the punch portion 912 to move together with the driven member 960. In particular, this arrangement allows the punch portion 912 to move axially in response to axial movement of the driven member 960.

In operation, a force, for example a rotary torque, generated by the motor of the example power tool 100 to which the accessory device 900 is coupled, is transmitted through the transmission 930 as described above to rotate the driving member 950, for example in the direction of the arrow R1. Rotation of the driving member 950 in the direction of the arrow R1 causes the threaded portion 952 of the driving member 950 to engage the threaded portion 961 of the first cavity 966 formed in the driven member 960. As rotation of the driven member 960 is restricted, continued rotation of the driving member 950 in the direction of the arrow R1, and continued engagement between the threaded portion 952 of the driving member 950 and the threaded portion 961 of the first cavity 966, draws the threaded portion 952 of the driving member 950 further into the first cavity 966, and causes axial movement of the driven member 960 in the direction of the arrow D1. Axial movement of the driven member 960 in the direction of the arrow D1 draws the driven member 960, and the pull rod 914 and punch portion 912 coupled thereto, in the direction of the arrow D1, eventually pulling the punch portion 912 through the workpiece 295, as shown in FIG. 9F, forming an opening 297 in the workpiece 295 along the periphery of the punch portion 912. Material 296 removed from the workpiece 295 is contained within an interior of the cup portion 911 of the die set 910.

In the position shown in FIG. 9F, the driving member 950 has moved far enough into the first cavity 966 so that the unthreaded portion 954 of the driving member 950 is now positioned at the threaded portion 961 of the first cavity 266. In this position, the driven member 960 and the driving member 950 are disengaged, so that there is no more movement of the driven member 960 in the direction of the arrow D1, even in the event that a user of the power tool 100 continues to apply power to the power tool 100. The unthreaded portion 954 of the driving member 950 represents a dead zone, precluding further axial movement of the driven member 960, and further axial movement of the punch portion 912 coupled thereto, thus defining a stopping mechanism that inhibits or restricts continued axial movement.

Operation of the power tool 100 in an opposite direction may cause rotation of the driving member 950 in the direction of the arrow R2, and re-engagement of the threaded portion 952 of the driving member 950 with the threaded portion of the first cavity 966, and movement of the driven member 960 in the direction of the arrow D2 to reset the accessory device 900 for the next opening to be formed, to remove the material 296 from the cup portion 911, to remove/replace the die set 910 and the like.

In some examples, the knockout tool 920 includes a stopping/return mechanism 980 that limits or restricts an amount of axial movement of the driven member 960. In some examples, the stopping/return mechanism 980 prevents disengagement of the driven member 960 from the driving member 950 (and thus, disengagement from the knockout tool 920 and/or the example power tool 100). In the example arrangement shown in FIGS. 9E and 9F, two return mechanisms 980 are illustrated, simply for purposes of discussion and illustration. In the example arrangement shown in FIGS. 9E and 9F, the stopping/return mechanism 980 includes at least one biasing member 982. In some examples, the at least one biasing member 982, e.g., a spring, is mounted on a rod 984 coupled between the driven member 960 and the housing 990. In some examples, the biasing member 982 is mounted between the driven member 960 and the housing 990, without a rod.

Example housing 990 of knockout tool 920 may be relatively compact while still providing substantial pulling power capability. For example, a volume of housing 990 may be between approximately 300 $cm^3$ and approximately 500 $cm^3$, and in some examples approximately 352 $cm^3$.

Example transmission 930 of knockout tool 920 may be configured to provide a substantial speed reduction and corresponding substantial increase in driving torque. In some examples, a speed reduction ratio of the transmission is between approximately 50:1 and 60:1, and in some examples, the speed reduction ratio of the transmission is approximately 58:1.

Example knockout tool 920 is configured to generate a substantial amount of axial pulling force for a given driving torque input from a power tool such as power tool 100. In some examples, assuming a input driving torque of 1.5 Nm, knockout tool 920 may be configured to generate at least approximately 20 kN of axial pulling force at the driven member 960, and in some examples, at least approximately 28 kN of axial pulling force, and in some examples, at least approximately 30 kN of axial pulling force at the driven member 960. The example knockout tool 920 also may be configured to provide a high pulling force in a compact tool. For example, the knockout tool may have a ratio of pulling force to a housing volume of approximately 0.08 kN/cm3 to approximately 0.09 kN/cm3.

Figure 10A:
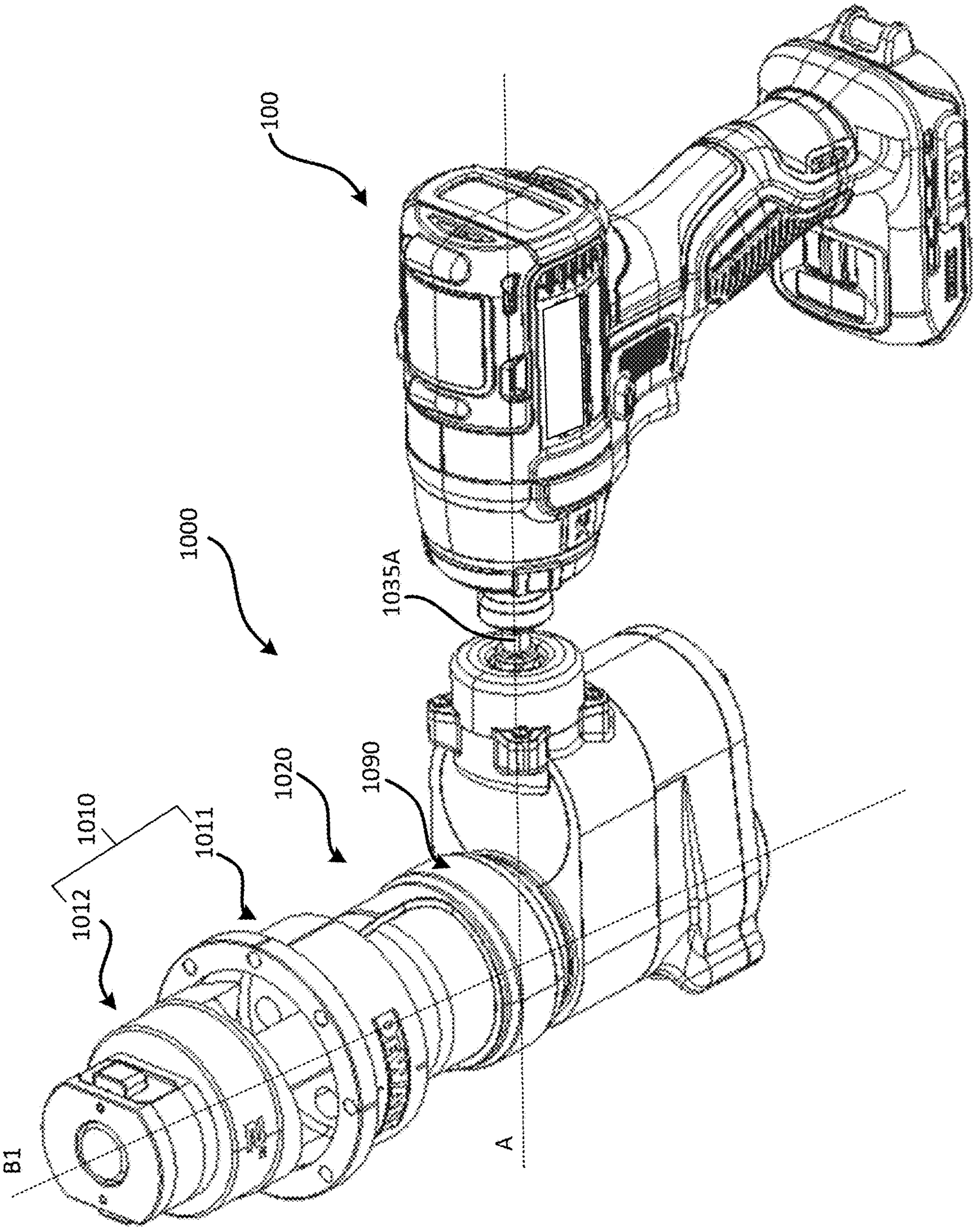
FIG. 10A is a perspective view illustrating an example accessory device coupled to an example rotary power tool in a first mode.
Figure 10B:
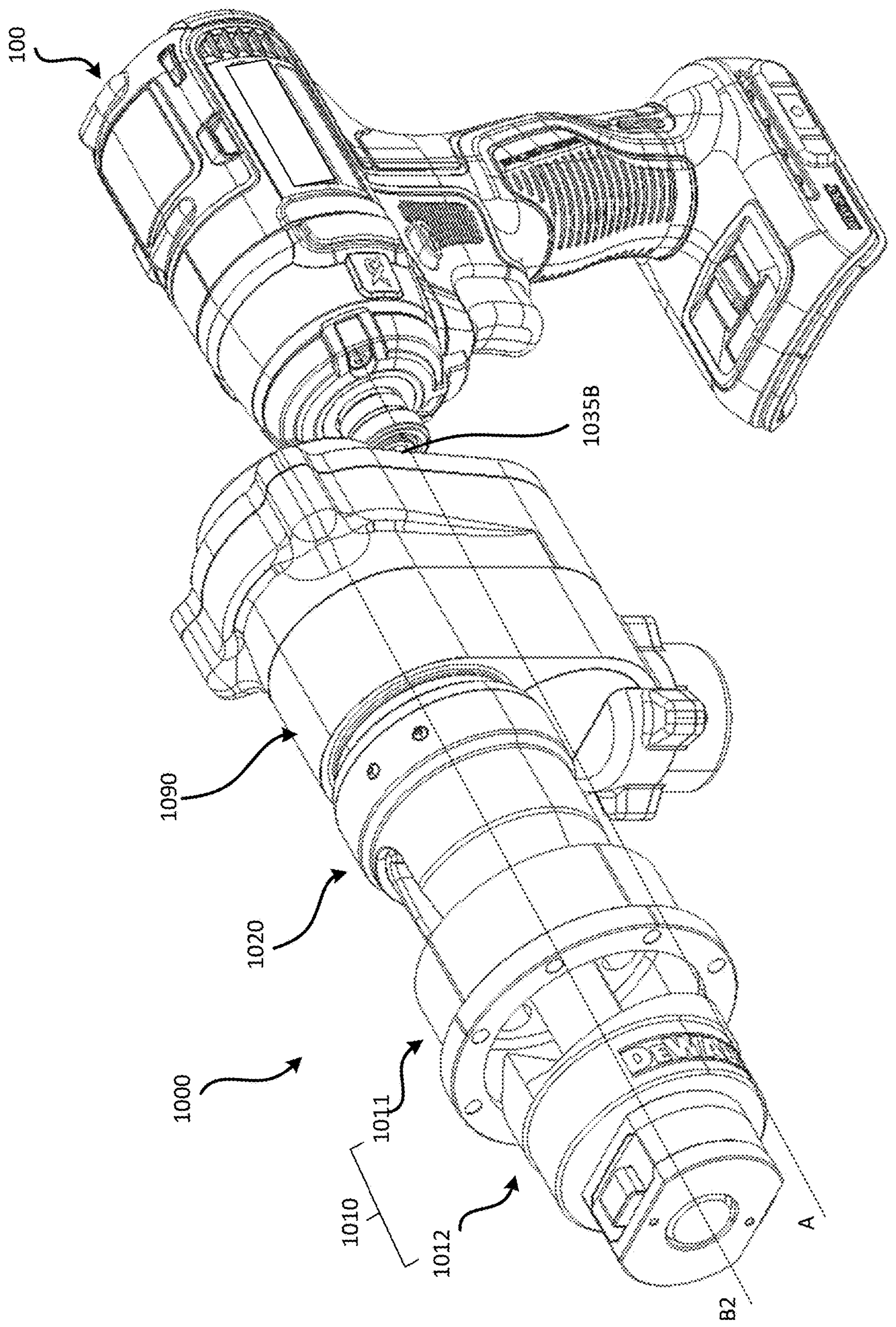
FIG. 10B is a perspective view illustrating the example accessory device coupled to the example rotary power tool shown in FIG. 10A, in a second mode.
Figure 10C:
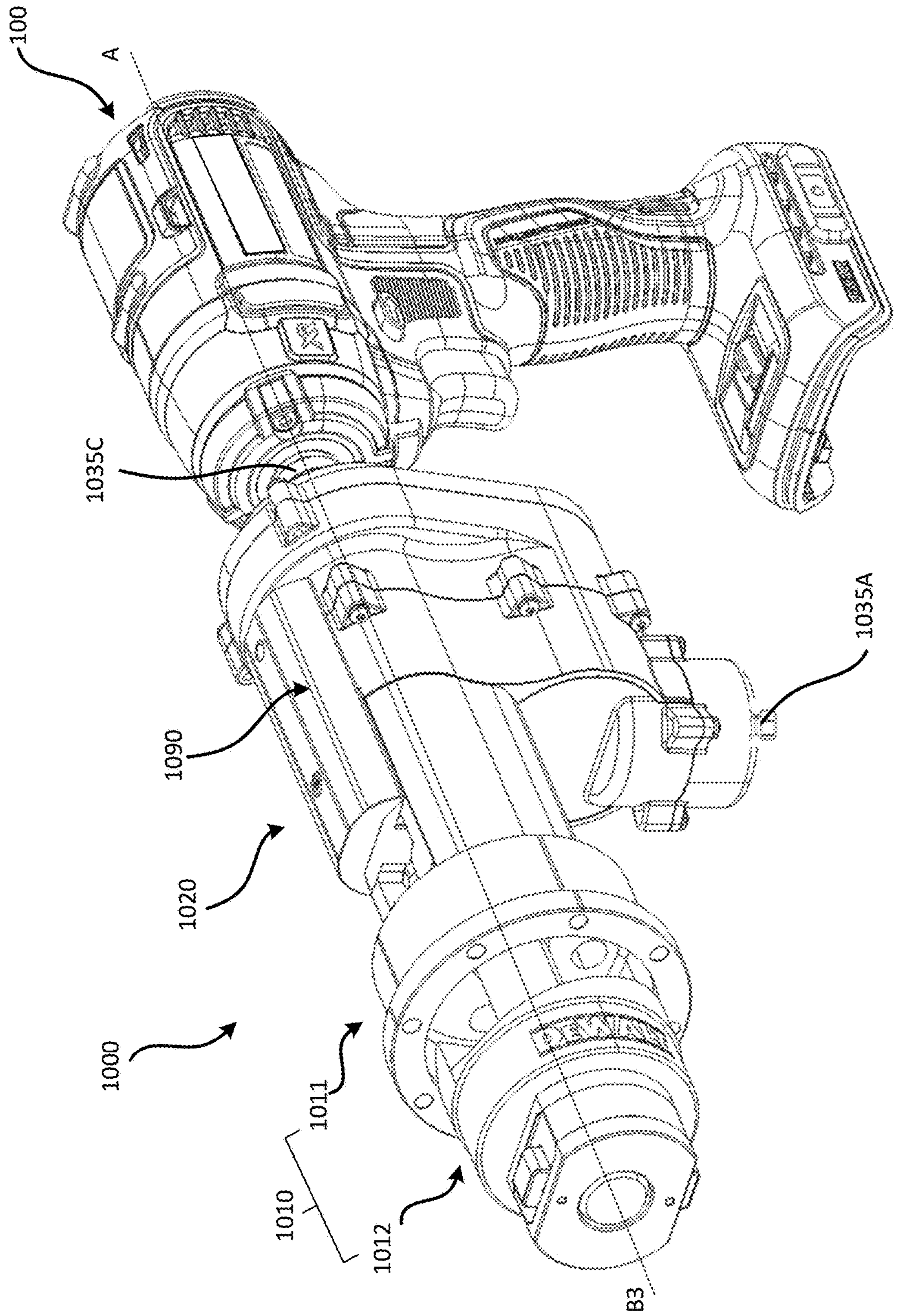
FIG. 10C is a perspective view illustrating the example accessory device coupled to the example rotary power tool shown in FIGS. 10A and 10B, in a third mode.
Figure 10D:
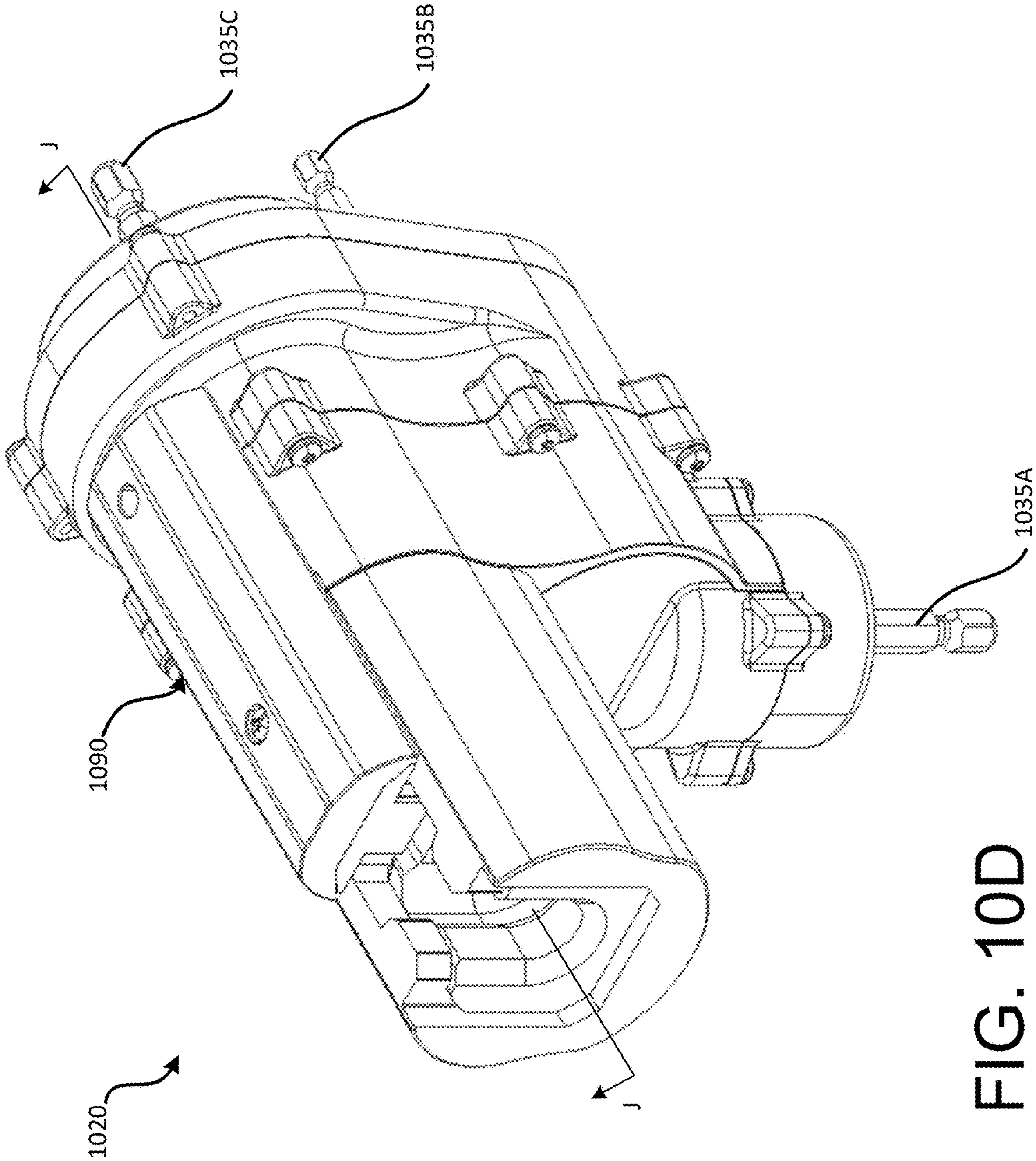
FIG. 10D is a perspective view of the example accessory device shown in FIGS. 10A-10C.
Figure 10E:
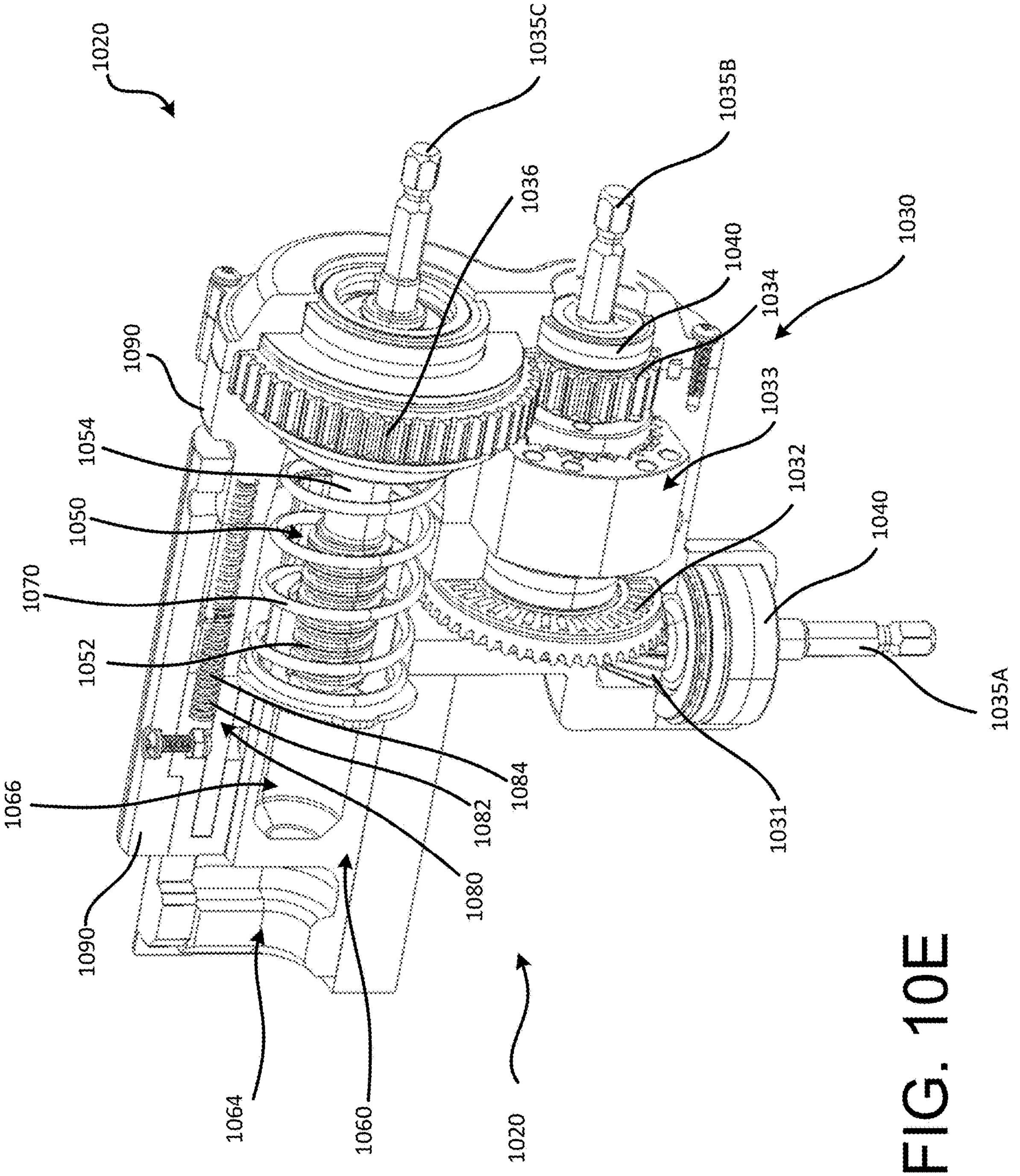
FIG. 10E is a first perspective view.
Figure 10F:
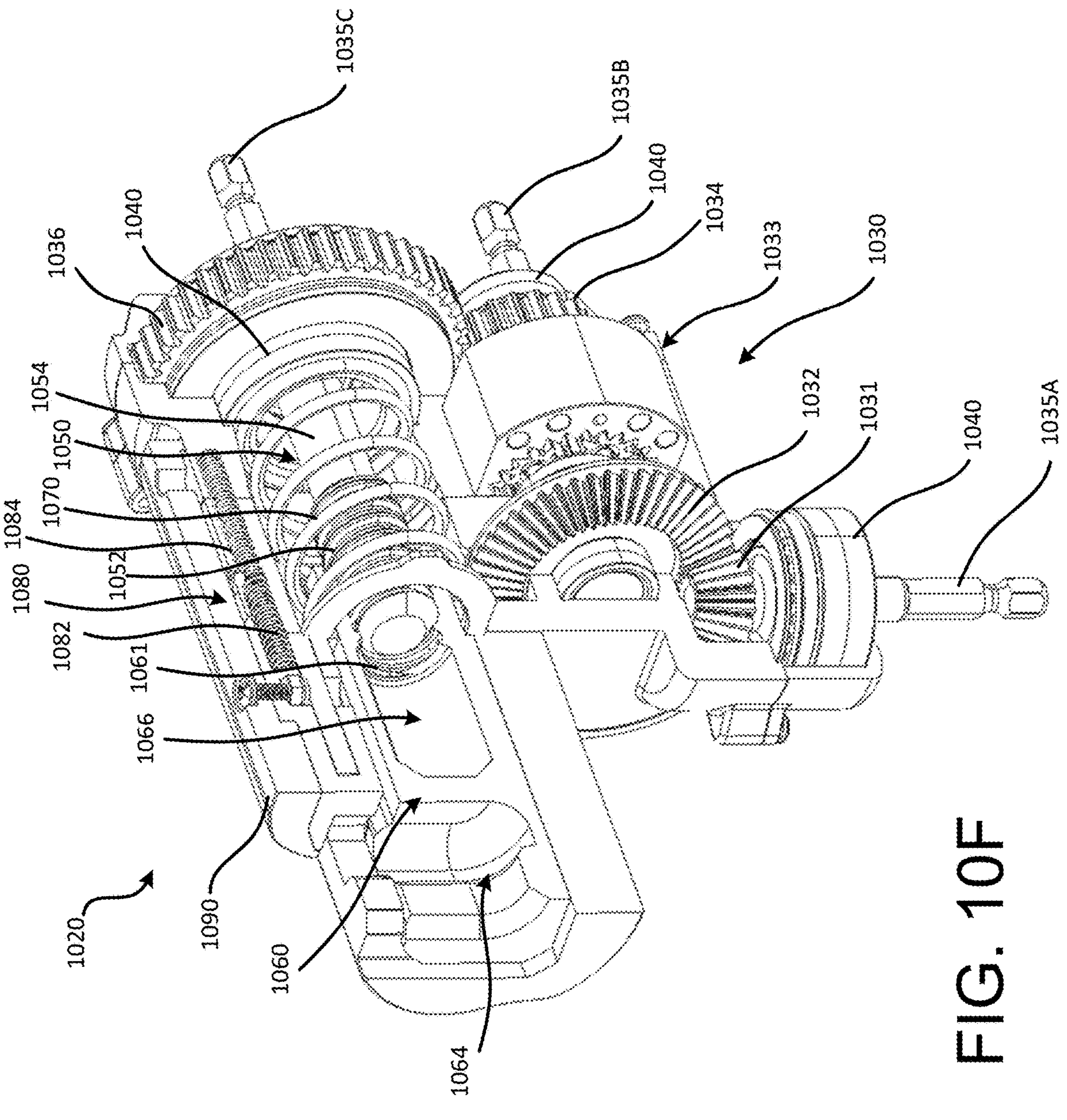
FIG. 10F is a second perspective view, of the example accessory device, with a portion of a housing removed.
Figure 10G:
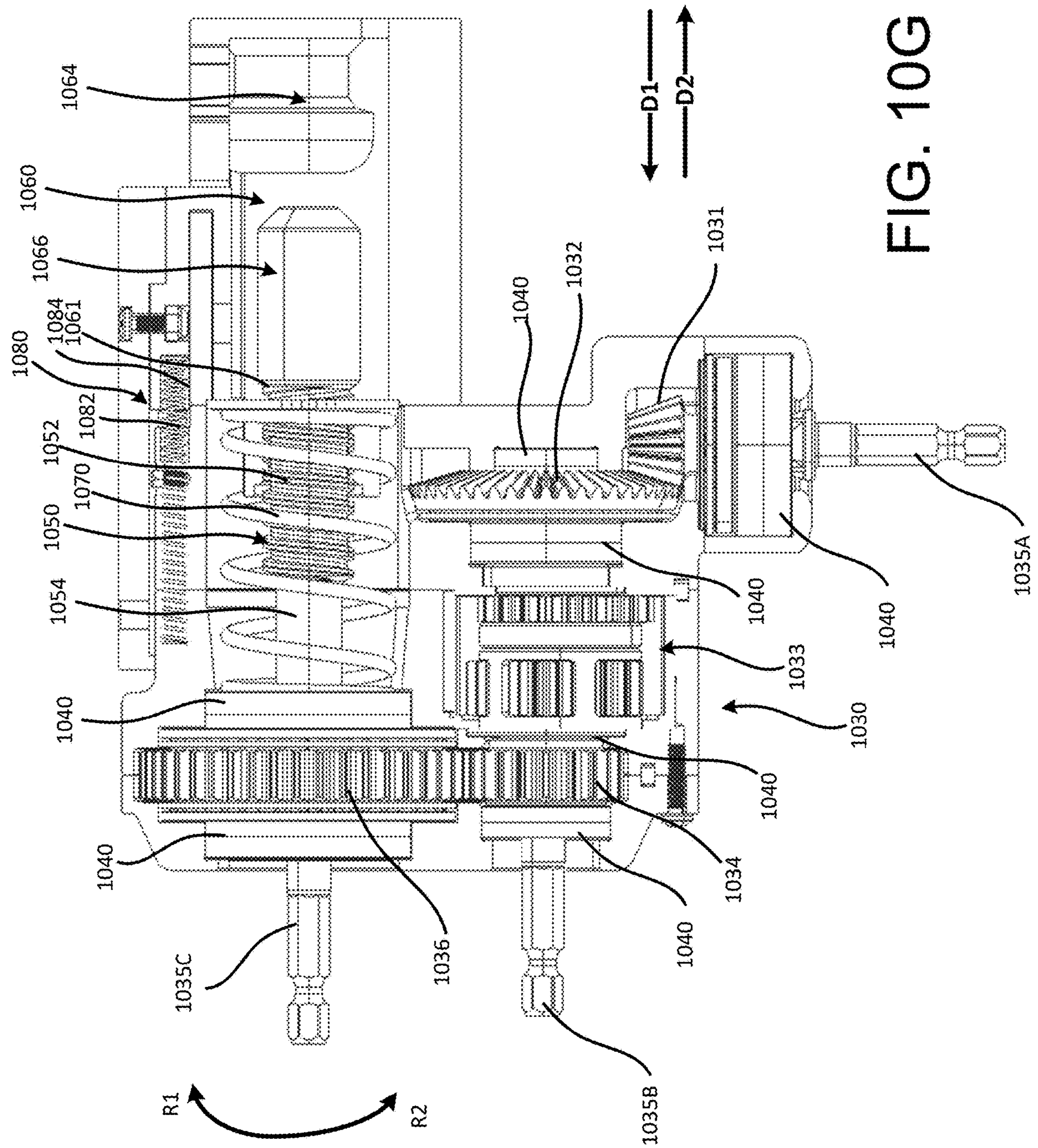
FIG. 10G is a cross-sectional view taken along line J-J of FIG. 10D.

FIG. 10A is a perspective view illustrating an example accessory device 1000 coupled to the example power tool 100, in a first mode of the example accessory device 1000. FIG. 10B is a perspective view illustrating the example accessory device 1000 coupled to the example power tool 100, in a second mode of the example accessory device 1000. FIG. 10C is a perspective view illustrating the example accessory device 1000 coupled to the example power tool 100, in a third mode of the example accessory device 1000. The example accessory device 1000 includes a die set 1010 coupled to a knockout tool 1020, the die set 1010 including a cup portion 1011 and a punch portion 1012. FIG. 10D is a perspective view of the example knockout tool 1020, with the die set 1010 removed. FIG. 10E is a first perspective view, and FIG. 10F is a second perspective view, of the example accessory device, with a portion of a housing removed. FIG. 10G is a cross-sectional view taken along line J-J of FIG. 10D.

In the first mode, shown in FIG. 10A, the example power tool 100 is coupled to a first input shaft 1035A of the example knockout tool 1020, such that an output axis B1 of the example accessory device 1000 is substantially orthogonal to the output axis A of the example power tool 100. In the second mode, shown in FIG. 10B, the example power tool 100 is coupled to a second input shaft 1035B of the knockout tool 1020, such that an output axis B2 of the example accessory device 1000 is offset from and substantially parallel to the output axis A of the example power tool 100. In the third mode, shown in FIG. 10C, the example power tool 100 is coupled to a third input shaft 1035C of the knockout tool 1020, such that an output axis B3 of the example accessory device 1000 is substantially aligned with the output axis A of the example power tool 100. The ability to selectively attach the example accessory device 1000 to the example power tool 100 in either the first mode or the second mode or the third mode may enhance overall utility to the user. For example, this ability may provide flexibility using a single tool in use environments having different types of access to workpieces in which openings are to be formed. In some examples, the ability to operate in either the first mode or the second mode or the third mode may provide for a greater range of output torque with the single accessory device 1000.

Each of the first input shaft 1035A, the second input shaft 1035B, and the third input shaft 1035C is configured to be operably coupled to a portion of a transmission 1030 provided in the housing 1090 to transmit a force, for example, a rotary torque, from the example power tool 100 to the accessory device 1000, for operation of the die set 1010. In this example arrangement, the transmission 1030 includes a gear assembly including a plurality of gears, including for example, an input bevel gear 1031, an output bevel gear 1032, one or more planetary gear sets 1033, an input spur gear 1034, and an output spur gear 1036. A plurality of bearings 1040 support the input bevel gear 1031, the output bevel gear 1032, the one or more planetary gear sets 1033, the input spur gear 1034, and the output spur gear 1036 on their respective shafts.

A rod or shaft defining a driving member 1050 is coupled, for example fixedly coupled, to the output spur gear 1036, such that the driving member 1050 rotates together with the output spur gear 1036 in response to a rotary force transmitted from the power tool 100 to the transmission 1030. In some examples the driving member 1050 includes a threaded portion 1052 at a first end portion thereof, and an unthreaded portion 1054 at an intermediate portion thereof. A driven member 1060 is coupled in the housing 1090. In some examples, the driven member 1060 is coupled in the housing 1090 such that rotation of the driven member 1060 is restricted, and the driven member 1060 is movable axially within the housing 1090. A second cavity 1064 is formed in an end portion of the driven member 1060. The second cavity 1064 is configured to provide for engagement of a corresponding pull rod (similar to the pull rod 914 described above with respect to the example accessory device 900) that couples the driven member 1060 to the die set 1010, to removably couple the die set 1010 to the knockout tool 1020, and allowing for a variety of different sizes and/or configurations of die sets to be selectively attached to the knockout tool 1020. A first cavity 1066 is formed in an end portion of the driven member 1060, opposite the second cavity 1064. A threaded portion 1061 of the first cavity 1066 is configured to selectively engage the threaded portion 1052 of the driving member 1050, as the driving member 1050 rotates in response to the rotation of the output spur gear 1036, and the driving member 1050 moves axially into and out of the first cavity 1066 formed in the driven member 1060. A biasing member 1070 is positioned between an end portion of the driven member 1060 and a bearing 1040 supporting the output spur gear 1036. In some examples, the biasing member 1070 may be in the form of a spring, e.g., a coil spring, a compression spring, a wave spring, or a leaf spring.

In the first mode, the first input shaft 1035A is coupled to the example power tool 100, for example, coupled to the tool holder 170 of the power tool 100. A rotating force is transmitted from the first input shaft 1035A to the input bevel gear 1031. The output bevel gear 1032, which is in meshed engagement with the input bevel gear 1031, rotates in response to rotation of the input bevel gear 1031. Rotation of the output bevel gear 1032 causes rotation of the one or more planetary gear sets 1033 mounted on a common shaft with the output bevel gear 1032. Each of the one or more planetary gear sets 1033 includes a sun gear mounted on the common shaft and rotating together with the output bevel gear 1032, and a plurality of planet gears surrounding the respective sun gear, and in meshed engagement with the respective sun gear, such that the planet gears rotate in response to rotation of the respective sun gear. The planetary gear sets 1033 provide for a reduction in speed, and corresponding increase in torque. The input spur gear 1034 mounted on the common shaft rotates in response to rotation of the bevel gears 1031, 1032 and the one or more planetary gear sets 1033. The output spur gear 1036, which is in meshed engagement with the input spur gear 1034, rotates in response to rotation of the input spur gear 1034. In response to rotation of the output spur gear 1036 and the driving member 1050 fixed thereto in the direction of the arrow R1, the threaded portion 1052 of the driving member 1050 to engages the threaded portion 1061 of the first cavity 1066 formed in the driven member 1060. As rotation of the driven member 1060 is restricted, continued rotation of the driving member 1050 in the direction of the arrow R1, and continued engagement between the threaded portion 1052 of the driving member 1050 and the threaded portion 1061 of the first cavity 1066, draws the threaded portion 1052 of the driving member 1050 further into the first cavity 1066, and causes axial movement of the driven member 1060 in the direction of the arrow D1. Axial movement of the driven member 1060 in the direction of the arrow D1 draws the driven member 1060, and the pull rod and punch portion 1012 coupled thereto, in the direction of the arrow D1, eventually pulling the punch portion 1012 through a workpiece, forming an opening in the workpiece along the periphery of the punch portion 1012. This operation is similar to that described above with respect to FIGS. 9E and 9F, and thus duplicative detailed description will be omitted. At a point at which the driving member 1050 has moved far enough into the first cavity 1066 so that the unthreaded portion 1054 of the driving member 1050 is now positioned at the threaded portion 1061 of the first cavity 1066, the driven member 1060 and the driving member 1050 are disengaged. In the disengaged state, there is no more movement of the driven member 1060 in the direction of the arrow D1, even in the event that a user of the power tool 100 continues to apply power to the power tool 100. The unthreaded portion 1054 of the driving member 1050 represents a dead zone, precluding further axial movement of the driven member 1060, and further axial movement of the punch portion 1012 coupled thereto, thus defining a stopping mechanism that inhibits or restricts continued axial movement. Operation of the power tool 100 in an opposite direction may cause rotation of the driving member 1050 in the direction of the arrow R2, and re-engagement of the threaded portion 1052 of the driving member 1050 with the threaded portion of the first cavity 1066, and movement of the driven member 1060 in the direction of the arrow D2 to provide for reset of the accessory device 1000 for formation of the next opening, to remove material from the cup portion 1011 of the die set 1010, to remove/replace the die set 1010 and the like.

In the second mode, the second input shaft 1035B is coupled to the example power tool 100, for example, coupled to the tool holder 170 of the power tool 100. A rotating force is transmitted from the second input shaft 1035B to the input spur gear 1034, thus bypassing the input bevel gear 1031, the output bevel gear 1032, and the one or more planetary gear sets 1033. The output spur gear 1036, which is in meshed engagement with the input spur gear 1034, rotates in response to rotation of the input spur gear 1034, causing rotation of the driving member 1050 fixed thereto in the direction of the arrow R1. Rotation of the driving member 1050 in the direction of the arrow R1 causes the threaded portion 1052 of the driving member 1050 to engage the threaded portion 1061 of the first cavity 1066 formed in the driven member 1060, causing axial movement of the driven member 1060 in the direction of the arrow D1. Further operation to form an opening in a workpiece is similar to that which is described above with respect to operation in the first mode, and thus duplicative description will be omitted.

In the third mode, the third input shaft 1035C is coupled to the example power tool 100, for example, coupled to the tool holder 170 of the power tool 100. A rotating force is transmitted from the third input shaft 1035C to the output spur gear 1036, thus bypassing the input bevel gear 1031, the output bevel gear 1032, the one or more planetary gear sets 1033, and the input spur gear 1034. The output spur gear 1036 rotates in response to the force transmitted thereto via the third input shaft 1035C, causing rotation of the driving member 1050 fixed thereto in the direction of the arrow R1. Rotation of the driving member 1050 in the direction of the arrow R1 causes the threaded portion 1052 of the driving member 1050 to engage the threaded portion 1061 of the first cavity 1066 formed in the driven member 1060, causing axial movement of the driven member 1060 in the direction of the arrow D1. Further operation to form an opening in a workpiece is similar to that which is described above with respect to operation in the first mode and the second mode, and thus duplicative description will be omitted.

In some examples, the knockout tool 1020 includes a stopping/return mechanism 1080 that limits or restricts an amount of axial movement of the driven member 1060. In some examples, the stopping/return mechanism 1080 prevents disengagement of the driven member 1060 from the driving member 1050 (and thus, disengagement from the knockout tool 1020 and/or the example power tool 100). In the example arrangement shown in FIGS. 10E-10G, the stopping/return mechanism 1080 includes at least one biasing member 1082, e.g., a spring. In some examples, the at least one biasing member 1082 is mounted on a rod 1084 coupled between the driven member 1060 and the housing 1090. In some examples, the biasing member 1082 is mounted between the driven member 1060 and the housing 1090, without a rod.

In some examples, an output torque output by the knockout tool 1020 when operating in the first mode may be greater than an output torque output by the knockout tool 1020 operating in the second mode or the third mode. In some examples, a speed output by the knockout tool 1020 when operating in the third mode may be greater than a speed output by the knockout tool 1020 operating in the second mode or the third mode.

Example housing 1090 of knockout tool 1020 may be relatively compact while still providing substantial pulling power capability. For example, a volume of housing 1090 may be between approximately 300 $cm^3$ and approximately 500 $cm^3$, and in some examples approximately 392 $cm^3$.

Example transmission 1030 of knockout tool 1020 may be configured to provide a substantial speed reduction and corresponding substantial increase in driving torque. In some examples, a speed reduction ratio of the transmission is between approximately 80:1 and 100:1, and in some examples, the speed reduction ratio of the transmission is approximately 90:1.

Example knockout tool 1020 is configured to generate a substantial amount of axial pulling force for a given driving torque input from a power tool such as power tool 100. In some examples, assuming a input driving torque of 1.5 Nm, knockout tool 1020 may be configured to generate at least approximately 30 kN of axial pulling force at the driven member 1060, and in some examples, at least approximately 50 kN of axial pulling force at the driven member 1060. The example knockout tool 1020 also may be configured to provide a high pulling force in a compact tool. For example, the knockout tool may have a ratio of pulling force to a housing volume of 0.12 kN/cm3 to approximately 0.15 kN/cm3.

Figure 11A:
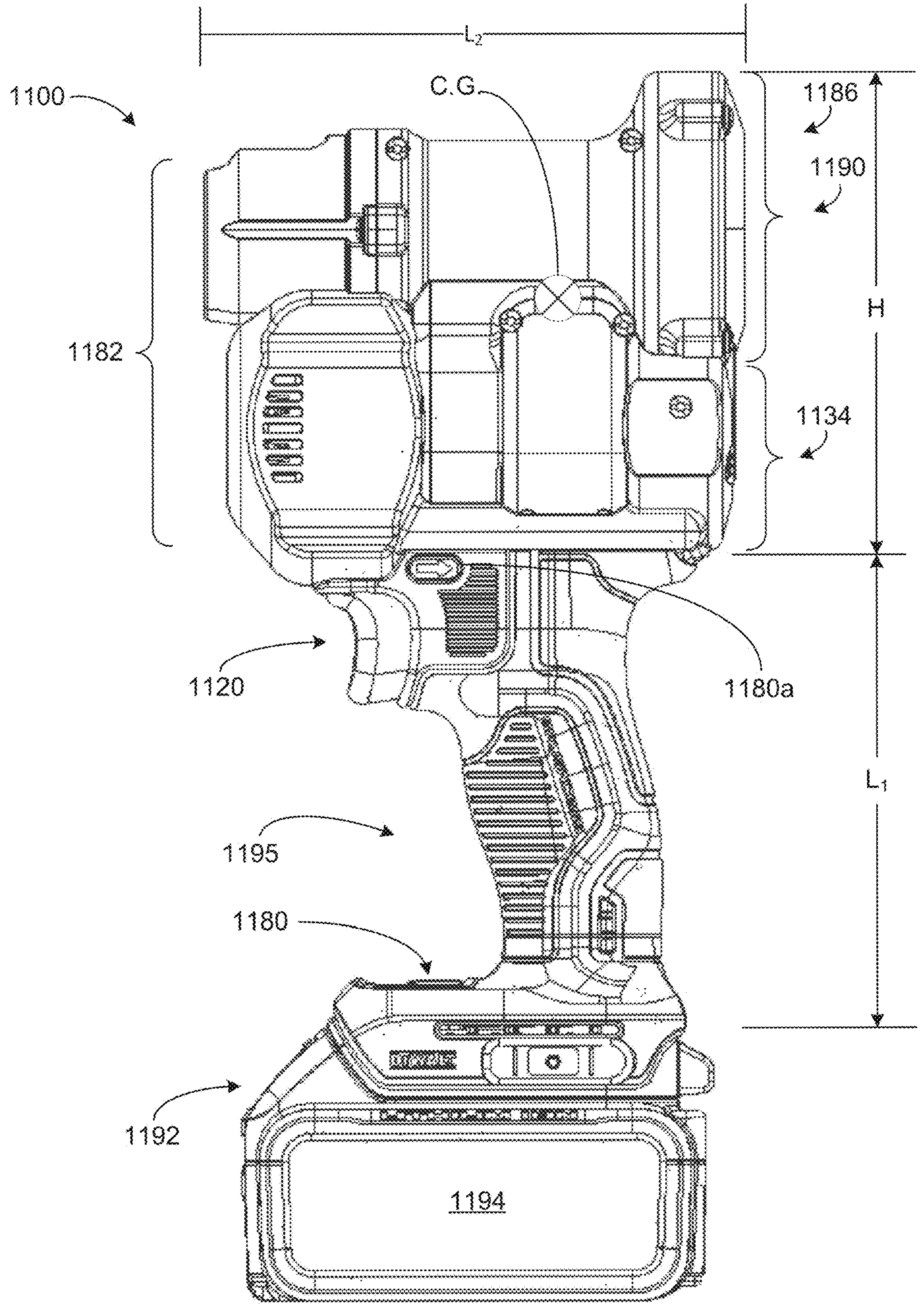
FIG. 11A is a side view.
Figure 11C:
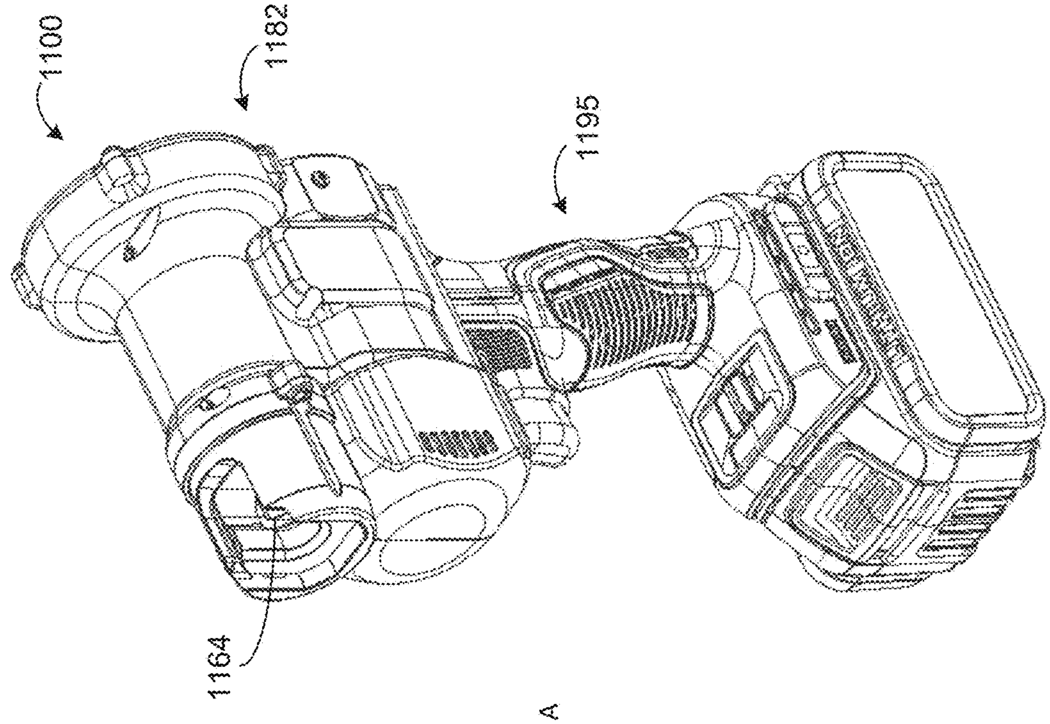
FIG. 11B is a top view.
FIG. 11D is a side view and FIG. 11E is a top view of the example power tool of FIGS. 11A-11C, with an example die set attached to the power tool.
FIG. 11F is a side view of the example power tool of FIGS. 11A-11C, with a portion of the housing removed.
FIG. 11G is a partial cross-sectional view taken along line A-A of FIG. 11B.
FIG. 11H is a side perspective view of the example power tool of FIGS. 11A-11C, with a portion of the housing removed.
FIGS. 11I and 11J are side views of the example power tool of FIGS. 11A-11C, with a portion of the housing removed and a cross-sectional view of the driven member, illustrating an operation of the power tool.
FIG. 11K is a first perspective view and FIG. 11L is a second perspective view of the driving member of the example power tool of FIGS. 11A-11C.
FIG. 11M is a first perspective view and FIG. 11N is a second perspective view of the driven member of the example power tool of FIGS. 11A-11C.
Figure 11B:
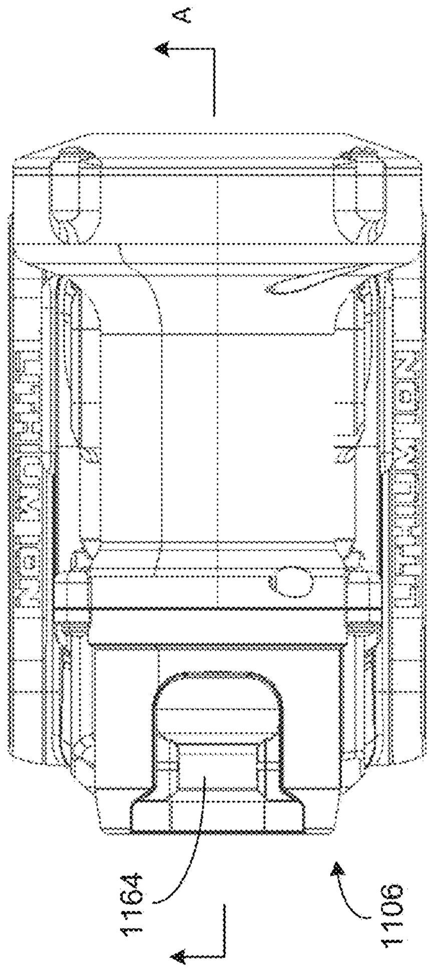

FIGS. 11A-11C are side, top, and perspective views, respectively, of an example power tool 1100 in the form of a knockout tool. Unlike some other examples of the present disclosure, power tool 1100 is a specialized power-driven knockout tool, rather than an accessory device for use with a power tool. In the illustrated example, power tool 1100 has an electric motor and mechanical transmission and does not include any hydraulic circuits, components, or systems, which provides for a compact, low maintenance, lightweight, and high power device.

The example power tool 1100 includes a housing 1190. A trigger 1120 for controlling operation of the example power tool 1100 is provided at a handle portion 1195 of the housing 1190. One or more selection devices 1180, accessible to a user at the outside of the housing 1190, provide for additional user control of the example power tool 1100. For example, the one or more selection devices 1180 can be manipulated by the user to set an operation mode of the example power tool 1100, to set an operational speed of the example power tool 1100, to set an operational direction of the example power tool 1100, and the like. Housing 1190 also includes a first portion 1182 located above, e.g., substantially directly above, handle portion 1195. In some examples first portion 1182 of housing 1190 contains electric drive mechanisms and knockout tool mechanisms. For example, first portion 1182 may include a motor and transmission portion 1184 that contains a motor and transmission and is located above handle portion 1195. The motor and transmission portion 1184 includes a motor 1102, e.g., an electric motor, such as a brushless DC motor, a brushed DC motor, or an AC motor. In some examples the motor 1102 (see, e.g., FIG. 11F), located in the motor and transmission portion 1184 may be located forward of handle portion 1195. First portion 1182 may also include a punch portion 1186 that is located above the motor and transmission portion 1184 and that contains a knockout tool mechanism that is operably coupled to the electric drive mechanism. Housing 1190 may also include a battery receptacle 1192 for coupling to a battery pack 1194 for powering the electric drive mechanism.

FIGS. 11A-11C show the power tool 1100 without a die set attached to the power tool. As shown in FIGS. 11B and 11C, a location on a front side 1106 of housing 1190 that corresponds to a working end of the power tool 1100 includes a second cavity 1164 of a knockout tool mechanism that has a shape and dimension that is configured to receive a pull rod 1114 of a punch portion 1112 of a die set 1110 (see, e.g., FIG. 11E) for removable coupling of one of a plurality of different die sets to the power tool 1100. This allows for a variety of different sizes and/or configurations of die sets to be selectively attached to the power tool 1100.

Housing 1190 provides a compact, ergonomic, and balanced arrangement that is easily manipulated with one hand and that, in at least some examples, can fit into relatively small areas. As shown in FIG. 11A, handle portion 1195 has a length L1 and first portion has a height H extending from the handle portion 1195 to a top end of the housing. First portion 1182 also has a length, L2 extending from a back side of housing 1190 to a front side of the housing, which corresponds to a working end of the power tool 1100. FIG. 11A also shows an approximate location of a center of gravity, CG, of power tool 1100 when the battery pack 1194 is not attached. In the illustrated example the center of gravity is located within first portion 1182, at a point that is located approximately between motor and transmission portion 1184 and punch portion 1186 and that is located substantially directly above handle portion 1195, which can provide for a balanced device.

First portion 1182 may be relatively compact while still providing substantial pulling power capability. For example, a volume of first portion 1182 may be between approximately 1000 $cm^3$ and approximately 2000 $cm^3$, and in some examples between approximately 1000 $cm^3$ and approximately 1500 $cm^3$, and in some examples, between approximately 1200 $cm^3$ and approximately 1220 $cm^3$. A ratio of the length L1 of handle portion 1195 to the height H, of first portion 1182 (L1/H) may be between approximately 0.75 and approximately 1.25 and in some examples, between approximately 0.9 and approximately 1.1, in some examples, L1 may be approximately the same as H and in some examples, H may be within 5% of L1 and in some examples, H may be within 2% of L1. A ratio of the length L1 of handle portion 1195 to the length, L2, of first portion 1182 (L1/L2) may be between approximately 0.6 and approximately 1.0 and in some examples, between approximately 0.8 and approximately 0.9. In some examples L2 is approximately 5% longer than L1, and in some examples, approximately 10% longer than L1, and in some examples, approximately 15% longer than L1.

Figure 11E:
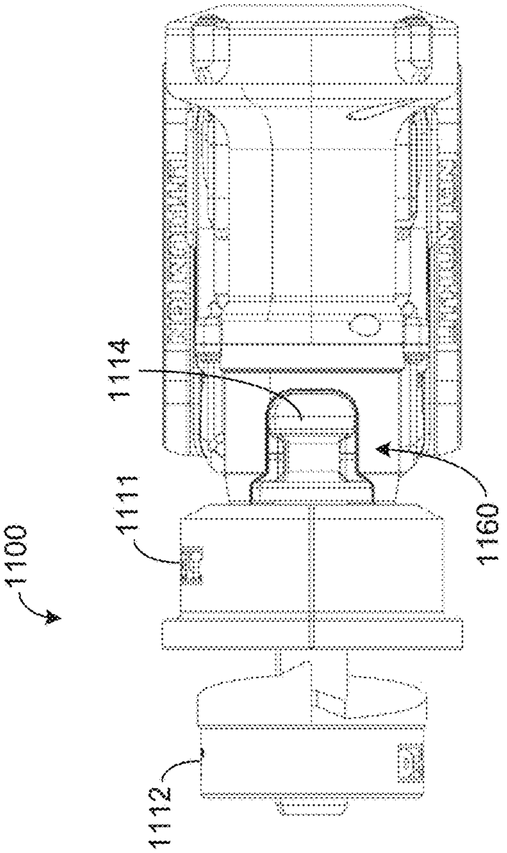
Figure 11D:
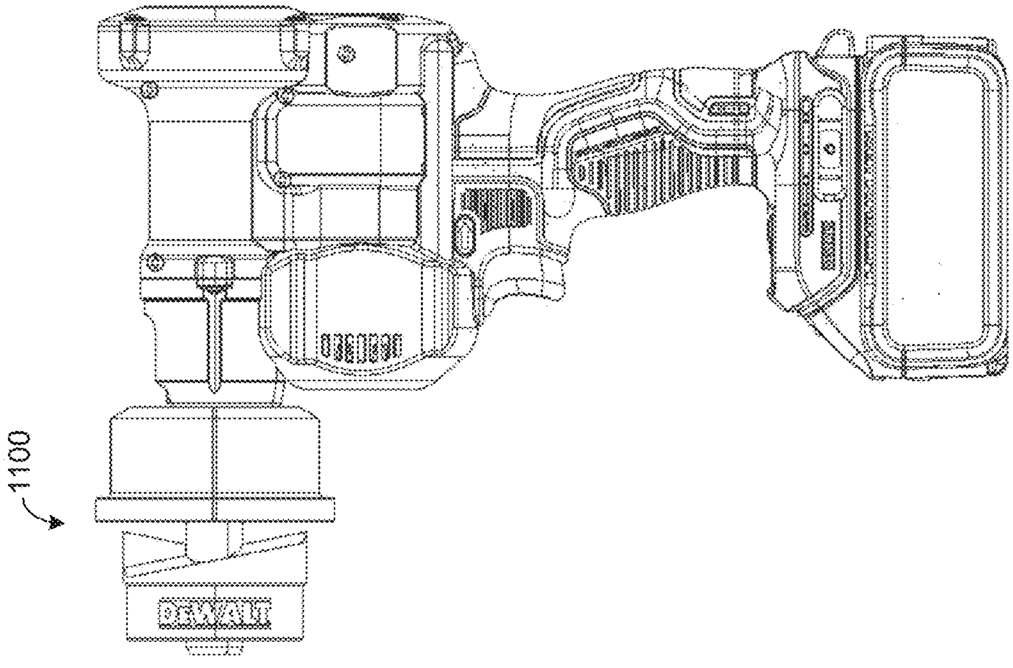

FIGS. 11D and 11E are a side view and top view, respectively, of power tool 1100 with a die set 1110 coupled to the power tool. The die set 1110 includes a cup portion 1111 and a punch portion 1112. Punch portion 1112 includes a pull rod 1114 that has a first end with a size and shape that is complementary to a size and shape of second cavity 1164 of driven member 1160 for easy attachment and removal of punch portion 1112 from power tool 1100.

Figure 11F:
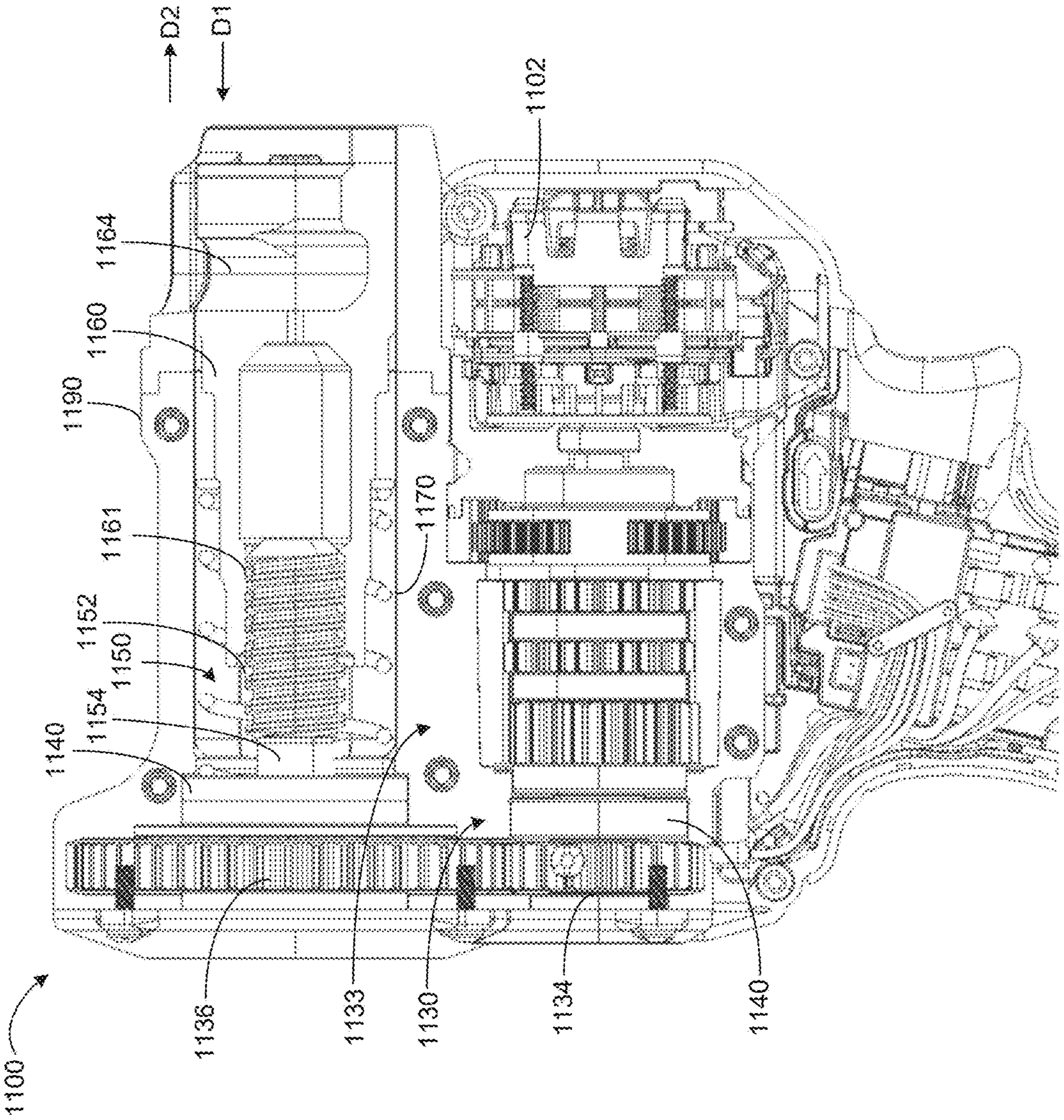
Figure 11G:
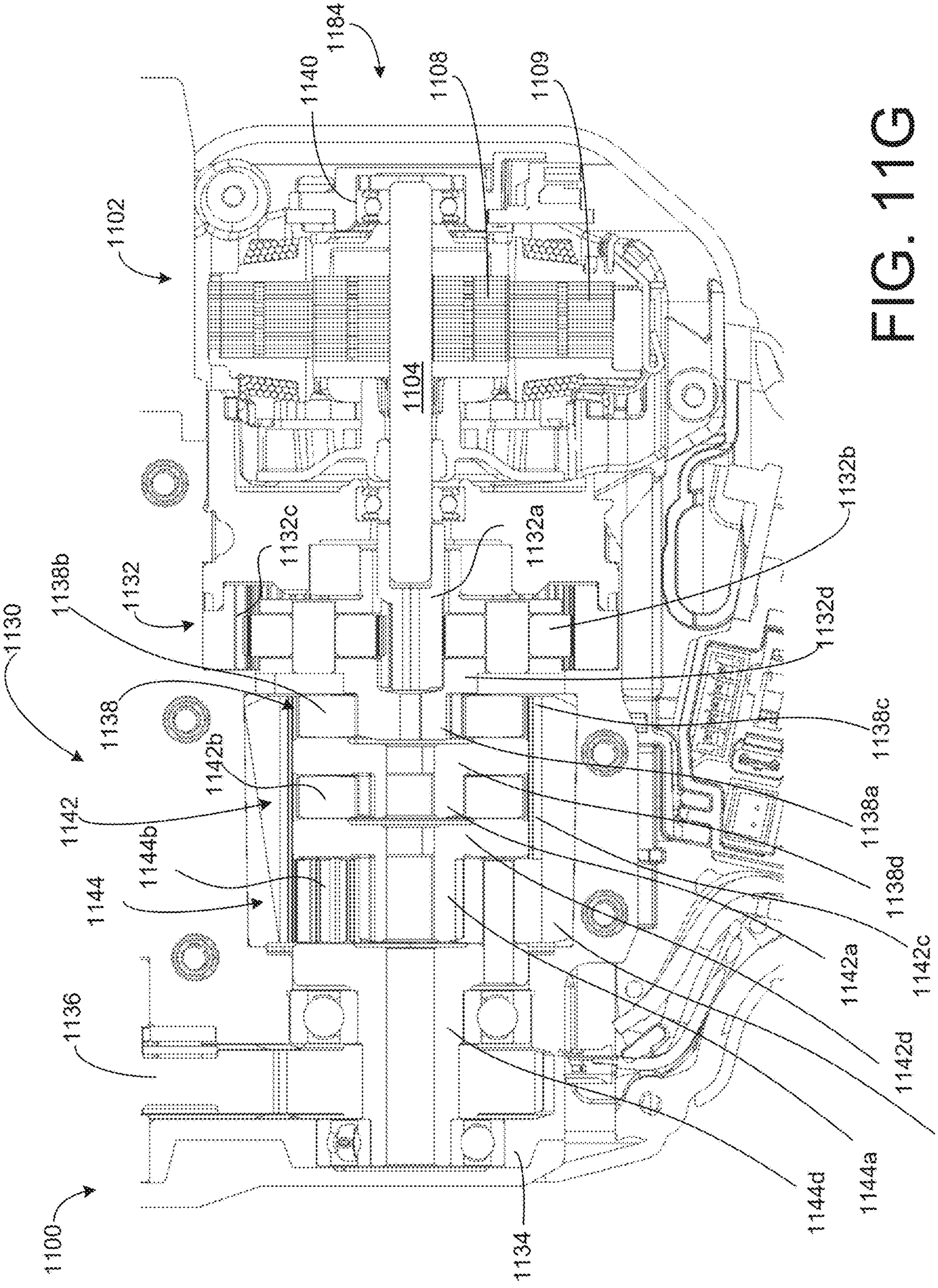
Figure 11H:
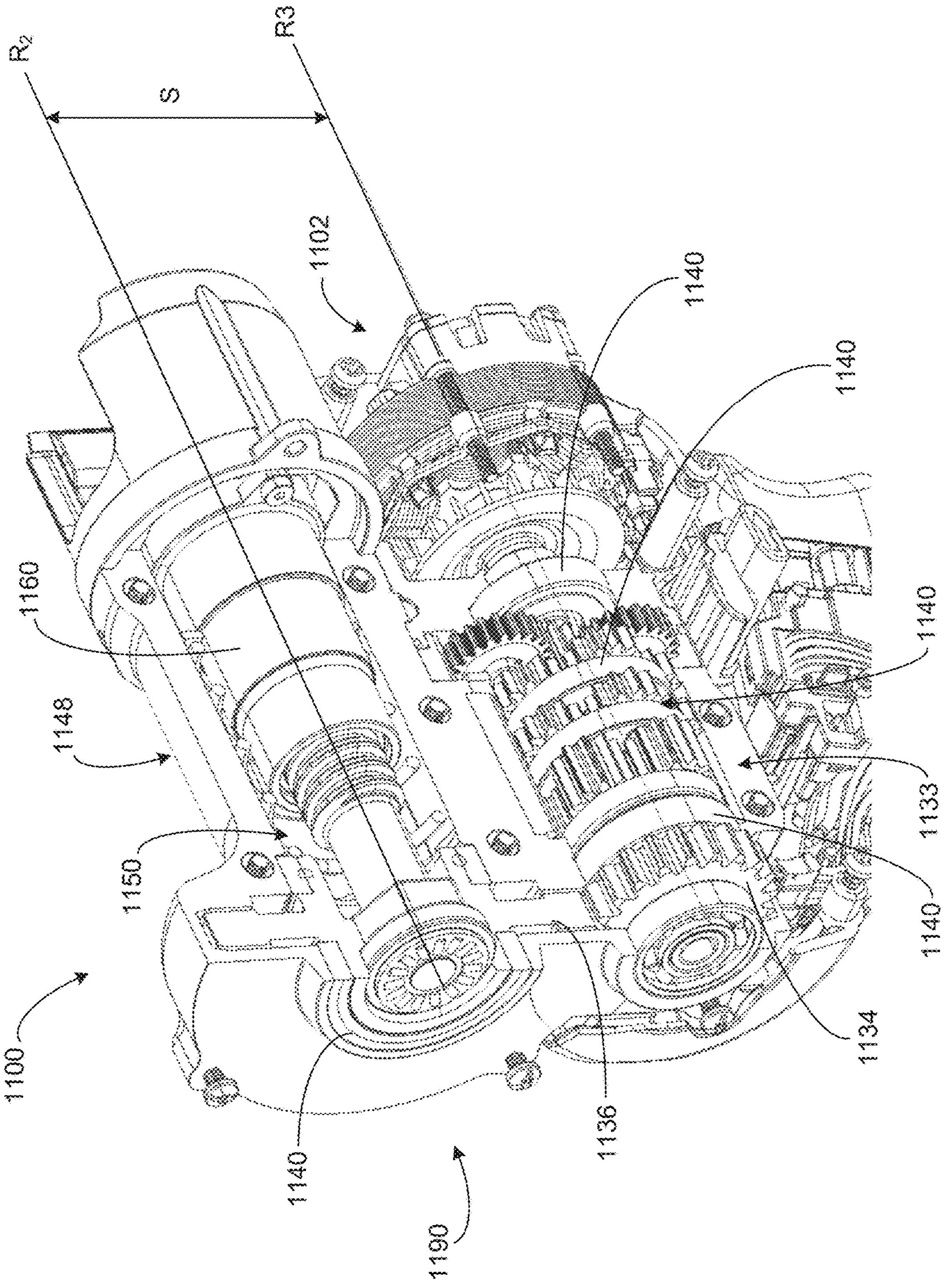

FIGS. 11F and 11G are side cross-sectional views and FIG. 11H is a cross-sectional side perspective view of power tool 1100 illustrating the internal components of first portion 1182 of housing 1190. Power tool 1100 includes a motor

1102 that is operably coupled to a portion of a transmission 1130 provided in the housing 1190 to transmit a force, for example, a rotary torque from a motor 1102 to a driving member 1150 for operation of the die set 1110 (see, e.g., FIG. 11E). In this example arrangement, the transmission 1130 includes one or more planetary gear sets 1133, an input spur gear 1134, and an output spur gear 1136. A plurality of bearings 1140 support the one or more planetary gear sets 1133, the input spur gear 1134, and the output spur gear 1136 on their respective shafts.

As best seen in FIG. 11G, the motor 1102 includes a rotor 1108 and a stator 1109, the rotor 1108 coupled to motor shaft 1104 and the rotor and motor shaft rotatably supported by bearings 1140. An end of motor shaft 1104 acts as an input shaft to the transmission and is coupled to a first sun gear 1132*a* of a first stage planetary gear set 1132. The planetary gear set 1132 includes the sun gear 1132*a*, one or more first planet gears 1132*b* that mesh with and are configured to orbit the first sun gear 1132*a*, a first ring gear 1132*c* that is fixed relative to the housing 1190, and a first carrier 1132*d* that carries the planet gears 1132*b* and that rotate at a slower speed than the first sun gear 1132*a* to provide a first speed reduction. In the illustrated example, the one or more planetary gear sets 1133 also includes a second stage planetary gear set 1138 (including a second sun gear 1138*a* coupled to the first carrier 1132*d*, one or more second planet gears 1138*b*, a second ring gear 1138*c* fixed to the housing, and a second carrier 1138*d* that rotates at a slower speed than the second sun gear 1138*a* to provide a second speed reduction), a third stage planetary gear set 1142 (including a third sun gear 1142*a* coupled to the second carrier 1138*d*, one or more third planet gears 1142*b*, a third ring gear 1142*c* fixed to the housing, and a third carrier 1142*d* that rotates at a slower speed than the third sun gear 1142*a* to provide a third speed reduction), and a fourth stage planetary gear set 1144 (including a fourth sun gear 1144*a* coupled to the third carrier 1142*d*, one or more fourth planet gears 1144*b*, a fourth ring gear 1144*c* fixed to the housing, and a fourth carrier 1144*d* that rotates at a slower speed than the fourth sun gear 1144*a* to provide a fourth speed reduction). The one or more planetary gear sets 1133 transfer torque from motor 1102 to input spur gear 1134 while also reducing a rotational speed and increasing a torque of the motor output. Input spur gear 1134 and output spur gear 1136 transfer the driving torque from the one or more planetary gear sets 1133 to the driving member 1150 and also may further reduce the rotational speed and increase the torque. Transmission 1130 may, therefore, be configured to provide a substantial speed reduction and corresponding substantial increase in driving torque. In some examples, a speed reduction ratio of the transmission is between approximately 500:1 and 1500:1, and in some examples, the speed reduction ratio of the transmission is between approximately 800:1 and 1200:1, and in some examples, the speed reduction ratio of the transmission is between approximately 900:1 and 1000:1, and in some examples, the speed reduction ratio of the transmission is approximately 950:1.

As best seen in FIG. 11H, the input spur gear 1134 and output spur gear 1136 also transfer the driving torque from a third axis R3 to a second axis R2, proving a compact arrangement of the knockout assembly 1148, comprising the driving member 1150 and driven member 1160, positioned above the motor 1102 and one or more planetary gear sets 1133. In some examples, a spacing, S, between the third axis R3 and the second axis R2 may be between approximately 30 mm and approximately 75 mm, and in some examples, between approximately 40 mm and approximately 60 mm, and in some examples, approximately 50 mm. In an example, the second axis and the third axis are offset and parallel and each extend between opposing front and rear sides of the housing 1190.

In some examples power tool 1100 includes an electric drive system that is space efficient and is configured to generate a substantial pulling force at the driven member 1160 that can be used, for example, to draw a punch portion 1112 through a workpiece. In some examples, power tool 1100 is configured to generate at least approximately 50 kN of axial pulling force at the driven member 1160, and in some examples, at least approximately 80 kN of axial pulling force, and in some examples, at least approximately 100 kN of axial pulling force at the driven member 1160. The example power tool 1100 also may be configured to provide a high pulling force in a compact tool. For example, the knockout tool may have a ratio of pulling force to a volume of the first portion 1182 of the housing of approximately 0.08 kN/cm3 to approximately 0.09 kN/cm3.

A rod or threaded shaft defining the driving member (e.g., in the form of a drive shaft) 1150 is coupled to the output spur gear 1136, such that the driving member 1150 rotates together with the output spur gear 1136 in response to a rotary force transmitted from the motor 1102 through the transmission 1130. As shown in FIGS. 11H, 11K, and 11L, a first end 1156 of the driving member 1150 is removably coupled to an inner surface of output spur gear 1136, with the first end 1156 of the driving member having a size and shape that is complementary to a size and shape of the inner surface of the output spur gear 1136. In the illustrated example, the first end 1156 of the driving member 1150 has a plurality of flat surfaces that form a hexagonal shape. In other examples, other shapes may be used or the driving member 1150 may be integrally formed with the output spur gear 1136.

In some examples the driving member 1150 includes a threaded portion 1152 and an unthreaded portion 1154. The driven member 1160 is slidably disposed in the housing 1190. In some examples, the driven member 1160 is coupled in the housing 1190 such that rotation of the driven member 1160 is restricted, and the driven member 1160 is movable axially within the housing 1190. As shown in FIGS. 11M and 11N, in some examples, external surface(s) of the driven member 1160 incorporate flat portions 1162 that interface with corresponding interior surface portions of the housing 1190 to restrict rotation of the driven member 1160.

Referring again to FIGS. 11E and 11F, a second cavity 1164 is formed in an end portion of the driven member 1160. The second cavity 1164 is configured to provide for engagement of a corresponding pull rod 1114 that couples the driven member 1160 to the die set 1110, to removably couple the die set 1110 to the power tool 1100, and allowing for a variety of different sizes and/or configurations of die sets to be selectively attached to the power tool 1100. A first cavity 1166 is formed in an end portion of the driven member 1160, opposite the second cavity 1164. A threaded portion 1161 of the first cavity 1166 is configured to selectively engage the threaded portion 1152 of the driving member 1150, as the driving member 1150 rotates in response to the rotation of the output spur gear 1136, and the driving member 1150 moves axially towards or away from first cavity 1166. A biasing member 1170 in the form of a spring is positioned between an end portion of the driven member 1160 and a bearing 1140 supporting the output spur gear 1136. In some examples, the biasing member 1170 may be in the form of a spring, e.g., a coil spring, a compression spring, a wave spring, or a leaf spring.

Figure 11I:
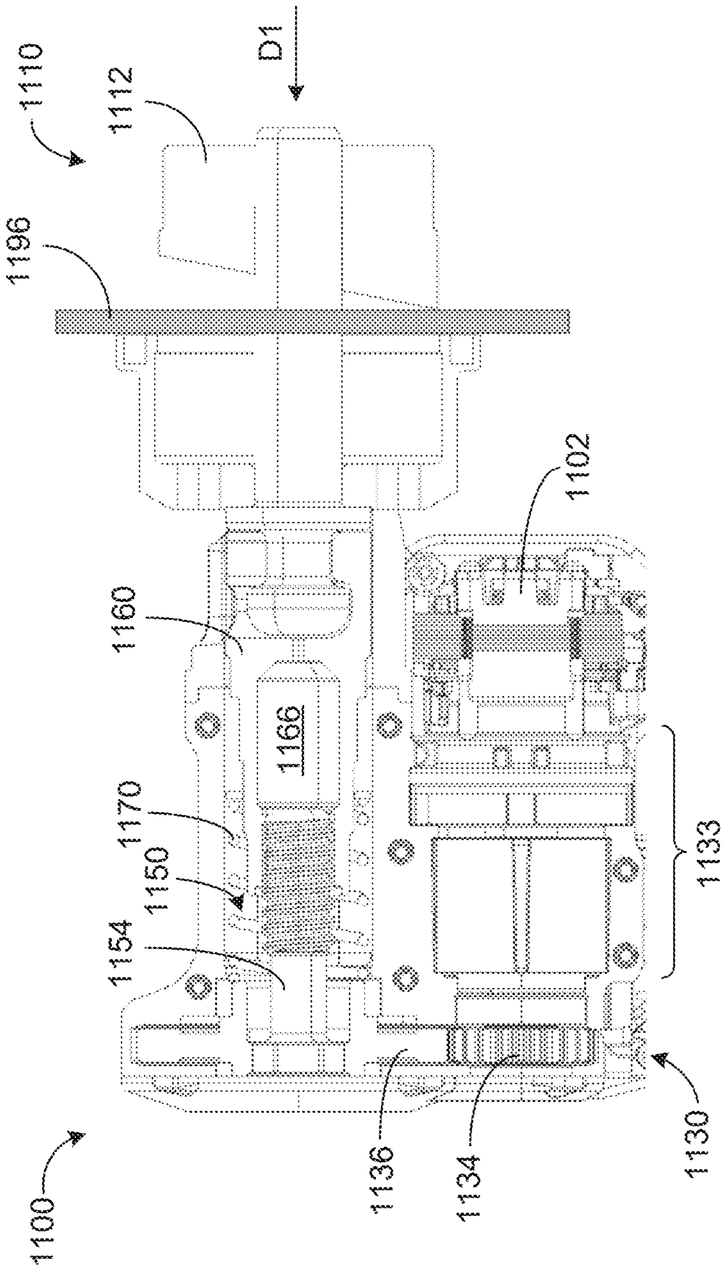
Figure 11J:
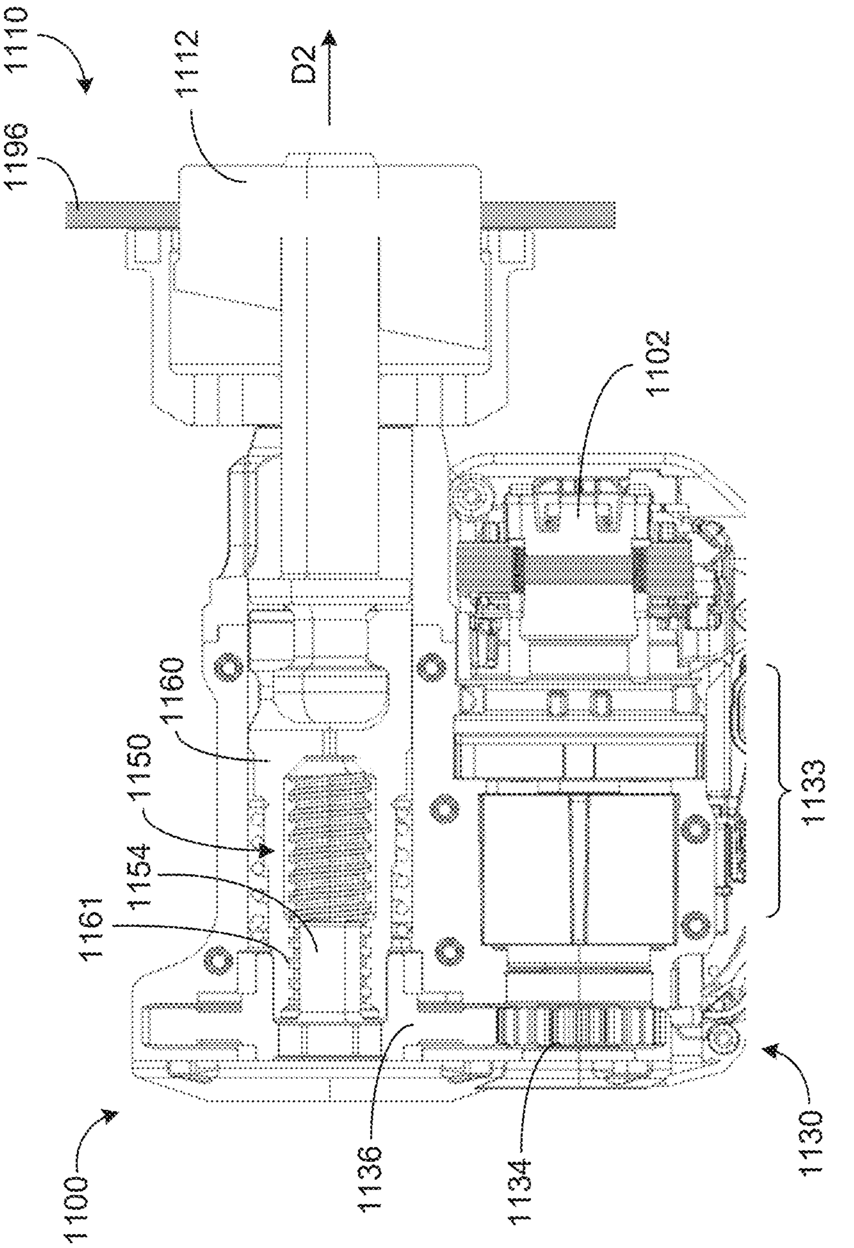
Figure 11M:
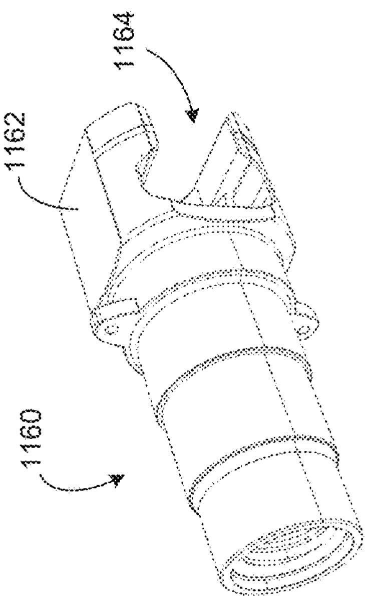
Figure 11N:
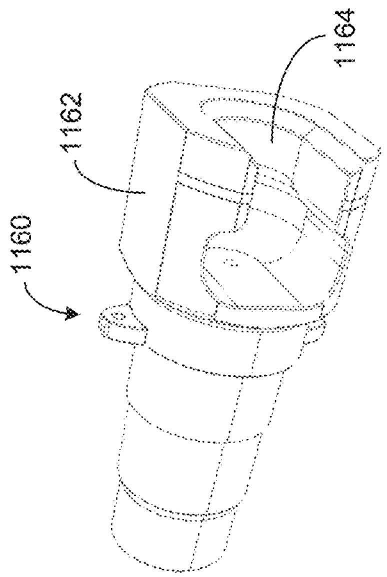
Figure 11K:
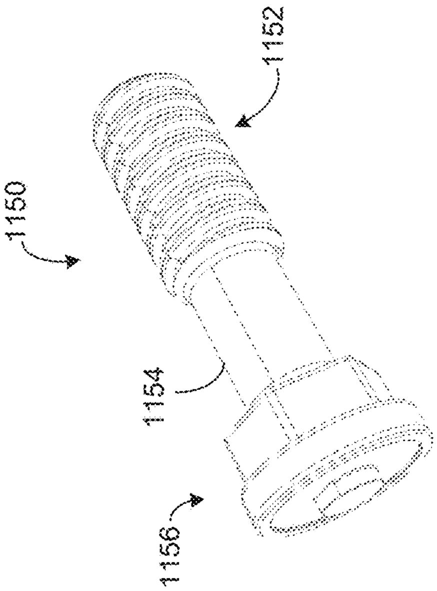
Figure 11L:
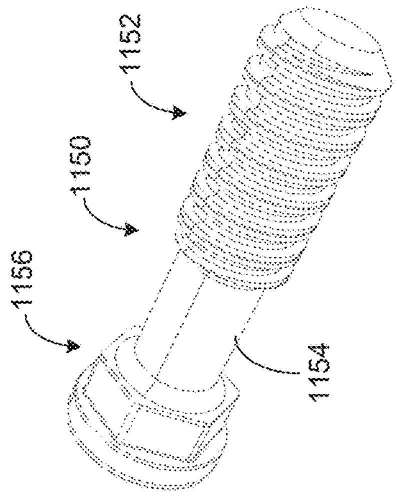

FIGS. 11I and 11J are cross-sectional side views of power tool 1100 illustrating an example method of operation of the power tool to form an opening in a workpiece 1196 with a die set 1110. During use of power tool 1100, when trigger 1120 is depressed, power is transmitted from battery pack 1194 to the motor 1102, thereby causing the motor shaft 1104 to rotate and transmit a rotating torque to the transmission 1130. Rotation of motor shaft 1104 causes transmission of torque through the one or more planetary gear sets 1133. Each of the one or more planetary gear sets 1133 includes a sun gear configured to rotate about its axis, a plurality of planet gears surrounding and in meshed engagement with the respective sun gear, such that the planet gears rotate about their axes and orbit the sun gear in response to rotation of the respective sun gear, a stationary ring gear that surrounds the planet gears, and a carrier to which the planet gears are mounted and that rotates about its axis at a reduced speed compared to a speed of rotation of the sun gear. Each of the one or more planetary gear sets 1133 provide for a reduction in speed, and corresponding increase in torque. The input spur gear 1134 rotates in response to transmission of torque through the one or more planetary gear sets 1133. The output spur gear 1136, which is in meshed engagement with the input spur gear 1134, rotates in response to rotation of the input spur gear 1134. In response to rotation of the output spur gear 1136 and the driving member 1150 coupled thereto in a first direction, the threaded portion 1152 of the driving member 1150 engages the threaded portion 1161 of the first cavity 1166 of the driven member 1160. Because rotation of the driven member 1160 is restricted, continued rotation of the driving member 1150 in the first direction, and continued engagement between the threaded portion 1152 of the driving member 1150 and the threaded portion 1161 of the first cavity 1166, draws the threaded portion 1152 of the driving member 1150 further into the first cavity 1166, and causes axial movement of the driven member 1160 in the direction of the arrow D1. Axial movement of the driven member 1160 in the direction of the arrow D1 draws the driven member 1160, and the pull rod and punch portion 1112 coupled thereto, in the direction of the arrow D1, eventually pulling the punch portion 1112 through the workpiece 1196, forming an opening in the workpiece along the periphery of the punch portion 1112.

FIG. 11J shows driving member 1150 and driven member 1160 in a disengaged state. As shown in FIG. 11J, at a point at which the driving member 1150 has moved far enough into the first cavity 1166 so that the threaded portion 1152 of the driving member 1150 has moved completely axially through threaded portion 1161 and is fully disposed in the first cavity 1166. In the disengaged state, threaded portion 1161 of driven member 1160 is adjacent unthreaded portion 1154. In the disengaged state, the threaded portion 1161 of driven member 1160 is disengaged from the threaded portion 1152 of the driving member 1150. In the disengaged state, there is no more movement of the driven member 1160 in the direction of the arrow D1, even if a user of the power tool 1100 continues to depress trigger 1120 and motor shaft 1104 and driving member 1150 continues to rotate. The unthreaded portion 1154 of the driving member 1150 provides the function of a dead zone, where there is no threaded engagement between driving member 1150 and driven member 1160, thereby precluding further axial movement of the driven member 1160 and any punch portion 1112 coupled thereto, thus defining a stopping mechanism that inhibits or restricts continued axial movement.

Movement of a first selector 1180*a* of the one or more selection devices 1180 to a reverse position and depression of trigger 1120 causes motor shaft 1104 and driving member 1150 to rotate in a second, opposite direction. A biasing force from biasing member 1170 along with rotation of driving member 1150 causes re-engagement of the threaded portion 1152 of the driving member 1150 with the threaded portion threaded portion 1161 of driven member 1160, and movement of the driven member 1160 in the direction of the arrow D2 to provide for reset of the power tool 1100 for formation of the next opening, to remove material from the cup portion 1111 of the die set 1110, to remove/replace the die set 1110 and the like.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A knockout tool comprising:

a housing;

a transmission received in the housing;

an input shaft at least partially received in the housing and configured to transmit an input torque to the transmission;

a driving member at least partially received in the housing and configured to be rotatably driven about a first axis by the transmission, the driving member including a threaded first portion and a second portion proximate the threaded first portion; and a driven member at least partially received in the housing and configured to be axially moveable along a second axis, the driven member including a coupling portion configured to be coupled to a punch of a die set and a threaded portion engageable with the threaded first portion;

wherein, during operation, in response to rotation of the input shaft in a first direction, the threaded first portion is rotatably driven by the transmission to engage the threaded portion such that rotation of the driving member about the first axis causes axial movement of the driven member and the punch in a first axial direction along the second axis to form a hole in a workpiece; and wherein, in response to further rotation of the input shaft, the threaded portion is positioned proximate the second portion causing the threaded first portion and the threaded portion to disengage such that further rotation of the driving member about the first axis does not cause axial movement of the driven member along the second axis.

2. The knockout tool of claim 1, wherein at least one of the driving member or the driven member includes an unthreaded portion.

3. The knockout tool of claim 1, further comprising a spring that biases at least one of the threaded first portion and the threaded portion toward being in engagement with each other.

4. The knockout tool of claim 3, wherein, in response to disengagement of the threaded first portion and the threaded portion, rotation of the input shaft in a second direction opposite the first direction and a biasing force of the spring cause the threaded first portion and the threaded portion to re-engage.

5. The knockout tool of claim 3, wherein the spring is positioned between an end portion of the driven member and a bearing coupling the driving member to the transmission, wherein the spring exerts a biasing force on the driven member that urges re-engagement of the threaded first portion of the driving member with the threaded portion of the driven member.

6. The knockout tool of claim 1, wherein the transmission includes a gear assembly including a plurality of gears to provide a speed reduction and torque increase from the input shaft to the driving member.

7. The knockout tool of claim 6, wherein the gear assembly includes at least one planetary gear set configured to transmit torque from the input shaft to an output member of the at least one planetary gear set.

8. The knockout tool of claim 7, wherein the gear assembly further includes a first spur gear configured to be driven by the output member of the at least one planetary gear set and a second spur gear configured to be driven by the first spur gear.

9. The knockout tool of claim 6, wherein the gear assembly includes:

an input spur gear;

an intermediate spur gear mounted on an intermediate shaft and in meshed engagement with the input spur gear, and configured to rotate in response to rotation of the input spur gear;

a worm gear formed on an outer portion of the intermediate shaft and configured to rotate together with the intermediate spur gear and the intermediate shaft; and an output gear in meshed engagement with the worm gear and configured to rotate in response to rotation of the worm gear.

10. The knockout tool of claim 6, wherein the gear assembly includes:

an input bevel gear;

an output bevel gear in meshed engagement with the input bevel gear, wherein the output bevel gear is configured to rotate in response to rotation of the input bevel gear;

at least one planetary gear set configured to transmit torque in response to rotation of the output bevel gear;

an input spur gear configured to rotate in response to rotation of an output member of the at least one planetary gear set; and an output spur gear in meshed engagement with the input spur gear and configured to rotate in response to rotation of the input spur gear.

11. The knockout tool of claim 1, further comprising:

a punch of a die set coupleable to the driven member and movable axially along the second axis with the driven member.

12. The knockout tool of claim 6, wherein a speed reduction ratio of the transmission is between 500:1 and 1500:1.

13. The knockout tool of claim 1, wherein the knockout tool is configured to generate at least 50 kN of axial pulling force at the driven member.

14. The knockout tool of claim 1, wherein a volume of the housing is between 352 $cm^3$ and 1220 $cm^3$.

15. The knockout tool of claim 1, wherein a ratio of an axial pulling force at the driven member to a volume of the housing is between 0.03 $kN/cm^3$ and 0.15 $kN/cm^3$.

16. The knockout tool of claim 1, wherein the input shaft is configured to be driven by an output tool holder of a separate rotary power tool.

17. The knockout tool of claim 16, further comprising a brace assembly configured to support the housing relative to the rotary power tool, the brace assembly including an arm configured to be removeably attached to athe power tool and a collar coupled to the arm and configured to be coupled to the housing.

18. The knockout tool of claim 1, further comprising an electric motor received in the housing and configured to rotatably drive the input shaft.

19. The knockout tool of claim 18, further comprising a handle coupled to the housing and a battery configured to provide power to the electric motor.

20. The knockout tool of claim 1, wherein the transmission includes a planetary gear set;

wherein the housing includes:

opposing front and rear sides;

a handle portion;

a motor and transmission portion located above the handle portion that contains a motor and the planetary gear set; and a punch portion located above the motor and transmission portion that contains the driving member and the driven member;

wherein the motor includes a shaft that rotates about a third axis, wherein the second axis and the third axis are offset and parallel and each extend between the front and rear sides of the housing.

21. The knockout tool of claim 20, wherein the motor and the punch portion are each located forward of the handle portion.

22. The knockout tool of claim 1, wherein the knockout tool is configured to generate at least 50 kN of axial pulling force at the driven member for forming the hole in the workpiece with the die set.

23. The knockout tool of claim 22, wherein a ratio of an axial pulling force at the driven member to a volume of the housing is between 0.08 $kN/cm^3$ and 0.09 $kN/cm^3$.

* * * * *